(12) United States Patent
Moisa

(10) Patent No.: US 12,440,166 B2
(45) Date of Patent: Oct. 14, 2025

(54) SYSTEMS AND METHODS FOR FACILITATING IMPROVED TRANSDUCER-TO-TISSUE CONTACT

(71) Applicant: KARDIUM INC., Burnaby (CA)

(72) Inventor: Saar Moisa, Vancouver (CA)

(73) Assignee: KARDIUM INC., Burnaby (CA)

( * ) Notice: Subject to any disclaimer, the term of this patent is extended or adjusted under 35 U.S.C. 154(b) by 1806 days.

(21) Appl. No.: 16/515,613

(22) Filed: Jul. 18, 2019

(65) Prior Publication Data

US 2020/0022653 A1    Jan. 23, 2020

Related U.S. Application Data

(60) Provisional application No. 62/701,084, filed on Jul. 20, 2018.

(51) Int. Cl.
*A61B 18/14* (2006.01)
*A61B 5/00* (2006.01)
(Continued)

(52) U.S. Cl.
CPC ........... *A61B 5/6885* (2013.01); *A61B 5/066* (2013.01); *A61B 5/6858* (2013.01); *A61B 5/743* (2013.01);
(Continued)

(58) Field of Classification Search
CPC .......... A61B 5/6858; A61B 2018/0022; A61B 2018/00267; A61B 5/6885;
(Continued)

(56) References Cited

U.S. PATENT DOCUMENTS 5,598,848 A * 2/1997 Swanson ............... A61B 5/6885
600/374
8,906,011 B2   12/2014 Gelbart et al.
(Continued)

FOREIGN PATENT DOCUMENTS

| WO | 2012100184 A2 | 7/2012 |
| WO | 2012100185 A2 | 7/2012 |
| WO | 2017100902 A1 | 6/2017 |

OTHER PUBLICATIONS

Burkhardt et al. "New Technologies in Atrial Fibrillation Ablation", Circulation, Oct. 13, 2009: 1533-1541. vol. 120, Issue 15.
(Continued)

*Primary Examiner* — Sean W Collins
(74) *Attorney, Agent, or Firm* — ROSSI, KIMMS & McDOWELL LLP

(57) ABSTRACT

A catheter device system may include a plurality of transducers positionable in a bodily cavity defined by at least a tissue wall, each transducer configured to sense a degree of contact between the transducer and the tissue wall. A data processing device system may be configured by a program to receive a plurality of degree-of-contact signals respectively from the plurality of transducers, the signals respectively indicating a degree of contact between the transducer and the tissue wall; identify a particular transducer as belonging to a first transducer set and as exhibiting an improper contact arrangement with the tissue wall as compared to a predetermined tissue-contact state, based at least on an interaction with data associated with at least one of the received degree-of-contact signals; and, consequently, provide an indication of a contact-improvement procedure to facilitate an improved contact arrangement between the particular transducer and the tissue wall.

39 Claims, 29 Drawing Sheets

(51) Int. Cl.
   *A61B 5/06* (2006.01)
   *A61N 1/365* (2006.01)
   *A61B 18/00* (2006.01)
   *A61B 34/00* (2016.01)
   *A61B 90/00* (2016.01)

(52) U.S. Cl.
   CPC ...... *A61B 18/1492* (2013.01); *A61N 1/36514* (2013.01); *A61B 2018/0016* (2013.01); *A61B 2018/0022* (2013.01); *A61B 2018/00267* (2013.01); *A61B 2018/00351* (2013.01); *A61B 2018/00375* (2013.01); *A61B 2018/00577* (2013.01); *A61B 2018/00791* (2013.01); *A61B 2018/00875* (2013.01); *A61B 2018/00988* (2013.01); *A61B 2018/1467* (2013.01); *A61B 2034/252* (2016.02); *A61B 2090/065* (2016.02)

(58) Field of Classification Search
   CPC ... A61B 2090/065; A61B 5/066; A61B 5/743; A61B 18/1492; A61B 2018/00577; A61B 2018/00875; A61B 2018/00988; A61B 2034/252
   See application file for complete search history.

(56) References Cited

U.S. PATENT DOCUMENTS

| | | | |
|---|---|---|---|
| 9,452,016 | B2 | 9/2016 | Moisa et al. |
| 9,492,227 | B2 | 11/2016 | Lopes et al. |
| 2010/0168666 | A1 | 7/2010 | Tegg |
| 2015/0065899 | A1* | 3/2015 | Reinders ............... A61B 5/0538 |
| | | | 607/30 |
| 2015/0182726 | A1* | 7/2015 | Jenkins .............. A61M 25/0113 |
| | | | 600/424 |
| 2016/0135690 | A1 | 5/2016 | Brewster et al. |
| 2018/0264230 | A1 | 9/2018 | Funk et al. |

OTHER PUBLICATIONS

Kottkamp et al. "Global multielectrode contact mapping plus ablation with a single catheter: Preclinical and preliminary experience in humans with atrial fibrillation." Journal of Cardiovascular Electrophysiology. 2017:1-10.

Mounsey. "A novel multielectrode combined mapping and ablation basket catheter: A future player in the atrial fibrillation ablation space?" Journal of Cardiovascular Electrophysiology. 2017:1-2.

* cited by examiner

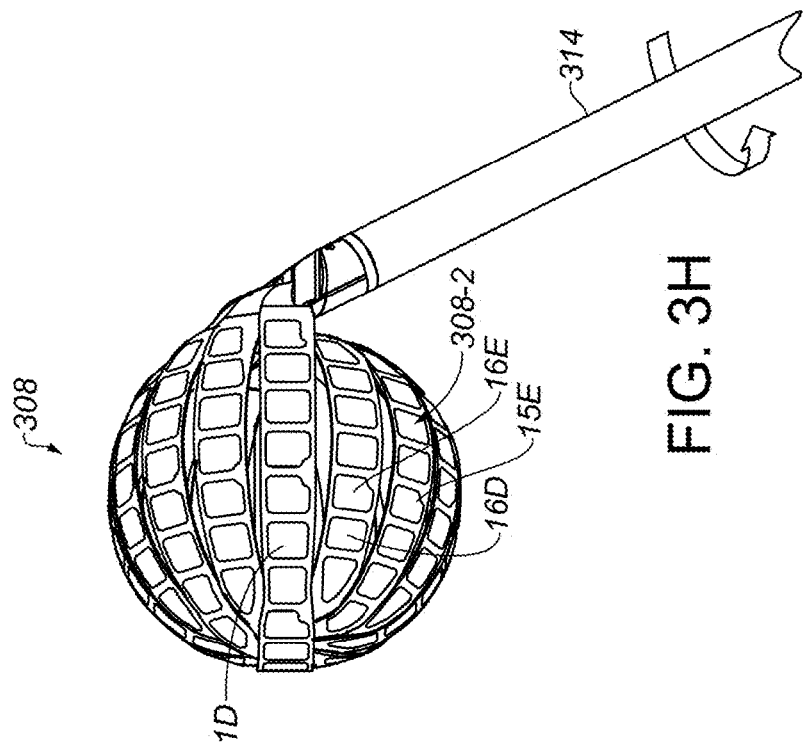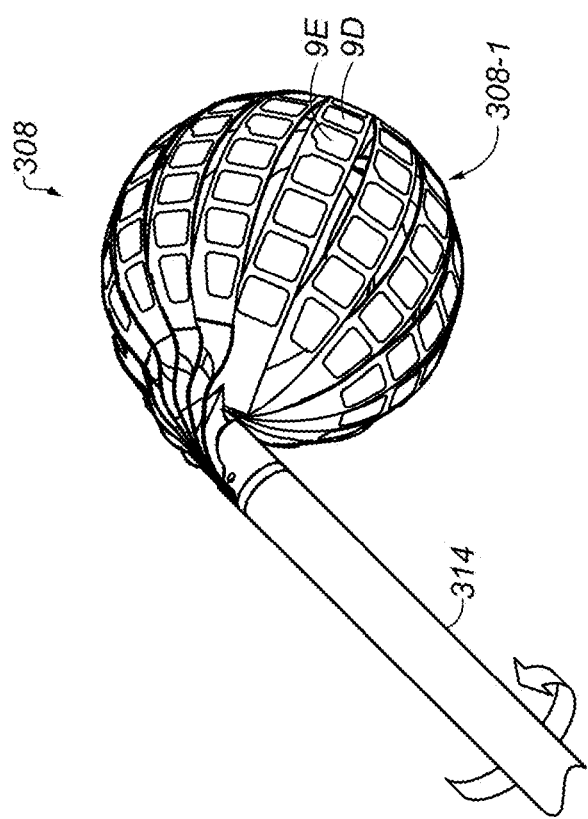

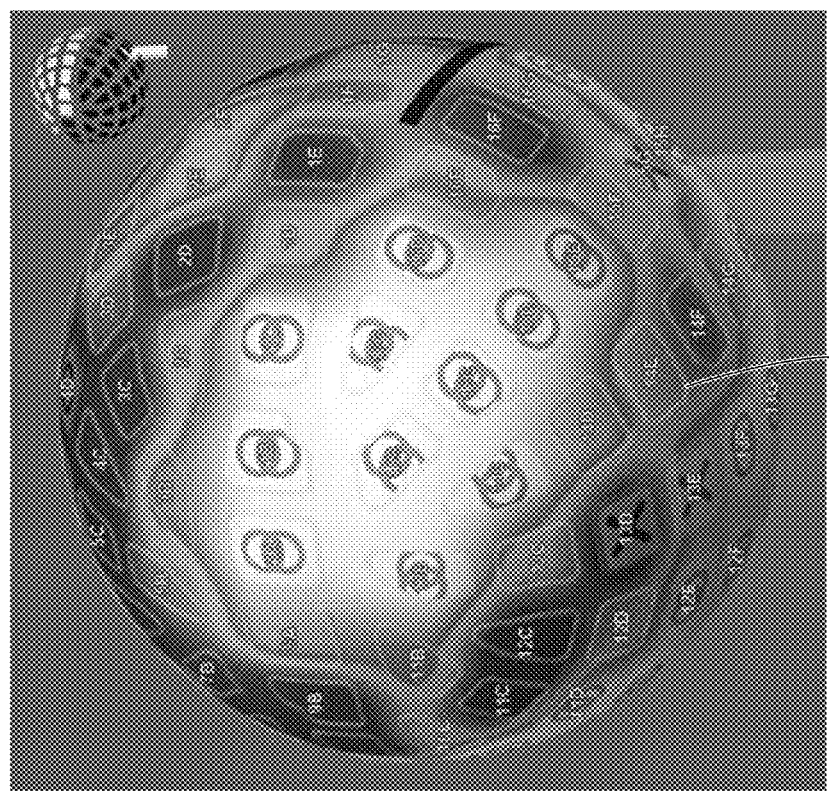
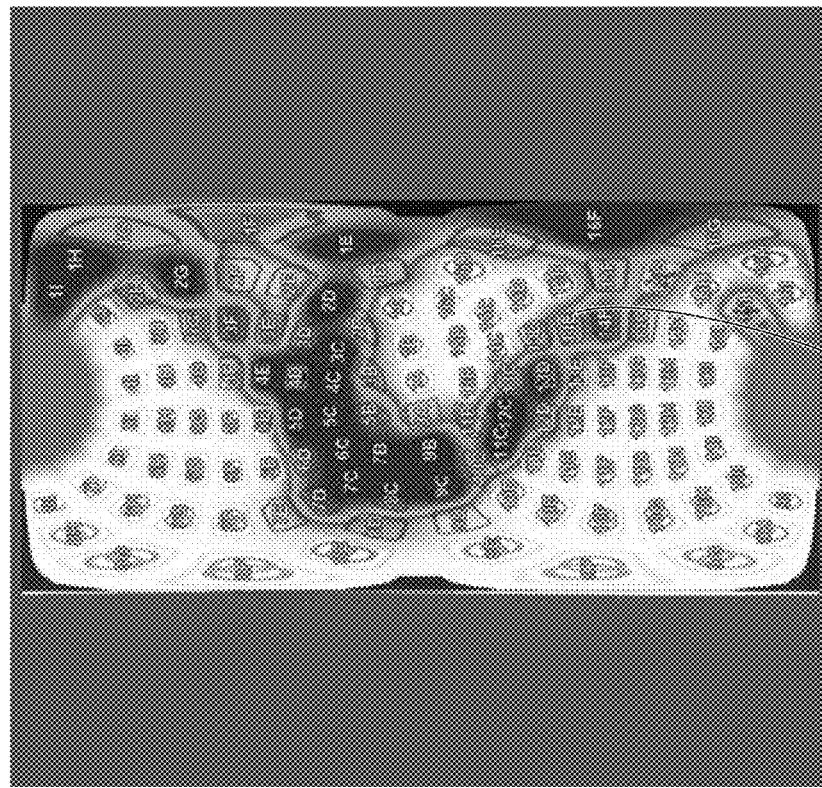
FIG. 5D

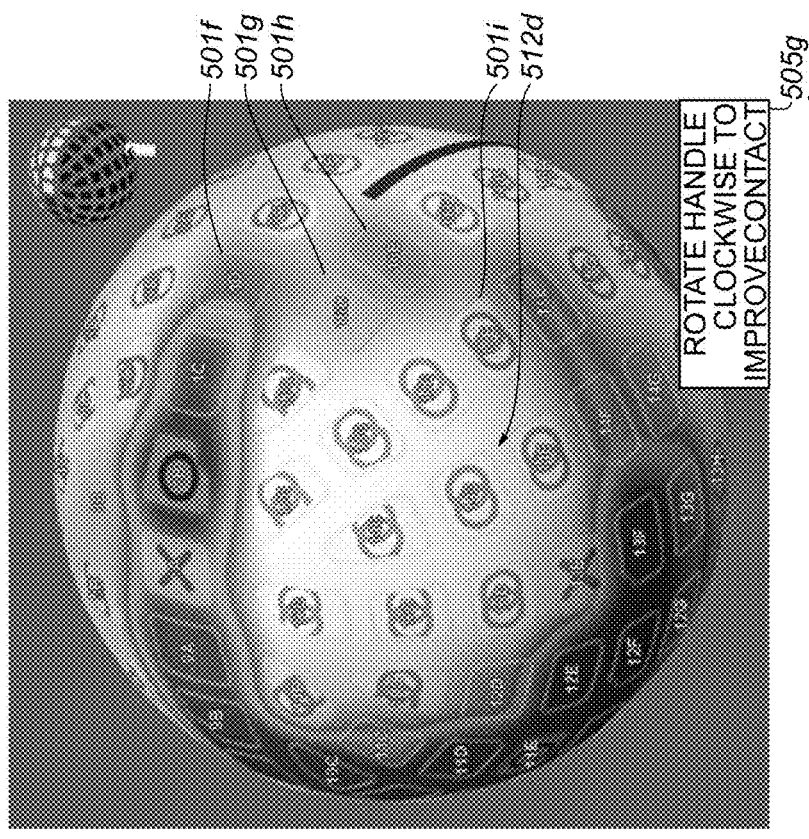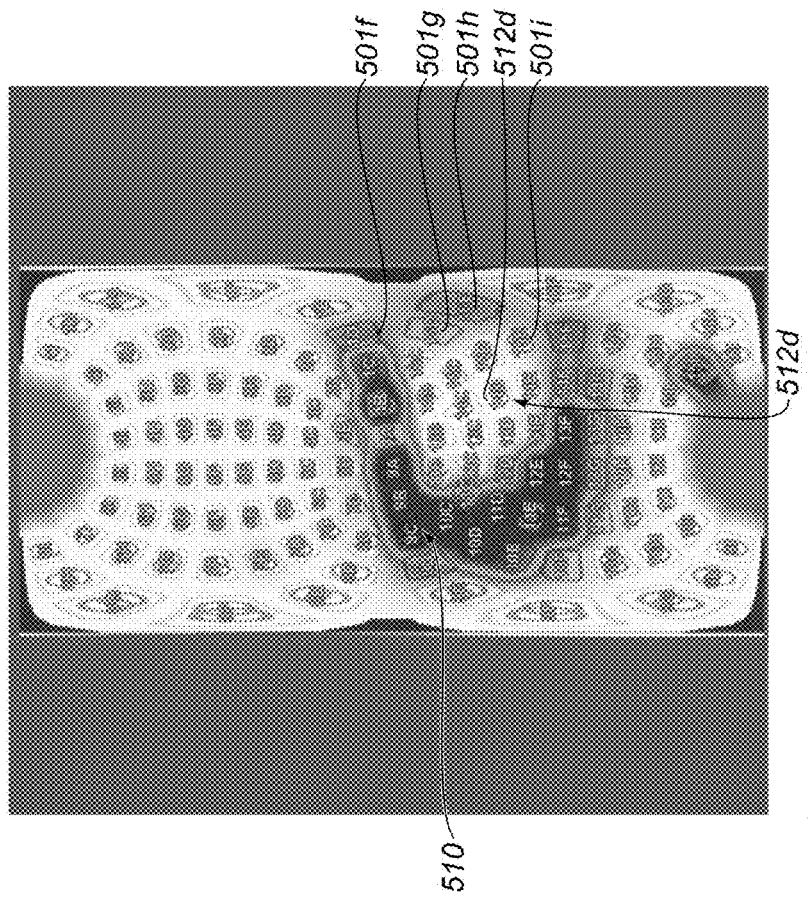
FIG. 5G

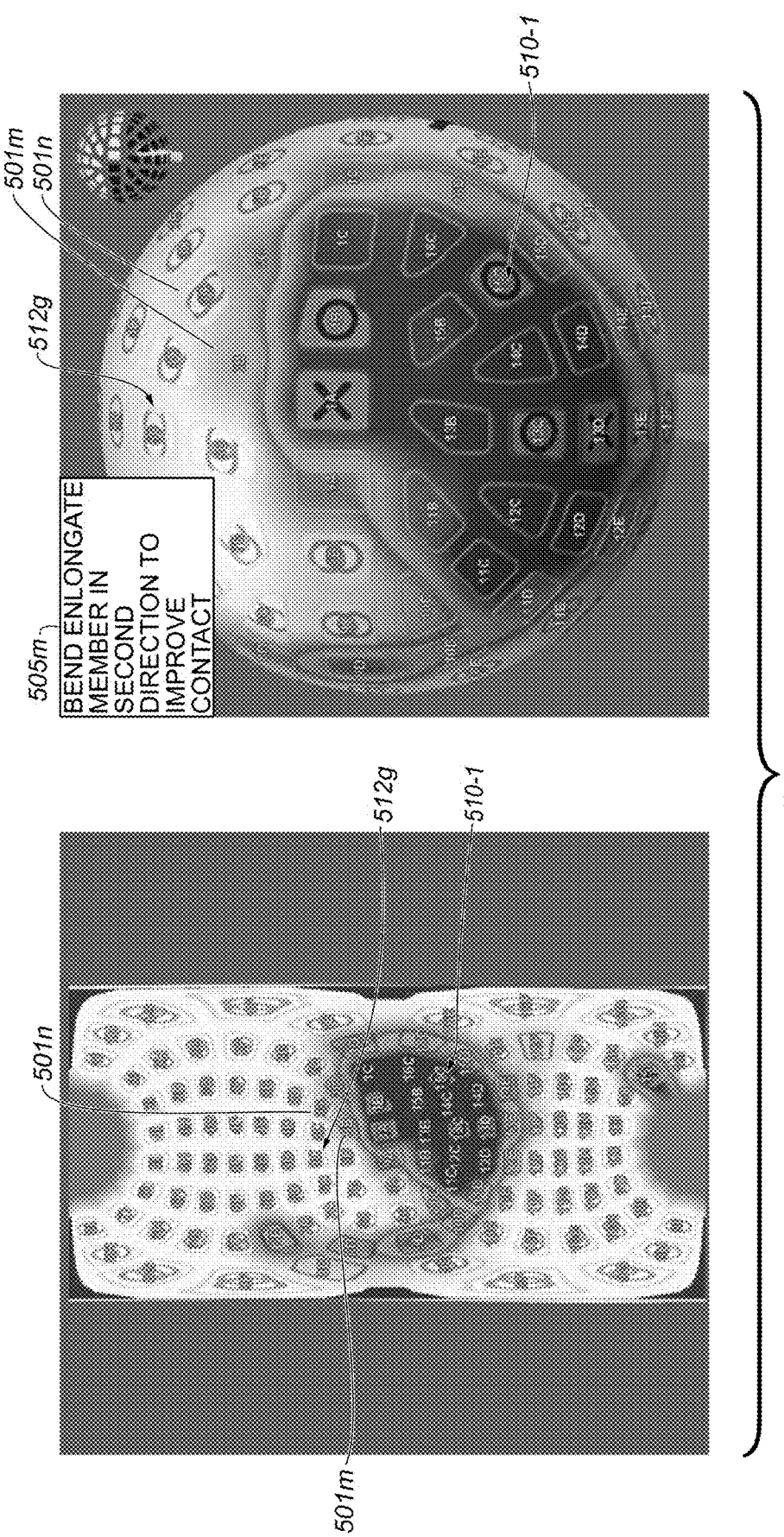

SYSTEMS AND METHODS FOR FACILITATING IMPROVED TRANSDUCER-TO-TISSUE CONTACT

CROSS-REFERENCE TO RELATED APPLICATION

This application claims the benefit of U.S. Provisional Application No. 62/701,084, filed Jul. 20, 2018, the entire disclosure of which is hereby incorporated herein by reference.

TECHNICAL FIELD

Aspects of this disclosure generally are related to systems and methods for improving transducer-to-tissue contact, such systems and methods applicable to, among other things, medical systems.

BACKGROUND

Cardiac surgery was initially undertaken using highly invasive open procedures. A sternotomy, which is a type of incision in the center of the chest that separates the sternum, was typically employed to allow access to the heart. In the past several decades, more and more cardiac operations are performed using intravascular or percutaneous techniques, where access to inner organs or other tissue is gained via a catheter.

Intravascular or percutaneous surgeries benefit patients by reducing surgery risk, complications, and recovery time. However, the use of intravascular or percutaneous technologies also raises some particular challenges. Medical devices used in intravascular or percutaneous surgery need to be deployed via catheter systems which significantly increase the complexity of the device structure. As well, doctors do not have direct visual contact with the medical devices once the devices are positioned within the body.

One example of where intravascular or percutaneous medical techniques have been employed is in the treatment of a heart disorder called atrial fibrillation. Atrial fibrillation is a disorder in which spurious electrical signals cause an irregular heartbeat. Atrial fibrillation has been treated with open heart methods using a technique known as the "Cox-Maze procedure". During this procedure, physicians create specific patterns of lesions in the left or right atria to block various paths taken by the spurious electrical signals. Such lesions were originally created using incisions, but are now typically created by ablating the tissue with various techniques including radio-frequency (RF) energy, microwave energy, laser energy and cryogenic techniques. The procedure is performed with a high success rate despite the lack of direct vision that is provided in open procedures, but is relatively complex to perform intravascularly or percutaneously because of the difficulty in correctly positioning various catheter devices to create the lesions in the correct locations. Various problems, potentially leading to severe adverse results, may occur if the lesions are placed incorrectly. For example, if tissue ablation is attempted by a transducer in a state in which the transducer is not in sufficient contact with tissue, the ablation procedure may generate thermal coagulum (i.e., a clot) in blood, which may lead to stroke or other harm to the patient. It also is particularly important to know the position of the various transducers which will be creating the lesions relative to cardiac features such as the pulmonary veins and mitral valve. The continuity, transmurality, and placement of the lesion patterns that are formed can impact the ability to block paths taken within the heart by spurious electrical signals. The ability to achieve desired lesions is often dependent on correctly manipulating a catheter device to provide sufficient contact between various ones of the transducers and the tissues. Variability associated with various anatomical structures often creates situations in which various transducers are not in sufficient contact with tissue to perform the required lesion sets, and require additional physical manipulation of a catheter device to improve the contact.

The present inventor recognized that the visibility problems associated with percutaneous or intravascular procedures often make it difficult for the health care provider to determine which of a particular set of a plurality of different possible physical manipulations of a catheter device is appropriate to improve tissue contact associated with one or more transducers in a particular transducer set. The present inventor also recognized that a desire to select a particular catheter device manipulation that improves contact between one or more transducers in the particular transducer set and tissue while maintaining adequate contact between other transducers and tissue typically further complicates the selection of a particular physical manipulation of the catheter device to improve tissue contact conditions associated with the particular transducer set. In addition, the present inventor recognized that various imaging systems, such as fluoroscopy systems, often do not readily produce images of tissue in sufficient detail to assess the particular degree of tissue contact associated with a particular transducer. The present inventor further recognized that graphical models, such as those generated from data acquired from electropotential navigation systems or electro-magnetic navigation systems, can provide an image of an anatomical structure, especially when combined with a previously acquired image (e.g., a previously acquired computerized tomography ("CT") or magnetic resonance imaging ("MRI") image), but not in a manner that allows the user to assess the particular degree of tissue contact associated with a particular transducer. For example, inaccuracies associated with these navigation systems often cause a graphical representation of the catheter to often protrude outwardly from the graphical model of the tissue cavity during manipulation of the catheter in the tissue cavity, thereby making it difficult to assess which particular ones of the transducers are actually in contact with the tissue taking into account these inaccuracies. Even if the graphical representation of the catheter does not protrude outwardly from the graphical model of the tissue cavity, it is often difficult to determine if a particular transducer of the catheter is in contact or how the catheter should be manipulated to improve tissue contact.

In this regard, the present inventor recognized that there is a need in the art for improved intra-bodily-cavity transducer-based device systems or control mechanisms thereof to facilitate an improved contact arrangement or configuration between one or more transducers in a particular transducer set and tissue.

SUMMARY

At least the above-discussed need is addressed and technical solutions are achieved by various embodiments of the present invention. In some embodiments, device systems and methods executed by such systems exhibit enhanced capabilities for facilitating improved transducer-to-tissue contact of one or more transducers, which may be located within a bodily cavity, such as an intra-cardiac cavity. In some embodiments, the systems or a portion thereof may be percutaneously or intravascularly delivered to position the various transducers within the bodily cavity. Various ones of the transducers may be activated to distinguish tissue from blood and may be used to deliver positional information of the device relative to various anatomical features in the bodily cavity, such as the pulmonary veins and mitral valve in an atrium. Various ones of the transducers may employ characteristics such as blood flow detection, impedance change detection or deflection force detection to discriminate between blood and tissue. Various ones of the transducers may be used to treat tissue within a bodily cavity. Treatment may include tissue ablation by way of non-limiting example. Various ones of the transducers may be used to stimulate tissue within the bodily cavity. Stimulation can include pacing by way of non-limiting example. Other advantages will become apparent from the teaching herein to those of skill in the art.

According to some embodiments, a system may be summarized as including an input-output device system including a catheter device system, the catheter device system including a plurality of transducers, the plurality of transducers arranged in a distribution, the distribution positionable in a bodily cavity, the bodily cavity defined by at least a tissue wall. According to some embodiments, each transducer of the plurality of transducers may be configured at least to sense a degree of contact between the transducer and the tissue wall. According to some embodiments, the system may include a data processing device system communicatively connected to the input-output device system including to the plurality of transducers of the catheter device system of the input-output device system. According to some embodiments, the system may include a memory device system communicatively connected to the data processing device system and storing a first contact-improvement procedure in association with a first transducer set of the plurality of transducers, the memory device system further storing a program executable by the data processing device system. According to some embodiments, the data processing device system may be configured by the program at least to receive, via the input-output device system, a plurality of degree-of-contact signals respectively from the plurality of transducers, the plurality of degree-of-contact signals respectively indicating a degree of contact between the respective transducer of the plurality of transducers and the tissue wall. According to some embodiments, the data processing device system may be configured by the program at least to identify a particular transducer of the plurality of transducers as belonging to the first transducer set and as exhibiting an improper contact arrangement with the tissue wall as compared to a predetermined tissue-contact state, based at least on an interaction with data associated with at least one of the received degree-of-contact signals. According to some embodiments, the data processing device system may be configured by the program at least to cause the input-output device system, in response to the identifying the particular transducer as belonging to the first transducer set and as exhibiting the improper contact arrangement with the tissue wall as compared to the predetermined tissue-contact state, to provide an indication of the first contact-improvement procedure to facilitate an improved contact arrangement between one or more transducers in the first transducer set and the tissue wall. In some embodiments, the one or more transducers in the first transducer set may include the particular transducer.

In some embodiments, the interaction with the data associated with at least one of the received degree-of-contact signals may include an analysis of the data performed by the data processing device system. In some embodiments, the data processing device system may be configured by the program at least to execute the identification of the particular transducer as exhibiting the improper contact arrangement with the tissue wall as compared to the predetermined tissue-contact state at least by determining, based at least on the analysis of the data, that particular ones of the transducers of the plurality of transducers other than the particular transducer exhibit sufficient contact with the tissue wall while the particular transducer exhibits insufficient contact with the tissue wall. In some embodiments, the data processing device system may be configured by the program at least to execute the identification of the particular transducer as exhibiting the improper contact arrangement with the tissue wall as compared to the predetermined tissue-contact state at least by determining, based at least on the analysis of the data, that particular ones of the transducers of the plurality of transducers other than the particular transducer exhibit sufficient contact with the tissue wall with respect to a particular anatomical feature of the bodily cavity, but that the particular transducer of the plurality of transducers exhibits insufficient contact with the tissue wall with respect to the particular anatomical feature of the bodily cavity. In some embodiments, the interaction with the data associated with at least one of the received degree-of-contact signals may include (a) the data processing device system causing the input-output device system to output a representation of the data in association with an identifier of the particular transducer, and (b) the data processing device system receiving user input via the input-output device system, after outputting the data in association with the identifier of the particular transducer, the user input identifying the particular transducer as exhibiting the improper contact arrangement with the tissue wall.

According to some embodiments, the memory device system may further store a second contact-improvement procedure in association with a second transducer set of the plurality of transducers. In some embodiments, the first transducer set may be mutually exclusive with the second transducer set, and the second contact-improvement procedure may be different than the first contact-improvement procedure. In some embodiments, the first contact-improvement procedure may indicate a procedure to move the plurality of transducers to improve contact between one or more transducers in the first transducer set and the tissue wall. In some embodiments, the second contact-improvement procedure may indicate a procedure to move the plurality of transducers to improve contact between one or more transducers in the second transducer set and the tissue wall. In some embodiments, the moving of the plurality of transducers in accordance with the procedure of the second contact-improvement procedure may be different than the moving of the plurality of transducers in accordance with the procedure of the first contact-improvement procedure.

In some embodiments, the catheter device system includes an elongate shaft member includes a proximal end portion and a distal end portion, the catheter device system including a structure physically coupled to the distal end portion of the elongate shaft member, the plurality of transducers arranged on the structure, the structure configurable in a deployed configuration configured to arrange the plurality of transducers in the distribution, and the structure including a first portion and a second portion. In some embodiments, the first transducer set may be located on the first portion of the structure and the second transducer set may be located on the second portion of the structure in a state in which the structure is in the deployed configuration. According to some embodiments, the first contact-improvement procedure may include a first movement of a first movement type that is in a different direction than a second movement of the first movement type included in the second contact-improvement procedure. In some embodiments, the first movement may be a movement of at least part of the catheter device system, and the second movement may be a movement of the at least part of the catheter device system. In some embodiments, the second portion of the structure may oppose the first portion of the structure in the state in which the structure is in the deployed configuration. In some embodiments, the part of the catheter device system may be the structure, and the first movement type may be a rotational movement. In some embodiments, the part of the catheter device system may be the structure, and the first movement type may be a translational movement. In some embodiments, the part of the catheter device system may be the distal end portion of the elongate shaft member of the catheter device system, and the first movement type may be a bending movement.

According to some embodiments, the structure is selectively moveable between a delivery configuration and the deployed configuration, and the structure may be configured to be deliverable first portion ahead of the second portion to the bodily cavity in a state in which the structure is in the delivery configuration.

In some embodiments, the second portion of the structure may oppose the first portion of the structure in the state in which the structure is in the deployed configuration. In some embodiments, the transducers of the plurality of transducers are circumferentially arranged about an axis of the structure in the state in which the structure is in the deployed configuration, and the axis may intersect both the first portion of the structure and the second portion of the structure in the state in which the structure is in the deployed configuration. In some embodiments, the transducers of the plurality of transducers are circumferentially arranged about an axis of the structure in the state in which the structure is in the deployed configuration, and the first portion of the structure and the second portion of the structure may be located on opposite sides of a plane in the state in which the structure is in the deployed configuration, the axis residing in the plane. In some embodiments, the first portion of the structure may include a first domed shape in the state in which the structure is in the deployed configuration, and the second portion of the structure may include a second domed shape in the state in which the structure is in the deployed configuration, the second domed shape opposing the first domed shape in the state in which the structure is in the deployed configuration.

According to some embodiments, the memory device system may further store a second contact-improvement procedure in association with a second transducer set of the plurality of transducers. In some embodiments, the first transducer set may be mutually exclusive with the second transducer set, and the second contact-improvement procedure may be different than the first contact-improvement procedure. In some embodiments, the catheter device system includes an elongate shaft member comprising a proximal end portion and a distal end portion, the catheter device system including a structure physically coupled to the distal end portion of the elongate shaft member, the plurality of transducers arranged on the structure, the structure configurable in a deployed configuration configured to arrange the plurality of transducers in the distribution, and the structure including a first portion and a second portion. In some embodiments, the first transducer set may be located on the first portion of the structure, and the second transducer set may be located on the second portion of the structure in a state in which the structure is in the deployed configuration. In some embodiments, the first contact-improvement procedure may include a first set of one or more movement types of a plurality of movement types, and the second contact-improvement procedure may include a second set of one or more movement types of the plurality of movement types. In some embodiments, the second contact-improvement procedure may not include or may exclude at least one movement type included in the first contact-improvement procedure. In some embodiments, the second portion of the structure may oppose the first portion of the structure in the state in which the structure is in the deployed configuration. In some embodiments, (a) the first set of one or more movement types, (b) the second set of one or more movement types, or both (a) and (b) may include a rotational movement of at least the structure. In some embodiments, (a) the first set of one or more movement types, (b) the second set of one or more movement types, or both (a) and (b) may include a translational movement of at least the structure. In some embodiments, (a) the first set of one or more movement types, (b) the second set of one or more movement types, or both (a) and (b) may include a bending movement of at least the distal end portion of the elongate shaft member of the catheter device system.

According to some embodiments, the memory device system may further store a second contact-improvement procedure in association with a second transducer set of the plurality of transducers, the first transducer set mutually exclusive with the second transducer set, the second contact-improvement procedure different than the first contact-improvement procedure. In some embodiments, the catheter device system includes an elongate shaft member including a proximal end portion and a distal end portion, the plurality of transducers physically coupled to the distal end portion. According to some embodiments, the first contact-improvement procedure may include a first translational-movement procedure to translate at least part of the elongate shaft member to improve contact between one or more transducers in the first transducer set and the tissue wall, and the second contact-improvement procedure may include a second translational-movement procedure to translate at least part of the elongate shaft member to improve contact between one or more transducers in the second transducer set and the tissue wall. In some embodiments, the first translational-movement procedure may be different than the second translational-movement procedure. In some embodiments, the catheter device system may include an elongate shaft member including a proximal end portion, a distal end portion to which the transducers of the plurality of transducers are physically coupled, and a longitudinal axis extending between the proximal end portion and the distal end portion. According to some embodiments, the first contact-improvement procedure may include a first rotational-movement procedure to rotate at least the first transducer set about the longitudinal axis to improve contact between one or more transducers in the first transducer set and the tissue wall, and the second contact-improvement procedure may include a second rotational-movement procedure to rotate at least the second transducer set about the longitudinal axis to improve contact between one or more transducers in the second transducer set and the tissue wall. In some embodiments, the first rotational-movement procedure may be different than the second rotational-movement procedure. In some embodiments, the transducers of the plurality of transducers are circumferentially arranged about an axis, the first contact-improvement procedure may include a first rotational-movement procedure to rotate at least the first transducer set about the axis to improve contact between one or more transducers in the first transducer set and the tissue wall, and the second contact-improvement procedure may include a second rotational-movement procedure to rotate at least the second transducer set about the axis to improve contact between one or more transducers in the second transducer set and the tissue wall. In some embodiments, the first rotational-movement procedure may be different than the second rotational-movement procedure. In some embodiments, the catheter device system may include an elongate shaft member including a proximal end portion and a distal end portion to which the plurality of transducers are physically coupled, the first contact-improvement procedure may include a first bending-movement procedure to bend at least a part of the elongate shaft member to improve contact between one or more transducers in the first transducer set and the tissue wall, and the second contact-improvement procedure may include a second bending-movement procedure to bend at least a part of the elongate shaft member to improve contact between one or more transducers in the second transducer set and the tissue wall. In some embodiments, the first bending-movement procedure may be different than the second bending-movement procedure.

According to some embodiments, at least some of the plurality of degree-of-contact signals may indicate that the particular transducer exhibits insufficient contact with the tissue wall concurrently with at least a second transducer of the plurality of transducers exhibiting sufficient contact with the tissue wall.

According to some embodiments, the input-output device system includes a display device system and the data processing device system is communicatively connected to the display device system. In some embodiments, the data processing device system may be configured by the program at least to cause the display device system to display a graphical representation including a visual presentation of contact information representative of at least some of the plurality of degree-of-contact signals. In some embodiments, the data processing device system may be configured by the program at least to receive a second plurality of degree-of-contact signals respectively from the plurality of transducers, the second plurality of degree-of-contact signals respectively indicating a degree of contact between the respective transducer of the plurality of transducers and the tissue wall in a state after execution of the first contact-improvement procedure; and cause the display device system to update the graphical representation to include a visual presentation of updated contact information representative of at least some of the second plurality of degree-of-contact signals, the visual presentation of the updated contact information indicating improved contact between the particular transducer and the tissue wall as compared to the visual presentation of the contact information. In some embodiments, the provided indication of the first contact-improvement procedure may include a visual presentation, provided by the display device system, of the indication of the first contact-improvement procedure. In some embodiments, the visual presentation of the first contact-improvement procedure may include visually presenting, via the display device system, (a) one or more text-based instructions indicating at least part of the first contact-improvement procedure, (b) one or more graphic symbol-based instructions indicating at least part of the first contact-improvement procedure, (c) one or more graphical animations indicating at least part of the first contact-improvement procedure, (a) and (b), (a) and (c), (b) and (c), or (a), (b), and (c). In some embodiments, the visual presentation of the indication of the first contact-improvement procedure may be displayed at least proximate a graphical representation of the particular transducer of the plurality of transducers. In some embodiments, the graphical representation including the visual presentation of contact information representative of at least some of the plurality of degree-of-contact signals may be displayed with a particular spatial distribution among visually presented elements of the contact information that is consistent with a spatial distribution of the respective transducers of the plurality of transducers providing the respective degree-of-contact signals of the at least some of the plurality of degree-of-contact signals during a sensing of contact between the respective transducers of the plurality of transducers and the tissue wall. In some embodiments, the visual presentation of contact information representative of at least some of the plurality of degree-of-contact signals may include a respective visual presentation of an element of the contact information corresponding to a respective signal of the at least some of the plurality of degree-of-contact signals, each respective visual presentation of an element of the contact information displayed at least proximate a graphical representation of the respective transducer of the plurality of transducers that provided the respective signal of the at least some of the plurality of degree-of-contact signals.

In some embodiments, the input-output device system includes an audio-producing device system communicatively connected to the data processing device system, and the provided indication of the first contact-improvement procedure may include audible instructions indicating at least part of the first contact-improvement procedure.

In some embodiments, the improper contact arrangement between the particular transducer and the tissue wall may be an insufficient contact between the particular transducer and the tissue wall for at least the particular transducer to perform tissue ablation on the tissue wall.

Various embodiments of the present invention may include systems, devices, or machines that are or include combinations or subsets of any one or more of the systems, devices, or machines and associated features thereof summarized above or otherwise described herein.

Further, all or part of any one or more of the systems, devices, or machines summarized above or otherwise described herein or combinations or sub-combinations thereof may implement or execute all or part of any one or more of the processes or methods described herein or combinations or sub-combinations thereof.

For example, in some embodiments, a method may be executed by a data processing device system according to a program stored by a memory device system communicatively connected to the data processing device system, the data processing device system further communicatively connected to an input-output device system including being communicatively connected to a plurality of transducers of a catheter device system of the input-output device system, the plurality of transducers arranged in a distribution, the distribution positionable in a bodily cavity, the bodily cavity defined by at least a tissue wall, and each transducer of the plurality of transducers configured at least to sense a degree of contact between the transducer and the tissue wall. According to various embodiments, the method may be summarized as including receiving, via the input-output device system, a plurality of degree-of-contact signals respectively from the plurality of transducers, the plurality of degree-of-contact signals respectively indicating a degree of contact between the respective transducer of the plurality of transducers and the tissue wall. In some embodiments, the method may include identifying a particular transducer of the plurality of transducers as belonging to a first transducer set of the plurality of transducers and as exhibiting an improper contact arrangement with the tissue wall as compared to a predetermined tissue-contact state based at least on an interaction with data associated with at least one of the received degree-of-contact signals. In some embodiments, the method may include causing the input-output device system, in response to the identifying the particular transducer as belonging to the first transducer set and as exhibiting the improper contact arrangement with the tissue wall as compared to the predetermined tissue-contact state, to provide an indication of a first contact-improvement procedure to facilitate an improved contact arrangement between one or more transducers in the first transducer set and the tissue wall, the first contact-improvement procedure stored by the memory device system in association with the first transducer set.

It should be noted that various embodiments of the present invention include variations of the methods or processes summarized above or otherwise described herein (including the figures) and, accordingly, are not limited to the actions described or shown in the figures or their ordering, and not all actions shown or described are required, according to various embodiments. According to various embodiments, such methods may include more or fewer actions and different orderings of actions. Any of the features of all or part of any one or more of the methods or processes summarized above or otherwise described herein (including the figures) may be combined with any of the other features of all or part of any one or more of the methods or processes summarized above or otherwise described herein or shown in the figures.

In addition, a computer program product may be provided that comprises program code portions for performing some or all of any one or more of the methods or processes and associated features thereof described herein, when the computer program product is executed by a computer or other computing device or device system. Such a computer program product may be stored on one or more computer-readable storage mediums or medium systems, also referred to as one or more computer-readable data storage mediums or medium systems.

In some embodiments, a computer-readable storage medium system may be summarized as including one or more computer-readable storage mediums storing a program executable by one or more data processing devices of a data processing device system communicatively connected to an input-output device system including being communicatively connected to a plurality of transducers of a catheter device system of the input-output device system, the plurality of transducers arranged in a distribution, the distribution positionable in a bodily cavity, the bodily cavity defined by at least a tissue wall, and each transducer of the plurality of transducers configured at least to sense a degree of contact between the transducer and the tissue wall. In some embodiments, the program may include a signal reception module configured to cause the data processing device system to receive, via the input-output device system, a plurality of degree-of-contact signals respectively from the plurality of transducers, the plurality of degree-of-contact signals respectively indicating a degree of contact between the respective transducer of the plurality of transducers and the tissue wall. In some embodiments, the program may include an identification module configured to cause the data processing device system to identify a particular transducer of the plurality of transducers as belonging to a first transducer set of the plurality of transducers and as exhibiting an improper contact arrangement with the tissue wall as compared to a predetermined tissue-contact state based at least on an interaction with data associated with at least one of the received degree-of-contact signals. In some embodiments, the program may include a contact-improvement module configured to cause the data processing device system to cause the input-output device system, in response to the identification of the particular transducer as belonging to the first transducer set and as exhibiting the improper contact arrangement with the tissue wall as compared to the predetermined tissue-contact state, to provide an indication of a first contact-improvement procedure to facilitate an improved contact arrangement between one or more transducers in the first transducer set and the tissue wall, the first contact-improvement procedure stored by the computer-readable storage medium system in association with the first transducer set.

In some embodiments, each of any of one or more of the computer-readable data storage medium systems (also referred to as processor-accessible memory device systems) described herein is a non-transitory computer-readable (or processor-accessible) data storage medium system (or memory device system) including or consisting of one or more non-transitory computer-readable (or processor-accessible) storage mediums (or memory devices) storing the respective program(s) which may configure a data processing device system to execute some or all of any of one or more of the methods or processes described herein.

Further, any of all or part of one or more of the methods or processes and associated features thereof discussed herein may be implemented or executed by all or part of a device system, apparatus, or machine, such as all or a part of any of one or more of the systems, apparatuses, or machines described herein or a combination or sub-combination thereof.

BRIEF DESCRIPTION OF THE DRAWINGS

It is to be understood that the attached drawings are for purposes of illustrating aspects of various embodiments and may include elements that are not to scale.

FIG. 3G illustrates an action to facilitate improved tissue contact of at least one transducer of a catheter device system by counterclockwise rotation of an elongate shaft member of the catheter device system, according to some embodiments.

FIG. 3H illustrates an action to facilitate improved tissue contact of at least one transducer of a catheter device system by clockwise rotation of an elongate shaft member of the catheter device system, according to some embodiments.

FIG. 3I illustrates potential actions to facilitate improved tissue contact of at least one transducer of a catheter device system by bending of an elongate shaft member of the catheter device system, according to some embodiments.

FIG. 5D includes a graphical interface providing a graphical representation similar to that of FIG. 5C, but illustrates improved tissue contact for at least the particular transducer from FIG. 5C, as compared to the tissue contact state of FIG. 5C, upon execution of a tissue contact improvement procedure including retraction of an elongate shaft member of a catheter device system, the tissue contact improvement procedure particularly associated with the tissue contact state of FIG. 5C, according to some embodiments.

FIG. 5G includes a graphical interface providing a graphical representation similar to that of FIG. 5A, but indicates another state in which at least a particular transducer exhibits insufficient tissue contact to form a proper continuous circumferential lesion around a second pulmonary vein, according to some embodiments.

FIG. 5M includes a graphical interface providing a graphical representation similar to that of FIG. 5A, but indicates a state in which at least a particular transducer exhibits insufficient tissue contact to form a proper contiguous lesion region on a tissue wall, according to some embodiments.

DETAILED DESCRIPTION

Figure 1:
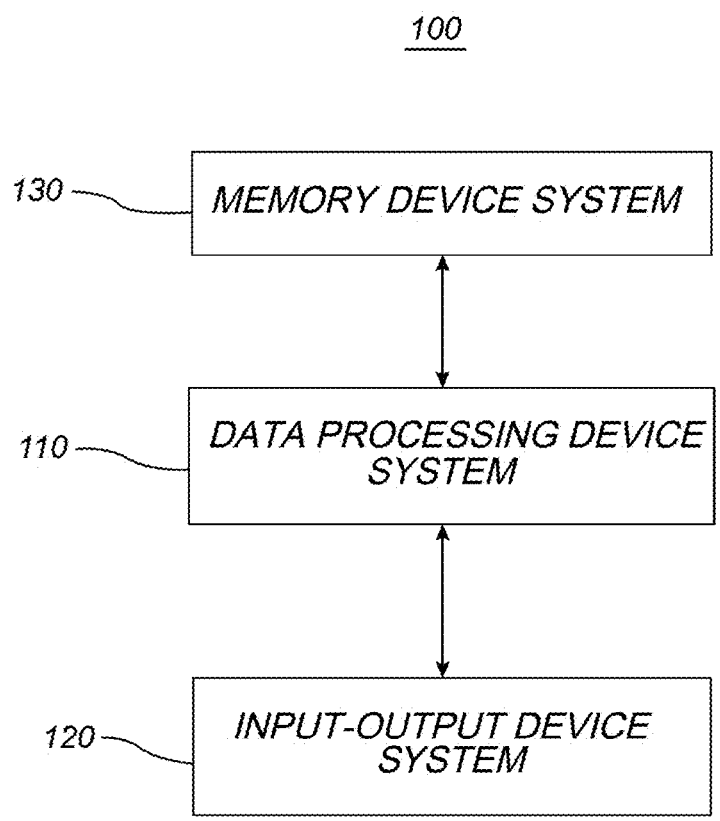
FIG. 1 includes a schematic representation of a transducer-activation system according to various example embodiments, the transducer-activation system including a data processing device system, an input-output device system, and a memory device system.

At least some embodiments of the present invention improve upon percutaneous medical procedures by providing systems and methods for facilitating improved transducer-to-tissue contact according to various embodiments of the present invention. For instance, as discussed above, percutaneous surgeries are difficult with their inherent reduced visibility within the body and of the medical device, especially when attempting to perform percutaneous tissue ablation where sufficient transducer-to-tissue contact is important not only to facilitate proper tissue ablation, but also to reduce the risk of forming thermal coagulum in blood. Accordingly, the present inventor recognized that a need in the art exists for systems and methods that facilitate the improvement of transducer-to-tissue contact when a condition of insufficient contact is identified.

Utilizing transducer-based device geometry and through various trials and device testing, the present inventor has identified device movements that tend to improve transducer-to-tissue contact for particular transducer sets. With this information, the present inventor recognized benefits including that procedure efficacy could be increased and procedure duration could be decreased in systems and methods that are configured to identify a particular transducer-to-tissue contact configuration, to associate that identified contact configuration with a corresponding transducer-to-tissue contact improvement procedure for that identified contact configuration, and to facilitate execution of the corresponding transducer-to-tissue contact improvement procedure to help improve transducer-to-tissue contact for a particular therapeutic procedure, such as, but not limited to, tissue ablation, according to some embodiments. Various embodiments of the present invention that achieve these and other benefits and features are described herein. For example, according to some embodiments of the present invention, a data processing device system is configured by a program to facilitate execution of the corresponding transducer-to-tissue contact improvement procedure at least by visually presenting, via a display device system, an image or animation of catheter device controls indicating how such controls should be manipulated by a health care provider to achieve the improved tissue contact arrangement or configuration. In some embodiments, a dialog box is visually presented by the display device system describing the tissue contact improvement procedure for the identified contact configuration. It should be noted that the invention is not limited to these or any other examples provided herein, which are referred to for purposes of illustration only.

In this regard, in the descriptions herein, certain specific details are set forth in order to provide a thorough understanding of various embodiments of the invention. However, one skilled in the art will understand that the invention may be practiced at a more general level without one or more of these details. In other instances, well-known structures have not been shown or described in detail to avoid unnecessarily obscuring descriptions of various embodiments of the invention.

Any reference throughout this specification to "one embodiment", "an embodiment", "an example embodiment", "an illustrated embodiment", "a particular embodiment", and the like means that a particular feature, structure or characteristic described in connection with the embodiment is included in at least one embodiment. Thus, any appearance of the phrase "in one embodiment", "in an embodiment", "in an example embodiment", "in this illustrated embodiment", "in this particular embodiment", or the like in this specification is not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more. For example, the phrase, "a set of objects" means one or more of the objects. In addition, unless otherwise explicitly noted or required by context, the word "subset" is intended to mean a set having the same or fewer elements of those present in the subset's parent or superset.

Further, the phrase "at least" is or may be used herein at times merely to emphasize the possibility that other elements may exist besides those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least on A' includes A as well as the possibility of one or more other additional elements besides A. In the same manner, the phrase, 'based on A' includes A, as well as the possibility of one or more other additional elements besides A. However, the phrase, 'based only on A' includes only A. Similarly, the phrase 'configured at least to A' includes a configuration to perform A, as well as the possibility of one or more other additional actions besides A. In the same manner, the phrase 'configured to A' includes a configuration to perform A, as well as the possibility of one or more other additional actions besides A. However, the phrase, 'configured only to A' means a configuration to perform only A.

The word "ablation" as used in this disclosure should be understood to include, for example, any disruption to certain properties of tissue. Most commonly, the disruption is to the electrical conductivity and is achieved by heating, which can be generated with resistive or radio-frequency (RF) techniques for example. However, any other technique for such disruption may be included when the term "ablation" is used, such as mechanical, chemical, electroporation or optical techniques. Various catheters described in this disclosure may, in some embodiments, be employed to deliver ablative energy.

The word "fluid" as used in this disclosure should be understood to include any fluid that can be contained within a bodily cavity or can flow into or out of, or both into and out of a bodily cavity via one or more bodily openings positioned in fluid communication with the bodily cavity. In the case of cardiac applications, fluid such as blood will flow into and out of various intra-cardiac cavities (e.g., a left atrium or right atrium).

The phrase "bodily opening" as used in this disclosure should be understood to include, for example, a naturally occurring bodily opening or channel or lumen; a bodily opening or channel or lumen or perforation formed by an instrument or tool using techniques that can include, but are not limited to, mechanical, thermal, electrical, chemical, and exposure or illumination techniques; a bodily opening or channel or lumen formed by trauma to a body; or various combinations of one or more of the above. Various elements having respective openings, lumens or channels and positioned within the bodily opening (e.g., a catheter sheath or catheter introducer) may be present in various embodiments. These elements may provide a passageway through a bodily opening for various devices employed in various embodiments.

The phrase "bodily cavity" as used in this disclosure should be understood to mean a cavity in a body. The bodily cavity may be a cavity provided in a bodily organ (e.g., an intra-cardiac cavity or chamber of a heart). The bodily cavity may be provided by a bodily vessel.

The word "tissue" as used in some embodiments in this disclosure should be understood to include any surface-forming tissue that is used to form a surface of a body or a surface within a bodily cavity, a surface of an anatomical feature or a surface of a feature associated with a bodily opening positioned in fluid communication with the bodily cavity. The tissue can include part or all of a tissue wall or membrane that defines a surface of the bodily cavity. In this regard, the tissue can form an interior surface of the cavity that surrounds a fluid (e.g., blood) within the cavity. In the case of cardiac applications, tissue can include tissue used to form an interior surface of an intra-cardiac cavity such as a left atrium or right atrium.

The term "transducer" as used in this disclosure should be interpreted broadly as any device capable of distinguishing between fluid and tissue, sensing temperature, creating heat, ablating tissue, sensing, sampling or measuring electrical activity of a tissue surface (e.g., sensing, sampling or measuring intra-cardiac electrograms, or sensing, sampling or measuring intra-cardiac voltage data), stimulating tissue, or any combination thereof. A transducer can convert input energy of one form into output energy of another form. Without limitation, a transducer can include an electrode that functions as, or as part of, a sensing device included in the transducer, an energy delivery device included in the transducer, or both a sensing device and an energy delivery device included in the transducer. A transducer may be constructed from several parts, which may be discrete components or may be integrally formed. In this regard, although transducers, electrodes, or both transducers and electrodes are referenced with respect to various embodiments, it is understood that other transducers or transducer elements may be employed in other embodiments. It is understood that a reference to a particular transducer in various embodiments may also imply a reference to an electrode, as an electrode may be part of the transducer as shown, e.g., with FIG. 4 discussed below.

The term "activation" as used in this disclosure should be interpreted broadly as making active a particular function as related to various transducers disclosed in this disclosure. Particular functions may include, but are not limited to, tissue ablation, sensing, sampling or measuring electrophysiological activity (e.g., sensing, sampling or measuring intra-cardiac electrogram information or sensing, sampling or measuring intra-cardiac voltage data), sensing, sampling or measuring temperature and sensing, sampling or measuring electrical characteristics (e.g., tissue impedance or tissue conductivity). For example, in some embodiments, activation of a tissue ablation function of a particular transducer is initiated by causing energy sufficient for tissue ablation from an energy source device system to be delivered to the particular transducer. Alternatively, in this example, the activation can be deemed to be initiated when the particular transducer causes a temperature sufficient for the tissue ablation due to the energy provided by the energy source device system. Also, in this example, the activation can last for a duration of time concluding when the ablation function is no longer active, such as when energy sufficient for the tissue ablation is no longer provided to the particular transducer. Alternatively, in this example, the activation period can be deemed to be concluded when the temperature caused by the particular transducer is below the temperature sufficient for the tissue ablation. In some contexts, however, the word "activation" can merely refer to the initiation of the activating of a particular function, as opposed to referring to both the initiation of the activating of the particular function and the subsequent duration in which the particular function is active. In these contexts, the phrase or a phrase similar to "activation initiation" may be used.

The phrase "derivative thereof" and the like is or may be used herein in the context of a derivative of data or information merely to emphasize the possibility that such data or information may be modified or subject to one or more operations. For example, if a device generates first data for display, the process of converting the generated first data into a format capable of being displayed may alter the first data. This altered form of the first data may be considered a derivative of the first data. For instance, the first data may be a one-dimensional array of numbers, but the display of the first data may be a color-coded bar chart representing the numbers in the array. For another example, if the above-mentioned first data is transmitted over a network, the process of converting the first data into a format acceptable for network transmission or understanding by a receiving device may alter the first data. As before, this altered form of the first data may be considered a derivative of the first data. For yet another example, generated first data may undergo a mathematical operation, a scaling, or a combining with other data to generate other data that may be considered derived from the first data. In this regard, it can be seen that data is commonly changing in form or being combined with other data throughout its movement through one or more data processing device systems, and any reference to information or data herein is intended to include these and like changes, regardless of whether or not the phrase "derivative thereof" or the like is used in reference to the information or data, unless otherwise required by context. As indicated above, usage of the phrase "or a derivative thereof" or the like merely emphasizes the possibility of such changes. Accordingly, the addition of or deletion of the phrase "or a derivative thereof" or the like should have no impact on the interpretation of the respective data or information. For example, the above-discussed color-coded bar chart may be considered a derivative of the respective first data or may be considered the respective first data itself.

The term "program" in this disclosure should be interpreted as a set of instructions or modules that may be executed by one or more components in a system, such as a controller system or data processing device system, in order to cause the system to perform one or more operations. The set of instructions or modules may be stored by any kind of memory device, such as those described subsequently with respect to the memory device system 130, 330, or both, shown in FIG. 1 and some of FIGS. 3, respectively. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). Such descriptions should be deemed to be equivalent to describing that the instructions or modules are configured to cause the performance of the action. The word "module" may be defined as a set of instructions. The word "program" and the word "module" may each be interpreted to include multiple sub-programs or multiple sub-modules, respectively. In this regard, reference to a program or a module may be considered to refer to multiple programs or multiple modules.

Further, it is understood that information or data may be operated upon, manipulated, or converted into different forms as it moves through various devices or workflows. In this regard, unless otherwise explicitly noted or required by context, it is intended that any reference herein to information or data includes modifications to that information or data. For example, "data X" may be encrypted for transmission, and a reference to "data X" is intended to include both its encrypted and unencrypted forms, unless otherwise required or indicated by context. For another example, "image information Y" may undergo a noise filtering process, and a reference to "image information Y" is intended to include both the pre-processed form and the noise-filtered form, unless otherwise required or indicated by context. In other words, both the pre-processed form and the noise-filtered form are considered to be "image information Y", unless otherwise required or indicated by context. In order to stress this point, the phrase "or a derivative thereof" or the like may be used herein. Continuing the preceding example, the phrase "image information Y or a derivative thereof" refers to both the pre-processed form and the noise-filtered form of "image information Y", unless otherwise required or indicated by context, with the noise-filtered form potentially being considered a derivative of "image information Y". However, non-usage of the phrase "or a derivative thereof" or the like nonetheless includes derivatives or modifications of information or data just as usage of such a phrase does, as such a phrase, when used, is merely used for emphasis.

The word "device", the word "machine", and the phrase "device system" all are intended to include one or more physical devices or sub-devices (e.g., pieces of equipment) that interact to perform one or more functions. The word "device" may equivalently be referred to as a "device system" in some embodiments.

In some embodiments, the term "adjacent", the term "proximate", and the like refer at least to a sufficient closeness between the objects defined as adjacent, proximate, or the like, to allow the objects to interact in a designated way. For example, if object A performs an action on an adjacent or proximate object B, objects A and B would have at least a sufficient closeness to allow object A to perform the action on object B. In this regard, some actions may require contact between the associated objects, such that if object A performs such an action on an adjacent or proximate object B, objects A and B would be in contact, for example, in some instances or embodiments where object A needs to be in contact with object B to successfully perform the action. In some embodiments, the term "adjacent", the term "proximate", and the like additionally or alternatively refer to objects that do not have another substantially similar object between them. For example, object A and object B could be considered adjacent or proximate if they contact each other (and, thus, it could be considered that no other object is between them), or if they do not contact each other but no other object that is substantially similar to object A, object B, or both objects A and B, depending on the embodiment, is between them. In some embodiments, the term "adjacent", the term "proximate", and the like additionally or alternatively refer to at least a sufficient closeness between the objects defined as adjacent, proximate, and the like, the sufficient closeness being within a range that does not place any one or more of the objects into a different or dissimilar region, or does not change an intended function of any one or more of the objects or of an encompassing object that includes a set of the objects. Different embodiments of the present invention adopt different ones or combinations of the above definitions. Of course, however, the term "adjacent", the term "proximate", and the like are not limited to any of the above example definitions, according to some embodiments. In addition, the term "adjacent" and the term "proximate" do not have the same definition, according to some embodiments.

Further, the phrase "in response to" may be used in this disclosure. For example, this phrase may be used in the following context, where an event A occurs in response to the occurrence of an event B. In this regard, such phrase includes, for example, that at least the occurrence of the event B causes or triggers the event A.

Further, the phrase "graphical representation" used herein is intended to include a visual representation presented via a display device system and may include computer-generated text, graphics, animations, or one or more combinations thereof, which may include one or more visual representations originally generated, at least in part, by an image-capture device, such as CT scan images, MRI images, or images created from a navigation system (e.g., electropotential navigation system or an electro-magnetic navigation system). Further still, example methods are described herein with respect to FIG. 6. Such figures are described to include blocks associated with computer-executable instructions. It should be noted that the respective instructions associated with any such blocks herein need not be separate instructions and may be combined with other instructions to form a combined instruction set. The same set of instructions may be associated with more than one block. In this regard, the block arrangement shown in method FIG. 6 herein is not limited to an actual structure of any program or set of instructions or required ordering of method tasks, and such method FIG. 6, according to some embodiments, merely illustrates the tasks that instructions are configured to perform, for example upon execution by a data processing device system in conjunction with interactions with one or more other devices or device systems.

FIG. 1 schematically illustrates a special purpose transducer selection, activation, or selection and activation system 100 that may be employed to at least select, control, activate, or monitor a function or activation of one or more transducers, according to some embodiments. The system 100 includes a data processing device system 110, an input-output device system 120, and a processor-accessible memory device system 130. The processor-accessible memory device system 130 and the input-output device system 120 are communicatively connected to the data processing device system 110.

Figure 6:
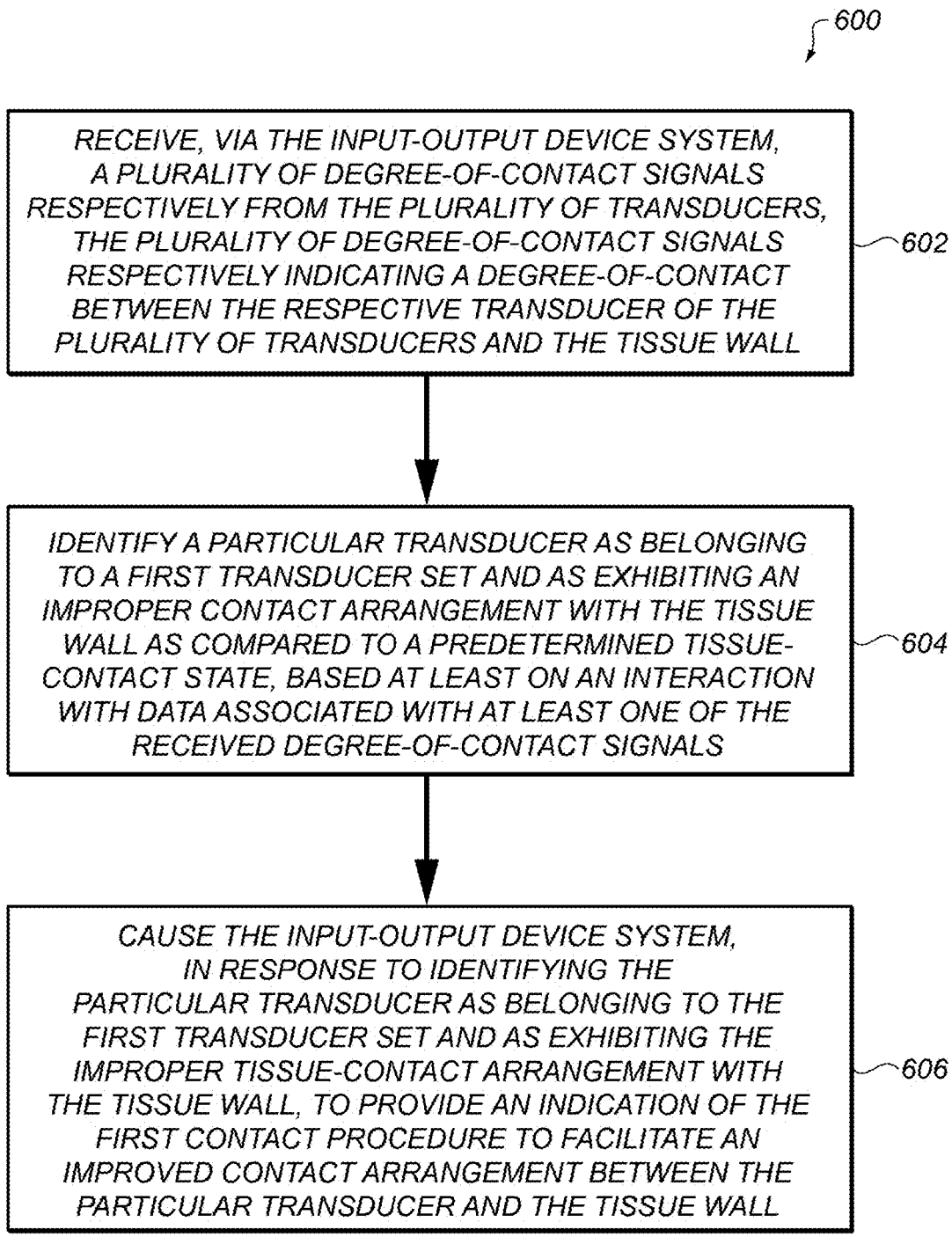
FIG. 6 illustrates methods of improving transducer-to-tissue contact, according to various embodiments.

The data processing device system 110 may include one or more data processing devices that implement or execute, in conjunction with other devices, such as those in the system 100, methods of various embodiments of the present invention, including the example methods of FIG. 6 described herein. Each of the phrases "data processing device", "data processor", "processor", and "computer" and the like is intended to include any data processing device, such as a central processing unit ("CPU"), a desktop computer, a laptop computer, a mainframe computer, a tablet computer such as an iPad (Trademark Apple Inc., Cupertino California), a personal digital assistant, a cellular phone, a smartphone, or any other device for processing data, managing data, or handling data, whether implemented with electrical, magnetic, optical, quantum, biological components, or otherwise.

The memory device system 130 includes one or more processor-accessible memory devices configured to store program instructions and other information, including the information and program instructions needed to execute the methods of various embodiments, including the example methods of FIG. 6 described herein. In this regard, each of the blocks illustrated in the example methods of FIG. 6 may represent program instructions stored in the memory device system 130 and configured to cause execution of the respective operation. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" and the like is intended to include any processor-accessible data storage device or medium, whether volatile or nonvolatile, electronic, magnetic, optical, or otherwise, including but not limited to, registers, floppy disks, hard disks, Compact Discs, DVDs, flash memories, ROMs, and RAMs. In some embodiments, each of the phrases "processor-accessible memory" and "processor-accessible memory device" is intended to include or be a processor-accessible (or computer-readable) data storage medium. In some embodiments, each of the phrases "processor-accessible memory" and "processor-accessible memory device" is intended to include or be a non-transitory processor-accessible (or computer-readable) data storage medium. In some embodiments, the processor-accessible memory device system 130 may be considered to include or be a non-transitory processor-accessible (or computer-readable) data storage medium system. And, in some embodiments, the memory device system 130 may be considered to include or be a non-transitory processor-accessible (or computer-readable) storage medium system or data storage medium system including or consisting of one or more non-transitory processor-accessible (or computer-readable) storage or data storage mediums.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending on the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 1 may be implemented by a single application-specific integrated circuit (ASIC) in some embodiments.

The input-output device system 120 may include a mouse, a keyboard, a touch screen, another computer, or any device or combination of devices from which a desired selection, desired information, instructions, or any other data is input to the data processing device system 110. The input-output device system 120 may include a user-activatable control system that is responsive to a user action. The user-activatable control system may include at least one user input element, such as, for example, a mouse button, a keyboard key, a touch screen, or any other user input element that may be placed into an activated or deactivated state on the basis of a particular user action, such as, for example, the clicking/releasing of a mouse button, the pressing/releasing of a keyboard key, or the contacting of/separating from a touch screen. The input-output device system 120 may include any suitable interface for receiving information, instructions or any data from other devices and systems described in various ones of the embodiments. In this regard, the input-output device system 120 may include various ones of other systems described in various embodiments. For example, the input-output device system 120 may include at least a portion of a transducer-based device system or catheter-based device. The phrase "transducer-based device system" is intended to include one or more physical systems that include various transducers. The phrase "transducer-based device" is intended to include one or more physical devices that include various transducers.

The input-output device system 120 also may include an image-generating device system, a display device system, a speaker device system, a computer, a processor-accessible memory device system, a network-interface-card or network-interface circuitry, or any device or combination of devices to which information, instructions, or any other data is output by the data processing device system 110. In this regard, the input-output device system 120 may include various other devices or systems described in various embodiments. The input-output device system 120 may include any suitable interface for outputting information, instructions, or data to other devices and systems described in various ones of the embodiments. If the input-output device system 120 includes a processor-accessible memory device, such memory device may or may not form part or all of the memory device system 130. In some embodiments, the input-output device system 120 may include one or more display devices that display one or more of the graphical interfaces of FIGS. 5, described below.

Various embodiments of catheter device systems including transducer-based devices are described herein. Some of the described devices are medical devices that are percutaneously or intravascularly deployed. Some of the described devices are moveable between a delivery or unexpanded configuration (e.g., FIGS. 3A, 3B discussed below) in which a portion of the device is sized for passage through a bodily opening leading to a bodily cavity, and an expanded or deployed configuration (e.g., at least FIGS. 3C, 3D discussed below) in which the portion of the device has a size too large for passage through the bodily opening leading to the bodily cavity. An example of an expanded or deployed configuration is when the portion of the transducer-based device is in its intended-deployed-operational state inside the bodily cavity. Another example of the expanded or deployed configuration is when the portion of the transducer-based device is being changed from the delivery configuration to the intended-deployed-operational state to a point where the portion of the device now has a size too large for passage through the bodily opening leading to the bodily cavity.

In some example embodiments, the device includes transducers that sense characteristics (e.g., convective cooling, permittivity, force) that distinguish between fluid, such as a fluidic tissue (e.g., blood), and tissue forming an interior surface of the bodily cavity. Such sensed characteristics can allow a medical system to map the cavity, for example, using positions of openings or ports into and out of the cavity to determine a position or orientation (e.g., pose), or both, of the portion of the device in the bodily cavity. In some example embodiments, the described devices are capable of ablating tissue in a desired pattern within the bodily cavity.

In some example embodiments, the devices are capable of sensing various cardiac functions (e.g., electrophysiological activity including intra-cardiac voltages). In some example embodiments, the devices are capable of providing stimulation (e.g., electrical stimulation) to tissue within the bodily cavity. Electrical stimulation may include pacing.

Figure 2:
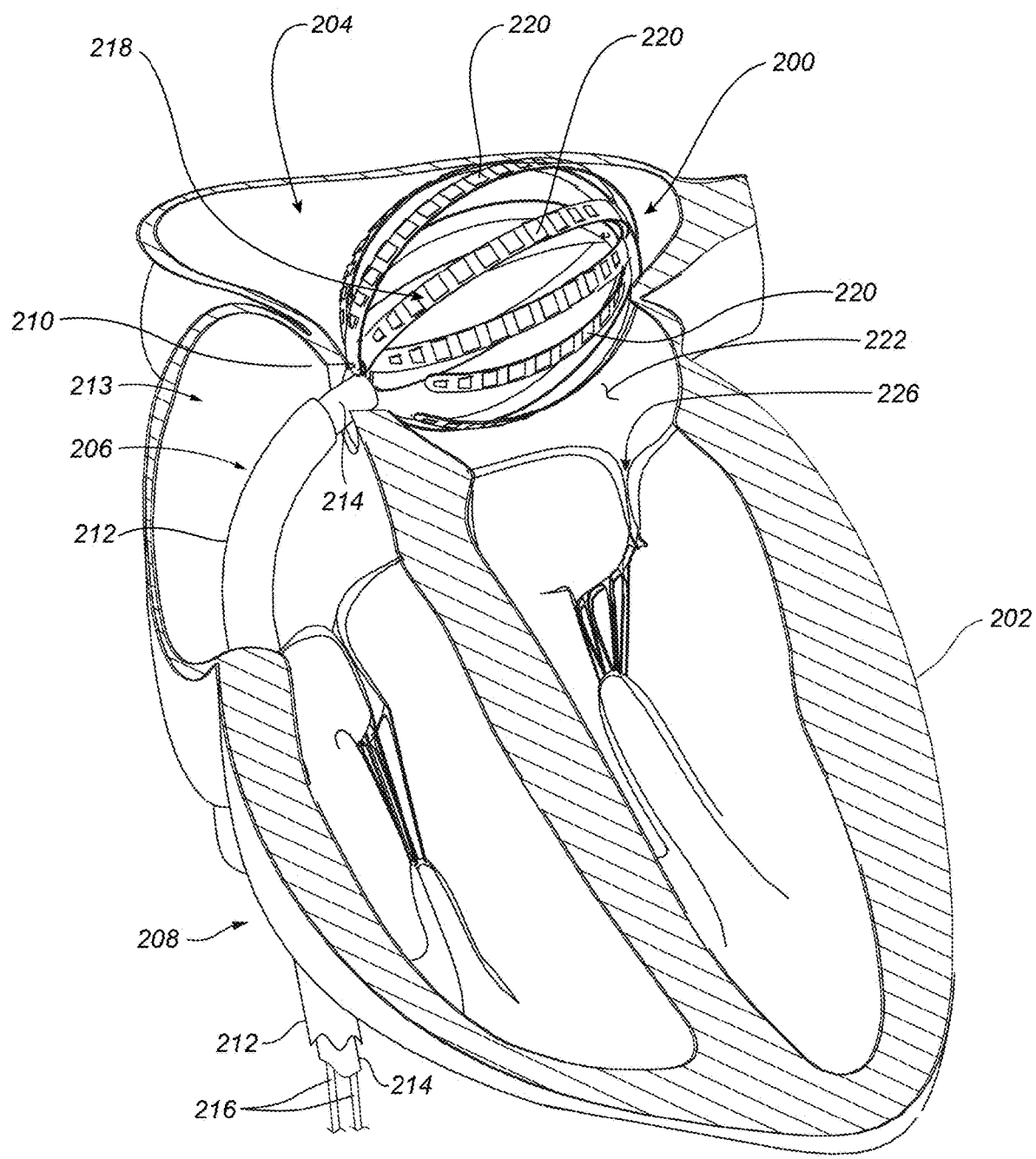
FIG. 2 includes a cutaway diagram of a heart showing a transducer-based device of a catheter device system percutaneously placed in a left atrium of the heart, according to various example embodiments.

FIG. 2 is a representation of a transducer-based device 200 useful in investigating or treating a bodily organ, for example, a heart 202, according to some embodiments.

Transducer-based device 200 can be percutaneously or intravascularly inserted into a portion of the heart 202, such as an intra-cardiac cavity, like left atrium 204. In this example, the transducer-based device 200 is part of a catheter 206 inserted via the inferior vena cava 208 and penetrating through a bodily opening in transatrial septum 210 from right atrium 213. (In this regard, transducer-based devices or device systems described herein that include a catheter may also be referred to as catheter device systems, catheter devices or device systems, or catheter-based devices or device systems, according to various embodiments.) In other embodiments, other paths may be taken.

Catheter 206 includes an elongated flexible rod or shaft member appropriately sized to be delivered percutaneously or intravascularly. Various portions of catheter 206 may be steerable. For example, a structure 218 supporting transducers 220 may be controlled via various manipulations to advance outwardly, to retract, to rotate clockwise, to rotate counterclockwise, and to have a particular deployment plane orientation (e.g., a plane in which the structure progresses from a delivery configuration (e.g., described below with respect to at least FIG. 3A) to or at least toward a deployed configuration (e.g., described below with respect to at least FIG. 3C), according to some embodiments. One or more other portions of the transducer-based device 200 may be steerable. For example, a catheter sheath 212, which encompasses or surrounds at least part of an elongate shaft member 214 to which the structure 218 is physically coupled, may be steerable. In some embodiments, the sheath 212 may be controlled via various manipulations to advance outwardly, retract, rotate clockwise, rotate counterclockwise, bend, release a bend, and to have a particular bending plane orientation, according to some embodiments.

Catheter 206 may include one or more lumens. The lumen(s) may carry one or more communications or power paths, or both. For example, the lumens(s) may carry one or more electrical conductors 216 (two shown). Electrical conductors 216 provide electrical connections to transducer-based device 200 and transducers 220 thereof that are accessible externally from a patient in which the transducer-based device 200 is inserted.

Transducer-based device 200 includes a frame or structure 218 which assumes an unexpanded configuration for delivery to left atrium 204. Structure 218 is expanded (e.g., shown in a deployed or expanded configuration in FIG. 2) upon delivery to left atrium 204 to position a plurality of transducers 220 (three called out in FIG. 2) proximate the interior surface formed by tissue 222 of left atrium 204. In some embodiments, at least some of the transducers 220 are configured to sense a physical characteristic of a fluid (e.g., blood) or tissue 222, or both, that may be used to determine a position or orientation (e.g., pose), or both, of a portion of a device 200 within, or with respect to left atrium 204. For example, transducers 220 may be configured to determine a location of pulmonary vein ostia, a mitral valve 226, or both. In some embodiments, at least some of the transducers 220 may be configured to selectively ablate portions of the tissue 222. For example, some of the transducers 220 may be configured to ablate a pattern around the bodily openings, ports, or pulmonary vein ostia, for instance, to reduce or eliminate the occurrence of atrial fibrillation. In some embodiments, at least some of the transducers 220 are configured to ablate cardiac tissue. In some embodiments, at least some of the transducers 220 are configured to sense or sample intra-cardiac voltage data or sense or sample intra-cardiac electrogram data. In some embodiments, at least some of the transducers 220 are configured to sense or sample intra-cardiac voltage data or sense or sample intra-cardiac electrogram data while at least some of the transducers 220 are concurrently ablating cardiac tissue. In some embodiments, at least one of the sensing or sampling transducers 220 is provided by at least one of the ablating transducers 220. In some embodiments, at least a first one of the transducers 220 senses or samples intra-cardiac voltage data or intra-cardiac electrogram data at a location at least proximate to a tissue location ablated by at least a second one of the transducers 220. In some embodiments, the first one of the transducers 220 is other than the second one of the transducers 220.

Figure 3A:
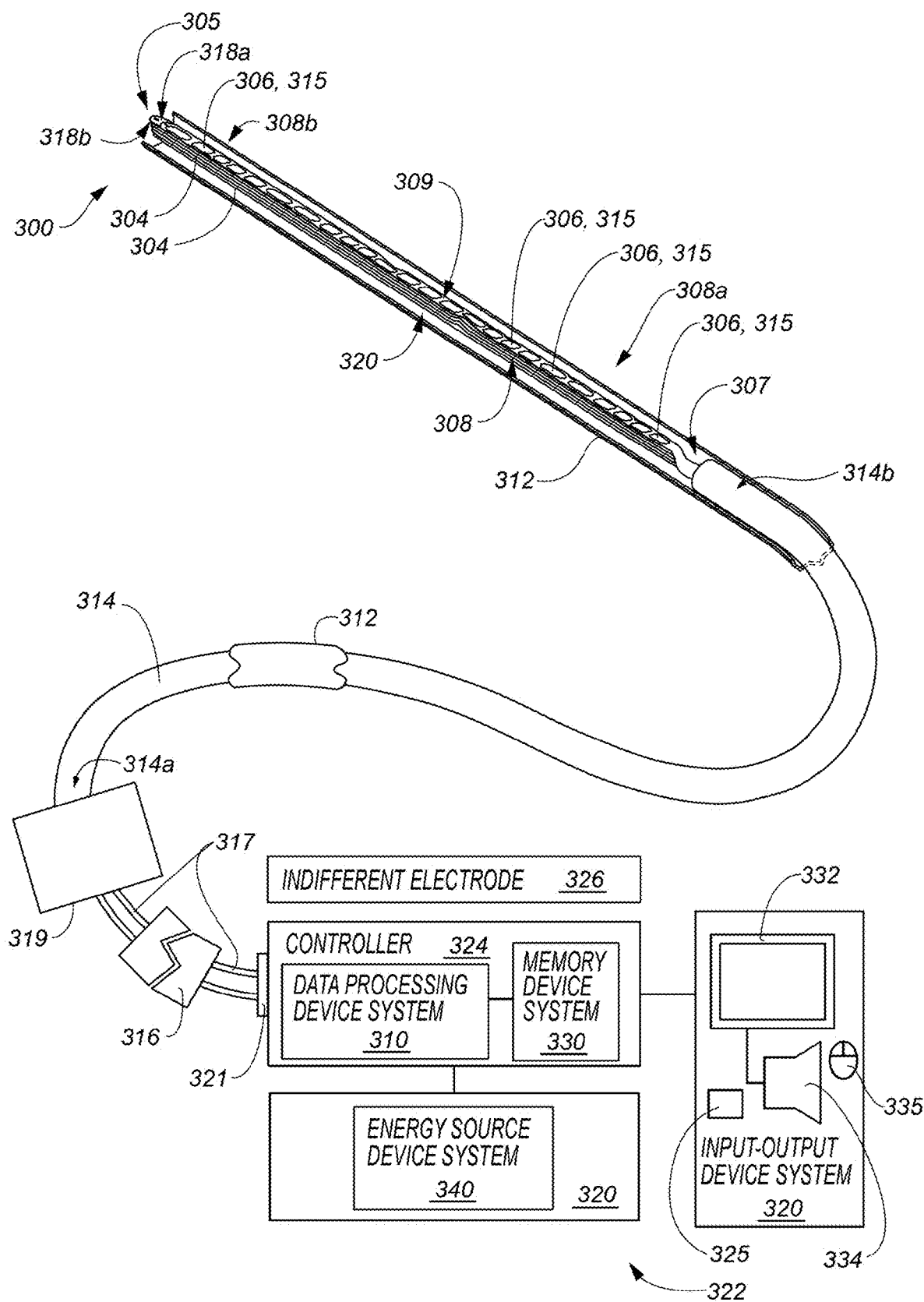
FIG. 3A includes a partially schematic representation of a medical system according to various example embodiments, the medical system including a data processing device system, an input-output device system, a memory device system, and a catheter device system including a transducer-based device, the transducer-based device including a plurality of transducers and an expandable structure shown in a delivery or unexpanded configuration.
Figure 3B:
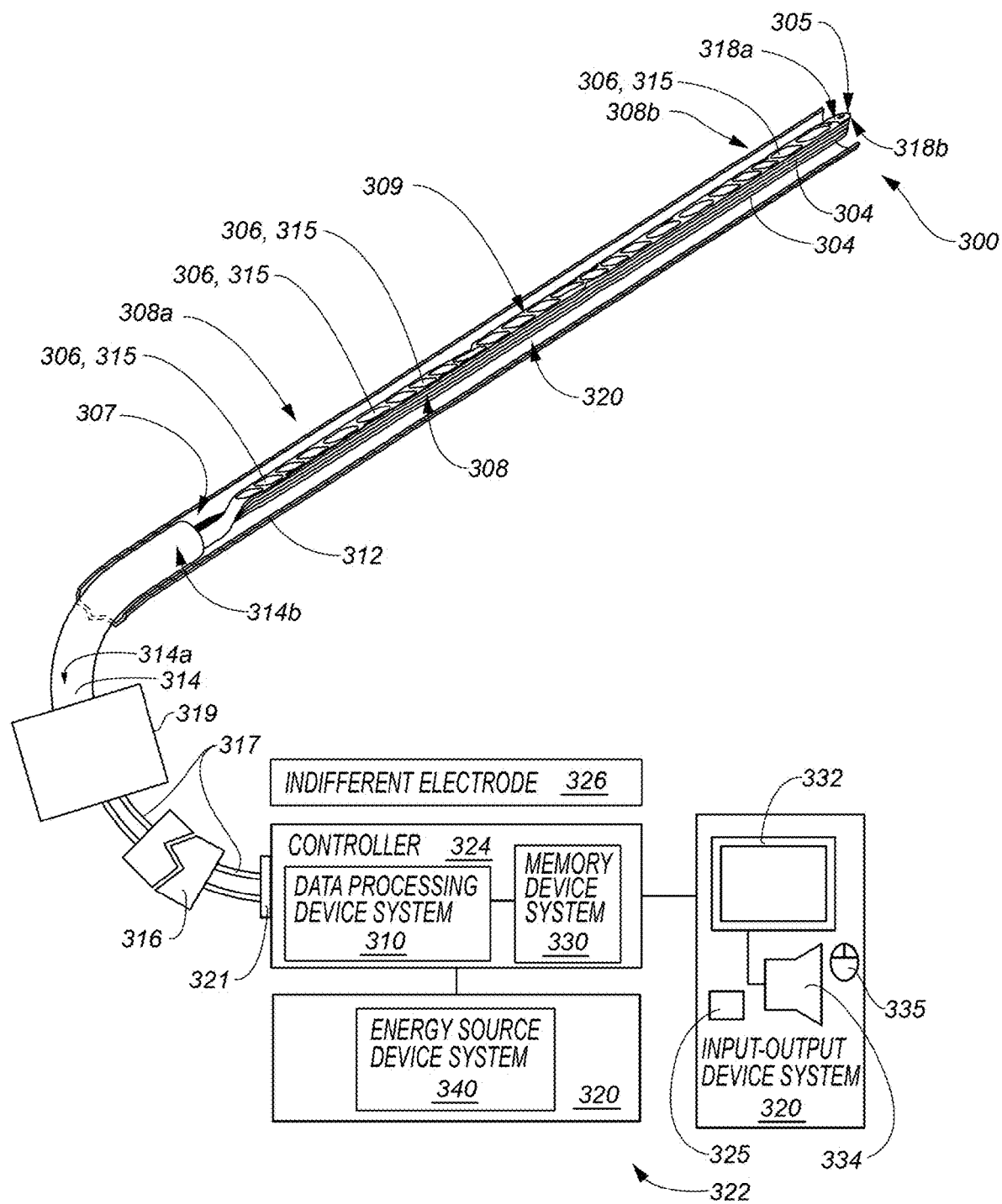
FIG. 3B includes a portion of the medical system of FIG. 3A as viewed from a different viewing direction.
Figure 3C:
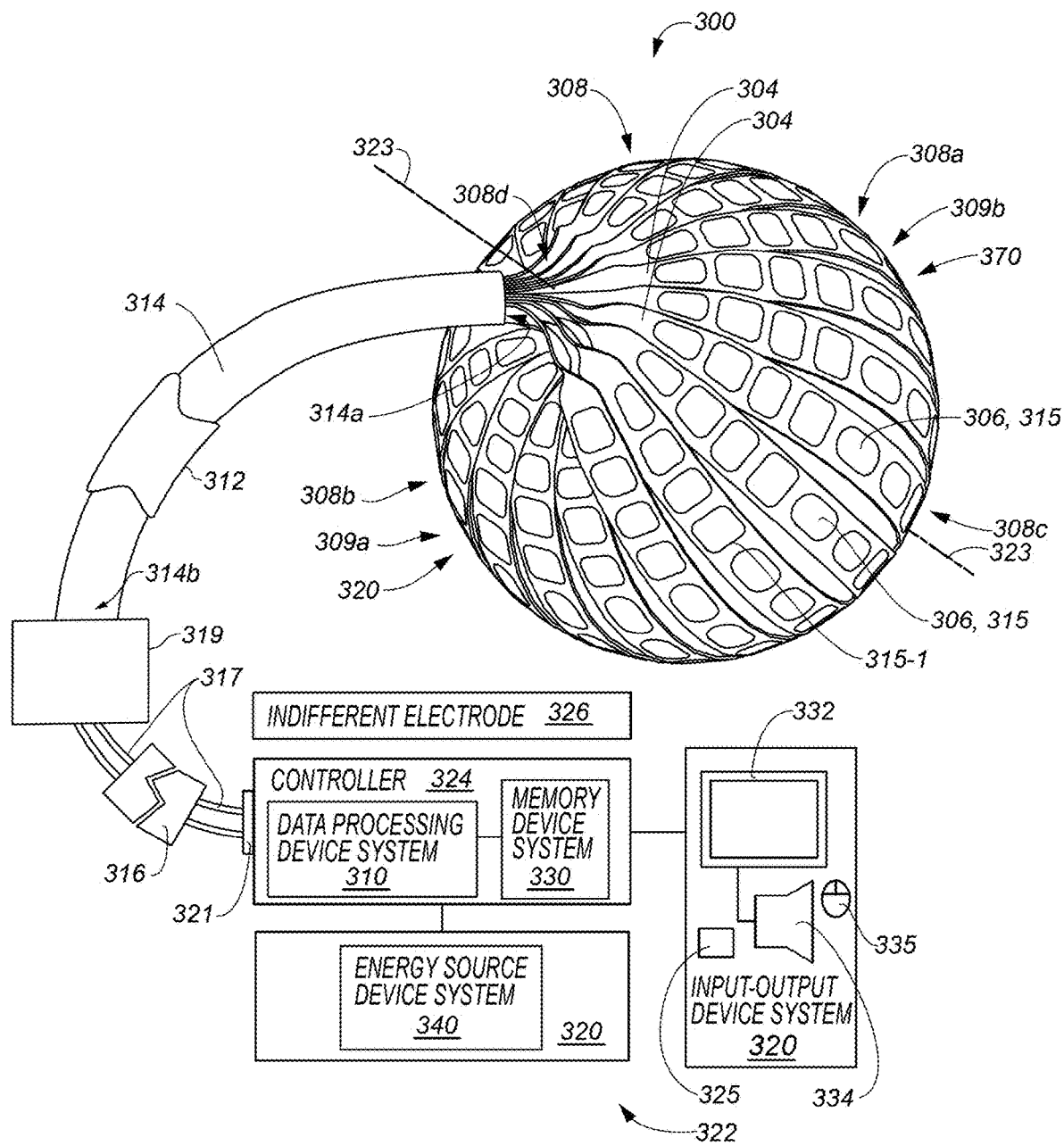
FIG. 3C includes the representation of the medical system of FIGS. 3A and 3B with the expandable structure shown in a deployed or expanded configuration.
Figure 3D:
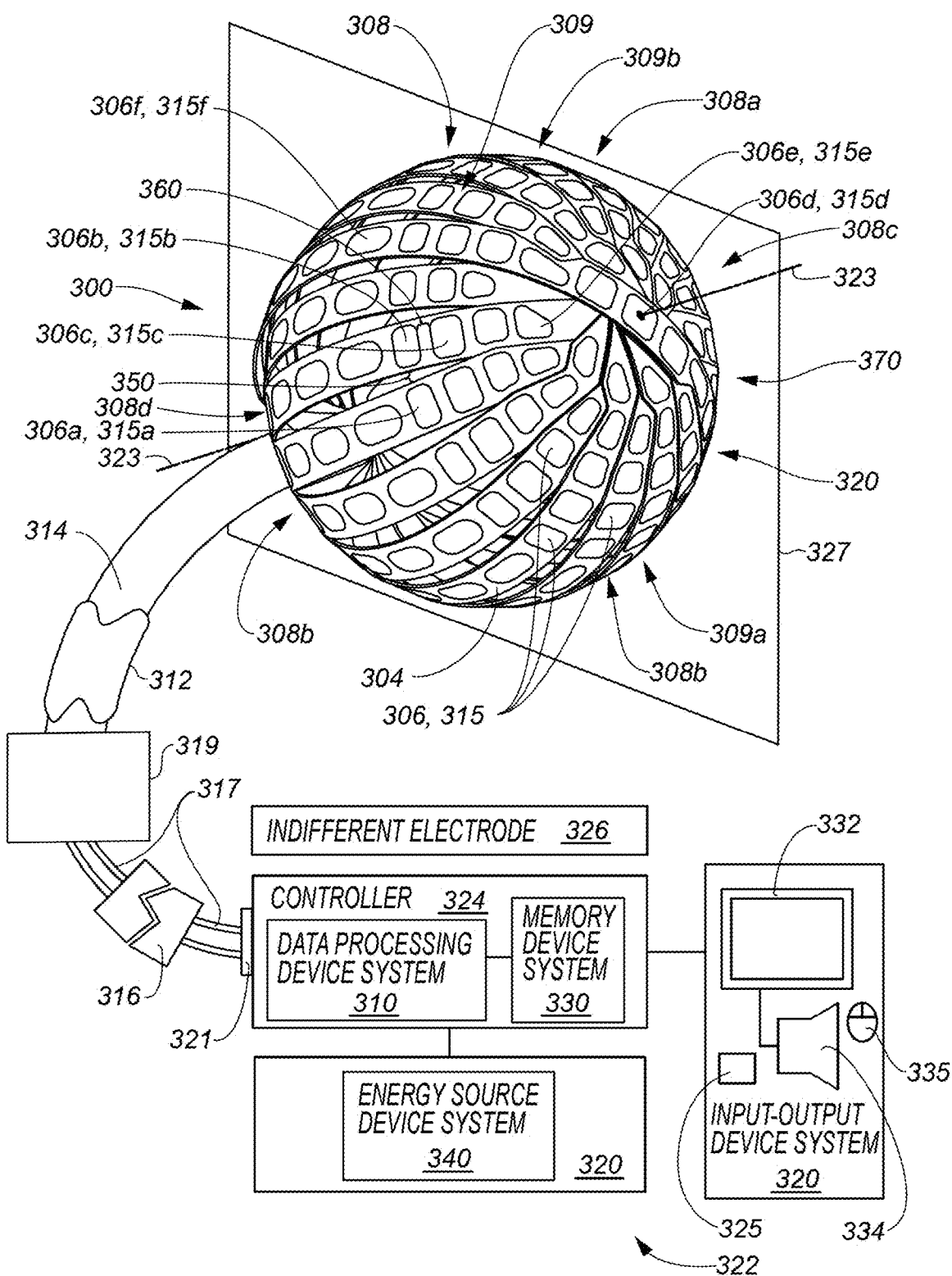
FIG. 3D includes a portion of the medical system of FIG. 3C as viewed from a different viewing direction.

FIGS. 3A, 3B, 3C, and 3D include a catheter device system (e.g., a portion thereof shown schematically) that includes a transducer-based device 300, according to some embodiments. The transducer-based device has at least the same capabilities of the transducer-based device 200, but has a different configuration including many more transducers 306 and elongate members 304 than the transducer-based device 200. In this regard, transducer-based device 300 includes a plurality of elongate members 304 (not all of the elongate members are called out in each of FIGS. 3A, 3B, 3C, and 3D) and a plurality of transducers 306 (not all of the transducers called out in FIG. 3) (some of the transducers 306 are called out in FIG. 3D as 306a, 306b, 306c, 306d, 306e, and 306f). FIG. 3B includes a representation of a portion of the transducer-based device 300 shown in FIG. 3A, but as viewed from a different viewing direction. FIG. 3D includes a representation of a portion of the transducer-based device 300 shown in FIG. 3C, but as viewed from a different viewing direction. It is noted that, for clarity of illustration, all of the elongate members shown in FIGS. 3C and 3D are not represented in FIGS. 3A and 3B. As will become apparent, the plurality of transducers 306 is positionable within a bodily cavity, such as with the transducer-based device 200. For example, in some embodiments, the transducers 306 are able to be positioned in a bodily cavity by movement into, within, or into and within the bodily cavity, with or without a change in a configuration of the plurality of transducers 306. In some embodiments, the transducers of the plurality of transducers 306 are arranged to form a two- or three-dimensional distribution, grid or array of the transducers capable of mapping, ablating, or stimulating an inside surface of a bodily cavity or lumen without requiring mechanical scanning. As shown, for example, in FIGS. 3A and 3B, the plurality of transducers 306 are arranged in a distribution receivable in a bodily cavity. In various ones of the FIGS. 3A-3D, each of at least some of transducers 306 includes a respective electrode 315 (not all of the electrodes 315 are called out in each of the FIGS. 3A-3D, with some of the electrodes in FIG. 3D called out as 315a, 315b, 315c, 315d, 315e, and 315f).

The elongate members 304 are arranged in a frame or structure 308 that is selectively movable between an unexpanded or delivery configuration (e.g., as shown in FIGS. 3A, 3B) and an expanded or deployed configuration (e.g., as shown in at least FIGS. 3C, 3D) that may be configured to position elongate members 304 against a tissue surface within the bodily cavity or position the elongate members 304 in the vicinity of the tissue surface. In some embodiments, structure 308 has a size in the unexpanded or delivery configuration suitable for delivery through a bodily opening (e.g., via catheter sheath 312 (shown in FIGS. 3A and 3B, but removed from FIGS. 3C and 3D for clarity)) to the bodily cavity. In various embodiments, catheter sheath 312 typically includes a length sufficient to allow the catheter sheath to extend between a location at least proximate a bodily cavity into which the structure 308 is to be delivered and a location outside a body comprising the bodily cavity. In some embodiments, structure 308 has a size in the expanded or deployed configuration too large for delivery through a bodily opening (e.g., via catheter sheath 312) to the bodily cavity. The elongate members 304 may form part of a flexible circuit structure (e.g., also known as a flexible printed circuit board (PCB) circuit, examples of which are described with respect to FIG. 4, below). The elongate members 304 may include a plurality of different material layers. Each of the elongate members 304 may include a plurality of different material layers. The structure 308 may include a shape memory material, for instance, Nitinol. The structure 308 may include a metallic material, for instance, stainless steel, or non-metallic material, for instance, polyimide, or both a metallic and non-metallic material by way of non-limiting example. The incorporation of a specific material into structure 308 may be motivated by various factors including the specific requirements of each of the unexpanded or delivery configuration and expanded or deployed configuration, the required position or orientation (e.g., pose), or both of structure 308 in the bodily cavity or the requirements for successful ablation of a desired pattern.

Figure 4:
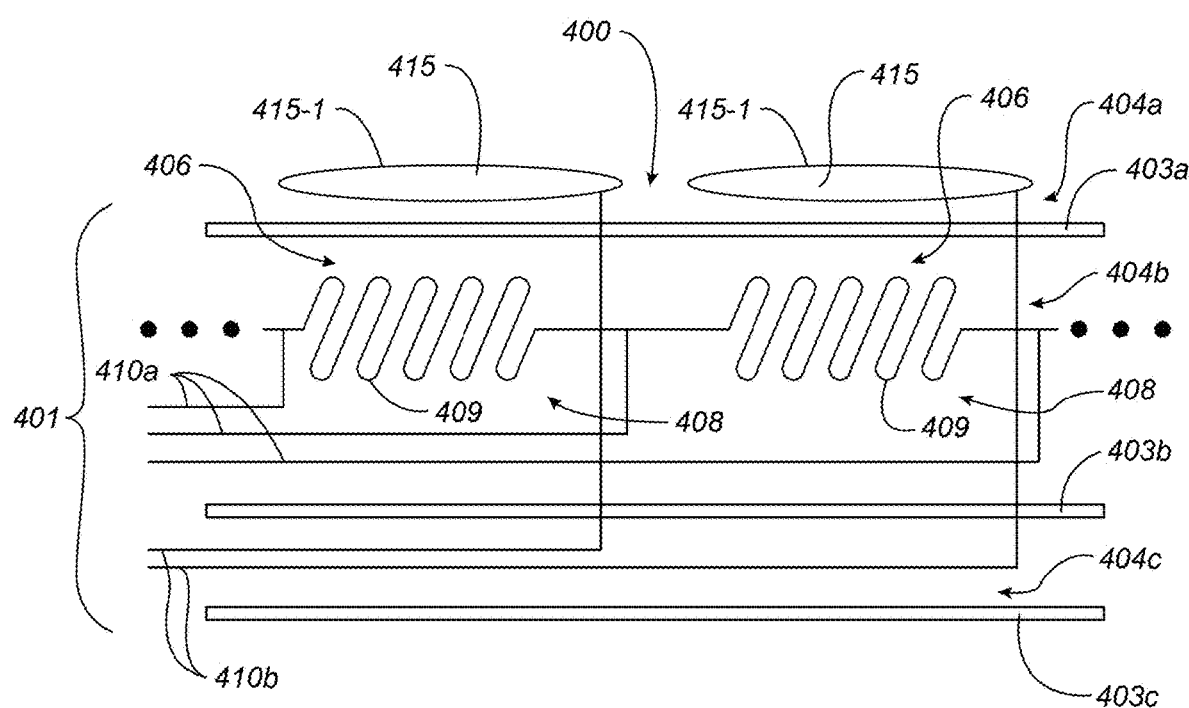
FIG. 4 includes a schematic representation of a transducer-based device of a catheter device system that includes a flexible circuit structure, according to various example embodiments.

FIG. 4 is a schematic side elevation view of at least a portion of a transducer-based device 400 that includes a flexible circuit structure 401 that is configured to provide a plurality of transducers 406 (two called out) according to some embodiments. In some embodiments, the flexible circuit structure 401 may form part of a structure (e.g., structure 308) that is selectively movable between a delivery configuration sized for percutaneous delivery and expanded or deployed configurations sized too large for percutaneous delivery. In some embodiments, the flexible circuit structure 401 may be located on, or form at least part of, a structural component (e.g., elongate member 304) of a transducer-based device system.

The flexible circuit structure 401 may be formed by various techniques including flexible printed circuit techniques. In some embodiments, the flexible circuit structure 401 includes various layers including flexible layers 403a, 403b and 403c (e.g., collectively flexible layers 403). In some embodiments, each of flexible layers 403 includes an electrical insulator material (e.g., polyimide). One or more of the flexible layers 403 may include a different material than another of the flexible layers 403. In some embodiments, the flexible circuit structure 401 includes various electrically conductive layers 404a, 404b and 404c (collectively electrically conductive layers 404) that are interleaved with the flexible layers 403. In some embodiments, each of the electrically conductive layers 404 is patterned to form various electrically conductive elements. For example, electrically conductive layer 404a may be patterned to form a respective electrode 415 of each of the transducers 406. Electrodes 415 may have respective electrode edges 415-1 that form a periphery of an electrically conductive surface associated with the respective electrode 415. It is noted that other electrodes employed in other embodiments may have electrode edges arranged to form different electrode shapes (for example, as shown by electrode edges 315-1 in FIG. 3C).

Electrically conductive layer 404b is patterned, in some embodiments, to form respective temperature sensors 408 for each of the transducers 406, as well as various leads 410a arranged to provide electrical energy to the temperature sensors 408. In some embodiments, each temperature sensor 408 includes a patterned resistive member 409 (two called out) having a predetermined electrical resistance. In some embodiments, each resistive member 409 includes a metal having relatively high electrical conductivity characteristics (e.g., copper). In some embodiments, electrically conductive layer 404c is patterned to provide portions of various leads 410b arranged to provide an electrical communication path to electrodes 415. In some embodiments, leads 410b are arranged to pass though vias in flexible layers 403a and 403b to connect with electrodes 415. Although FIG. 4 shows flexible layer 403c as being a bottom-most layer, some embodiments may include one or more additional layers underneath flexible layer 403c, such as one or more structural layers, such as a steel or composite layer. These one or more structural layers, in some embodiments, are part of the flexible circuit structure 401 and can be part of, e.g., elongate member 304. In some embodiments, the one or more structural layers may include at least one electrically conductive surface (e.g., a metallic surface) exposed to blood flow. In addition, although FIG. 4 shows only three flexible layers 403a-403c and only three electrically conductive layers 404a-404c, it should be noted that other numbers of flexible layers, other numbers of electrically conductive layers, or both, may be included.

In some embodiments, electrodes 415 are configured to selectively deliver RF energy to various tissue structures within a bodily cavity (e.g., an intra-cardiac cavity or chamber). The energy delivered to the tissue structures may be sufficient for ablating portions of the tissue structures. The energy delivered to the tissue may be delivered to cause monopolar tissue ablation, bipolar tissue ablation, or blended monopolar-bipolar tissue ablation by way of non-limiting example.

Energy that is sufficient for tissue ablation may be dependent upon factors including transducer location, size, shape, relationship with respect to another transducer or a bodily cavity, material or lack thereof between transducers, et cetera. For example, a pair of electrodes that each is approximately 10 mm$^2$ in surface area and present along a same structural member (e.g., an elongate member 304 in various ones of FIG. 3) may be expected, in some circumstances, to sufficiently ablate intra-cardiac tissue to a depth of approximately 3.1 mm with 2 W of power and to a depth of approximately 4.4 mm with 4 W of power. For yet another non-limiting example, if each electrode in this pair instead has approximately 20 mm$^2$ of surface area, it may be expected that such pair of electrodes will sufficiently ablate intra-cardiac tissue to a depth of approximately 3.1 mm with 4 W of power and to a depth of approximately 4.4 mm with 8 W of power. In these non-limiting examples, power refers to the average power of each electrode summed together, and the depth and power values may be different depending upon the particular shapes of the respective electrodes, the particular distance between them, a degree of electrode-to-tissue contact, and other factors. The degree of electrode-to-tissue contact has a bearing on the depth of the lesions formed with fuller or more complete contact typically leading to deeper lesions. It is understood, however, that for the same control or target temperature, a larger electrode will achieve a given ablation depth sooner than a smaller electrode. A smaller electrode (e.g., an electrode with a smaller surface area) may need to operate at a higher target temperature to achieve the same ablation depth as compared to a larger (e.g., surface area) electrode (a phenomenon driven by a greater divergence of heat flux of smaller electrodes). Put differently, a maximum ablation depth (e.g., reached when the temperature profile approaches steady state) of a relatively smaller electrode is typically shallower than that of a relatively larger electrode when ablating at the same control or target temperature, and consequently, a given, less than maximum, ablation depth typically is a larger proportion of the final, maximum, ablation depth for a relatively smaller electrode and typically is reached later in the ablation as compared to a relatively larger electrode. This circumstance may be associated with a lower total power provided to the relatively smaller electrode as compared to a relatively larger electrode, but, nonetheless, the power density present in the relatively smaller electrode may be expected to be somewhat higher as compared to the relatively larger electrode. The phrase "power density" in this context means output power divided by electrode area. Note that power density approximately drives the realized control or target temperature, but in various cases, this is a simplification, and as indicated above, the relationship between power density and realized control or target temperature may be modified by such factors as electrode size, shape, separation, and so forth. It is further noted that when a comparison is made between a relatively larger electrode operated at a lower control temperature versus a relatively smaller electrode operated at a higher temperature, further complications may arise when limits on compensation for electrode size with temperature are also dictated, at least in part, by a desire to reduce occurrences of thermal coagulation of blood or steam formation in the ablated tissue. It is noted that power levels in irrigated electrode systems are typically higher (e.g., in the tens of Watts) than those described above. It is noted that the degree of electrode-to-tissue contact may impact other factors than lesion quality. For example, lower degrees of electrode-to-tissue contact may lead to undesired increased levels of thermal coagulum formation in which at least a portion of the ablation energy is conveyed to blood rather than to tissue. In some cases, lower degrees of electrode-to-tissue contact may cause undesired filtering of electric potential information (e.g., intra-cardiac voltage information). Such filtering may lead to the formation of intracardiac electrograms with reduced sharpness.

In some embodiments, each electrode 415 is configured to sense or sample an electrical potential in the tissue proximate the electrode 415 at a same or different time than delivering energy sufficient for tissue ablation. In some embodiments, each electrode 415 is configured to sense or sample intra-cardiac voltage data in the tissue proximate the electrode 415. In some embodiments, each electrode 415 is configured to sense or sample data in the tissue proximate the electrode 415 from which an electrogram (e.g., an intra-cardiac electrogram) may be derived. In some embodiments, each resistive member 409 is positioned adjacent a respective one of the electrodes 415. In some embodiments, each of the resistive members 409 is positioned in a stacked or layered array with a respective one of the electrodes 415 to form a respective one of the transducers 406. In some embodiments, the resistive members 409 are connected in series to allow electrical current to pass through all of the resistive members 409. In some embodiments, leads 410a are arranged to allow for a sampling of electrical voltage in between each resistive member 409. This arrangement allows for the electrical resistance of each resistive member 409 to be accurately measured. The ability to accurately measure the electrical resistance of each resistive member 409 may be motivated by various reasons including determining temperature values at locations at least proximate the resistive member 409 based at least on changes in the resistance caused by convective cooling effects (e.g., as provided by blood flow). The resistance data can thus be correlated to the degree of presence of the flow between the electrode 415 and tissue, thereby allowing the degree of contact between the electrode 415 and the tissue to be determined.

Referring to FIGS. 3A, 3B, 3C, and 3D, transducer-based device 300 can communicate with, receive power from or be controlled by a transducer-activation device system 322. In some embodiments, the transducer-activation device system 322 represents one or more particular implementations of the system 100 illustrated in FIG. 1. In some embodiments, elongate members 304 include transducers 306 that are communicatively connected to a data processing device system 310 via electrical connections running within elongate shaft member 314 that are communicatively connected to one or more of electrical leads 317 (e.g., control leads, data leads, power leads or any combination thereof) within elongated cable 316 (only a portion of which is shown in FIGS. 3A-3D to reveal other structures) terminating at a connector 321 or other interface. The leads 317 may correspond to the electrical conductors 216 in FIG. 2 in some embodiments and, although only two leads 317 are shown for clarity, more may be present. The transducer-activation device system 322 may include a controller 324 that includes the data processing device system 310 (e.g., which may be a particular implementation of data processing device system 110 from FIG. 1) and a memory device system 330 (e.g., which may be a particular implementation of the memory device system 130 from FIG. 1) that stores data and instructions that are executable by the data processing device system 310 to process information received from transducer-based device 300 or to control operation of transducer-based device 300, for example, activating various selected transducers 306 to ablate tissue and control a user interface (e.g., of input-output device system 320) according to various embodiments including at least those described below with respect to various ones of FIGS. 5 and 6. Controller 324 may include one or more controllers.

Transducer-activation device system 322 includes an input-output device system 320 (e.g., which may be a particular implementation of the input-output device system 120 from FIG. 1) communicatively connected to the data processing device system 310 (e.g., via controller 324 in some embodiments). Input-output device system 320 may include a user-activatable control that is responsive to a user action. Input-output device system 320 may include one or more user interfaces or input/output (I/O) devices, for example one or more display device systems 332, speaker device systems 334, one or more keyboards, one or more mice (e.g., mouse 335), one or more joysticks, one or more track pads, one or more touch screens or other transducers to transfer information to, from, or both to and from a user, for example a care provider such as a physician or technician. For example, output from a mapping process may be displayed on a display device system 332. Input-output device system 320 may include one or more user interfaces or input/output (I/O) devices, for example, one or more display device systems 332, speaker device systems 334, keyboards, mice, joysticks, track pads, touch screens or other transducers employed by a user to indicate a particular selection or series of selections of various graphical information. Input-output device system 320 may include a sensing device system 325 configured to detect various characteristics including, but not limited to, at least one of tissue characteristics (e.g., electrical characteristics such as tissue impedance, tissue conductivity, tissue type, tissue thickness) and thermal characteristics such as temperature. In this regard, the sensing device system 325 may include one, some, or all of the transducers 306 (or 406 of FIG. 4) of the transducer-based device 300, including the internal components of such transducers shown in FIG. 4, such as the electrodes 415 and temperature sensors 408.

Transducer-activation device system 322 may also include an energy source device system 340 including one or more energy source devices connected to transducers 306. In this regard, although various ones of FIG. 3 show a communicative connection between the energy source device system 340 and the controller 324 (and its data processing device system 310), the energy source device system 340 may also be connected to the transducers 306 via a communicative connection that is independent of the communicative connection with the controller 324 (and its data processing device system 310). For example, the energy source device system 340 may receive control signals via the communicative connection with the controller 324 (and its data processing device system 310), and, in response to such control signals, deliver energy to, receive energy from, or both deliver energy to and receive energy from one or more of the transducers 306 via a communicative connection with such transducers 306 (e.g., via one or more communication lines through catheter body or elongate shaft member 314, elongated cable 316 or catheter sheath 312) that does not pass through the controller 324. In this regard, the energy source device system 340 may provide results of its delivering energy to, receiving energy from, or both delivering energy to and receiving energy from one or more of the transducers 306 to the controller 324 (and its data processing device system 310) via the communicative connection between the energy source device system 340 and the controller 324.

The energy source device system 340 may, for example, be connected to various selected transducers 306 to selectively provide energy in the form of electrical current or power (e.g., RF energy), light or low temperature fluid to the various selected transducers 306 to cause ablation of tissue. The energy source device system 340 may, for example, selectively provide energy in the form of electrical current to various selected transducers 306 and measure a temperature characteristic, an electrical characteristic, or both at a respective location at least proximate each of the various transducers 306. The energy source device system 340 may include various electrical current sources or electrical power sources as energy source devices. In some embodiments, an indifferent electrode 326 is provided to receive at least a portion of the energy transmitted by at least some of the transducers 306. Consequently, although not shown in various ones of FIGS. 3, the indifferent electrode 326 may be communicatively connected to the energy source device system 340 via one or more communication lines in some embodiments. In addition, although shown separately in various ones of FIGS. 3, indifferent electrode 326 may be considered part of the energy source device system 340 in some embodiments. In various embodiments, indifferent electrode 326 is positioned on an external surface (e.g., a skin-based surface) of a body that comprises the bodily cavity into which at least transducers 306 are to be delivered.

It is understood that input-output device system 320 may include other systems. In some embodiments, input-output device system 320 may optionally include energy source device system 340, transducer-based device 300 or both energy source device system 340 and transducer-based device 300 by way of non-limiting example. Input-output device system 320 may include the memory device system 330 in some embodiments.

Structure 308 can be delivered and retrieved via a catheter member, for example, a catheter sheath 312. In some embodiments, a structure provides expansion and contraction capabilities for a portion of the medical device (e.g., an arrangement, distribution or array of transducers 306). The transducers 306 may form part of, be positioned or located on, mounted or otherwise carried on the structure and the structure may be configurable to be appropriately sized to slide within catheter sheath 312 in order to be deployed percutaneously or intravascularly. FIGS. 3A, 3B show one embodiment of such a structure. In some embodiments, each of the elongate members 304 includes a respective distal end 305 (only one called out in each of FIGS. 3A, 3B), a respective proximal end 307 (only one called out in each of FIGS. 3A, 3B) and an intermediate portion 309 (only one called out in each of FIGS. 3A, 3B) positioned between the proximal end 307 and the distal end 305. The respective intermediate portion 309 of each elongate member 304 includes a first or front surface 318a that is positionable to face an interior tissue surface within a bodily cavity and a second or back surface 318b opposite across a thickness of the intermediate portion 309 from the front surface 318a. In some embodiments, each of the elongate members 304 is arranged front surface 318a—toward-back surface 318b in a stacked array during an unexpanded or delivery configuration similar to that described in co-assigned International Application No.: PCT/US2012/022061 and co-assigned International Application No.: PCT/US2012/022062. In many cases a stacked array allows the structure 308 to have a suitable size for percutaneous or intravascular delivery. In some embodiments, the elongate members 304 are arranged to be introduced into a bodily cavity distal end 305 first. An elongate shaft member 314 is configured to deliver structure 308 through catheter sheath 312, according to some embodiments. According to various embodiments, the elongate shaft member 314 includes a proximal end portion 314a and a distal end portion 314b, the distal end portion 314b physically coupled to structure 308. According to various embodiments, the elongate shaft member 314 may include a length to position distal end portion 314b (and structure 308 in some embodiments) at a desired location within a patient's body while maintaining the proximal end portion 314a at a location outside the patient's body. In some embodiments, the proximal end portion 314a may be coupled to a housing 319. Housing 319 may include or enclose various actuators (not shown) that may be configured to manipulate various portions of the catheter, including, but not limited to, (a) portions of the elongate shaft member 314, portions of structure 308, or both (a) and (b). According to various embodiments, housing 319 may take the form of a handle that is directly manipulable by a user. U.S. Pat. No. 9,452,016, issued Sep. 27, 2016, which is hereby incorporated herein by reference, provides possible examples of a housing and accompanying actuators that may be utilized as housing 319.

In this regard, various actuators provided by housing 319 may be coupled by various control elements (e.g., control lines, push-pull members, etc.) configured to convey manipulation force to at least structure 308 and sheath 312. Manipulation of portions of structure 308 may include particular manipulation causing movement, at least in part, of the structure 308 between a delivery configuration (e.g., FIGS. 3A, 3B) and a deployed configuration (e.g., FIGS. 2, 3C, 3D, 3E, 3F, 3G, 3H), according to some embodiments. Manipulation of portions of structure 308 may include particular manipulation causing movement (e.g., advancement (which may include a movement distally or may include a movement toward the deployed configuration), retraction (which may include a movement proximally or may include a movement toward the delivery configuration), and rotation) of one or more of the elongate members 304, according to some embodiments. Rotational movement of the structure 308 may control an orientation of a deployment or retraction plane of the structure 308 as it proceeds from the delivery configuration to the deployed configuration, or vice versa, according to some embodiments. U.S. Pat. No. 9,452,016, issued Sep. 27, 2016, which is hereby incorporated herein by reference, provides possible examples of how elongate members, such as elongate members 304 in FIGS. 3, may depart a delivery configuration by proceeding into a planar coil shape before expanding into a fully deployed configuration, and how such elongate members may return from the fully deployed configuration into a planar coil shape before retracting into a catheter sheath to the delivery configuration, according to some embodiments.

According to some embodiments, manipulation of one or more portions of the sheath 312 may occur by way of one or more actuators that may extend from housing 319 through at least a portion of the sheath 312. U.S. Patent Application Publication No. 2010/0168666, published Jul. 1, 2010, which is hereby incorporated herein by reference, provides examples of how such actuators may be included in a wall of a catheter shaft member, which may be implemented as elongate sheath 312 (or elongate shaft member 314), according to some embodiments. International Publication No. WO 2017/100902, published Jun. 22, 2017 provides other examples, according to some embodiments. Manipulation of the portions of the sheath 312 may include particular manipulation causing bending of various portions of elongate sheath 312, according to some embodiments. Bending of the sheath 312 may cause bending of the shaft 314 (e.g., when at least part of the shaft 314 is located with a lumen of the sheath 312) and, therefore, bending of the shaft 314 may be controlled by bending of the sheath 312, according to some embodiments. In other embodiments, bending of the shaft 314 may occur directly via one or more actuators coupled to the shaft 314. Bending of various portions of sheath 312 or the shaft 314 may be motivated for different reasons. For example, bending may be employed to facilitate steering the sheath 312 or the elongate shaft member 314 through a tortuous path within the body as often arises in intravascular or percutaneous procedures. Bending of various portions of the sheath 312 or the elongate shaft member 314 may also be employed to facilitate orienting structure 308 in a desired orientation. Bending of various portions of the sheath 312 or the elongate shaft member 314 may occur in a single plane, according to some embodiments. Bending of various portions of the sheath 312 or the elongate shaft member 314 may occur in each of multiple non-parallel planes in other embodiments.

In a manner similar to that described in co-assigned International Application No.: PCT/US2012/022061 and co-assigned International Application No.: PCT/US2012/022062, each of the elongate members 304 is arranged in a fanned arrangement 370 in at least FIGS. 3C, 3D, according to some embodiments. In some embodiments, the fanned arrangement 370 is formed during the expanded or deployed configuration in which structure 308 is manipulated to have a size too large for percutaneous or intravascular delivery.

According to various embodiments, structure 308 may include a first portion and a second portion, the second portion mutually exclusive with the first portion. At least FIGS. 3E, 3F, 3G, and 3H discussed in more detail below, illustrates one example of such a first portion 308-1 and a second portion 308-2, according to some embodiments. In some embodiments, the second portion of structure 308 opposes the first portion of structure 308 at least in a state in which the structure 308 is in the deployed configuration. Numerous examples of the opposing first and second portions of structure 308 exist, according to some embodiments. For example, according to some embodiments, the structure 308 may be selectively moveable between the delivery configuration (e.g., FIGS. 3A, 3B) and the deployed configuration (e.g., FIGS. 2, 3C, 3D, 3E, 3F, 3G, 3H), and the first and second portions of the structure 308 that oppose one another in the deployed configuration may be arranged such that the structure 308 is configured to be deliverable first portion ahead of the second portion to or toward a bodily cavity at least in a state in which the structure 308 is in the delivery configuration. For example, in some embodiments, the first portion is provided by a distal portion 308*b* of structure 308, and the second portion is provided by a proximal portion 308*a* of the structure, the structure 308 being arranged to be delivered distal portion 308*b* ahead of the proximal portion 308*a* in the delivery configuration (e.g., FIGS. 3A, 3B) and the proximal and distal portions 308*a*, 308*b* opposing one another in the deployed configuration (e.g., FIGS. 2, 3C, 3D, 3E, 3F, 3G, 3H).

In some embodiments, the transducers of the plurality of transducers (e.g., at least a group of the transducers 306) may be circumferentially arranged about an axis (e.g., 323, FIG. 3D) of the structure 308 at least in the state in which the structure 308 is in the deployed configuration, the axis intersecting both the first portion of the structure (e.g., portion 308*c* in FIG. 3D) and the second portion of the structure (e.g., portion 308*d* in FIG. 3D) in the state in which the structure 308 is in the deployed configuration. According to various embodiments, portions 308*c* and 308*d* may each include a respective polar region of the structure 308 in the deployed configuration. In some embodiments, the transducers of the plurality of transducers (e.g., at least a group of the transducers 306) may be circumferentially arranged about an axis (e.g., 323, FIG. 3D) of the structure 308 at least in the state in which the structure 308 is in the deployed configuration, and the first portion of the structure and the second portion of the structure may be located on opposite sides of a plane (e.g., 327, FIG. 3D) at least in the state in which the structure 308 is in the deployed configuration, the axis residing in the plane. For example, in a manner similar to that described in co-assigned International Application No.: PCT/US2012/022061 and co-assigned International Application No.: PCT/US2012/022062, during a movement from the delivery configuration (e.g., FIGS. 3A, 3B) to the deployed configuration (e.g., at least FIGS. 3C, 3D), the first portion may be provided by a distal portion 308*b* of structure 308 and the second portion may be provided by a proximal portion 308*a* of the structure, the first portion and the second portion located on the opposite sides of a plane 327 (FIG. 3D), with the axis 323 residing in the plane. It is understood that, when the axis resides in the plane, the axis does not obliquely or transversely intersect the plane, but rather is positioned extending on a surface of the plane. It is noted that other embodiments may include planes other than the illustrated plane 327, each of the other planes positioned with the axis 323 residing in it.

In some embodiments, the first portion of the structure 308 includes a first domed shape at least in the state in which the structure 308 is in the deployed configuration, and the second portion of the structure 308 includes a second domed shape at least in the state in which the structure 308 is in the deployed configuration, the second domed shape opposing the first domed shape at least in the state in which the structure 308 is in the deployed configuration. For example, in FIGS. 3C, 3D, structure 308 includes multiple sets of opposing first and second portions, the first and the second portions including respective domed shapes that oppose one another (e.g., opposing hemisphere-like shapes) at least in the state in which the structure 308 is in the deployed configuration. In some embodiments, distal portion 308*b* includes a first domed shape 309*a* and proximal portion 308*a* includes a second domed shape 309*b*. In some embodiments, the first domed shape 309*a* opposes the second domed shape 309*b*. In some embodiments, the proximal and the distal portions 308*a*, 308*b* each include respective portions of elongate members 304. In some embodiments, the structure 308 is arranged to be delivered distal portion 308*b* first into a bodily cavity at least in a state in which the structure is in the unexpanded or delivery configuration as shown in at least FIGS. 3A, 3B. In various embodiments, the proximal and distal portions 308*a*, 308*b* do not include a domed shape in the delivery configuration (for example, as shown in FIGS. 3A, 3B). In some embodiments, the first domed shape 309*a* of the distal portion 308*b* and the second domed shape 309*b* of the proximal portion 308*a* are arranged in a clam shell configuration in the expanded or deployed configuration shown in at least FIGS. 3C, 3D.

The transducers 306 can be arranged in various distributions or arrangements in various embodiments. In some embodiments, various ones of the transducers 306 are spaced apart from one another in a spaced apart distribution in the delivery configuration shown in FIGS. 3A, 3B. In some embodiments, various ones of the transducers 306 are arranged in a spaced apart distribution in the deployed configuration shown in at least FIGS. 3C, 3D. In some embodiments, various pairs of transducers 306 are spaced apart with respect to one another. In some embodiments, various regions of space are located between various pairs of the transducers 306. For example, in FIG. 3D the transducer-based device 300 includes at least a first transducer 306a, a second transducer 306b, and a third transducer 306c (all collectively referred to as transducers 306). In some embodiments, each of the first, the second, and the third transducers 306a, 306b, and 306c are adjacent transducers in the spaced apart distribution. In some embodiments, the first and the second transducers 306a, 306b are located on different elongate members 304, while the second and the third transducers 306b, 306c are located on a same elongate member 304. In some embodiments, a first region of space 350 is between the first and the second transducers 306a, 306b. In various embodiments, a first region of space 350 is between the respective electrodes 315a, 315b of the first and the second transducers 306a, 306b. In some embodiments, the first region of space 350 is not associated with any physical portion of structure 308. In some embodiments, a second region of space 360 associated with a physical portion of device 300 (e.g., a portion of an elongate member 304) is between the second and the third transducers 306b, 306c. In various embodiments, the second region of space 360 is between the respective electrodes 315b, 315c of the second and the third transducers 306b, 306c. In some embodiments, each of the first and the second regions of space 350, 360 does not include a transducer of transducer-based device 300. In some embodiments, each of the first and the second regions of space 350, 360 does not include any transducer. It is noted that other embodiments need not employ a group of elongate members 304 as employed in the illustrated embodiment. For example, other embodiments may employ a structure having one or more surfaces, at least a portion of the one or more surfaces defining one or more openings in the structure. In these embodiments, a region of space not associated with any physical portion of the structure may extend over at least part of an opening of the one or more openings. In other example embodiments, other structures may be employed to support or carry transducers of a transducer-based device such as a transducer-based catheter. For example, an elongated catheter member may be used to distribute the transducers in a linear or curvilinear array. Basket catheters or balloon catheters may be used to distribute the transducers in a two-dimensional or three-dimensional array.

A great deal of experience and spatial awareness is required in order to manipulate a catheter efficiently inside a bodily cavity. A typical single tip catheter (i.e., an elongated or stick-like catheter with a single working tip that is configured to engage tissue) is generally insensitive to orientation and so effectively only has 3 translational degrees of freedom, making it somewhat simpler to visualize and plan movement in the bodily cavity. It is challenging to manipulate due to its small size, requiring precise movements for long durations of time throughout a procedure. An advantage of a multi-transducer catheter (e.g., a catheter that employs a plurality of transducers, such as various basket catheters or balloon catheters) typically require less precise movements and can dwell in a single position addressing a large portion of the bodily cavity, for example, the left atrium. In particular, the trend to perform procedures, such as pulmonary vein isolation with multi-transducer catheters, is increasing as it is much easier to ablate an encircling lesion around a pulmonary vein with one or two activations of these multi-transducer devices than to form such an encircling lesion in a bread-crumb trail manner employing a single tip catheter. With these advantages, however, there is also a need to understand the particular orientation of the multi-transducer catheter and contact of tissue relative to the multi-transducer catheter in order to move it more efficiently to improve contact in a specific area, for example, to close an incomplete ring of contact around a pulmonary vein.

Various systems provide various images of a tissue surface, and, in some cases, a portion of the catheter with respect to the tissue surface. In many cases, some of the images are graphical in nature. One general view of the tissue surface that is generally easy to understand, for example, is a three-dimensional view, which shows a three-dimensional view of the tissue surface, the catheter device, or both. Often, however, when the tissue surface belongs to a three-dimensional structure such as a bodily cavity, the three-dimensional view presents visual information representing the foreside of the cavity, the foreside of the catheter, or both, while obscuring the backside of the cavity, the backside of the catheter, or both. A view that shows more information (e.g., both the foreside and the backside of the aforementioned entities) is, for example a two-dimensional view. Two-dimensional views, however, tend to introduce distortion since they may be created by distorting a three-dimensional representation onto a two-dimensional plane (e.g., via a polar bulls-eyed projection or a conformal projection such as a Mercator or Transverse Mercator projection). U.S. Patent Application Publication No. 2016/0135690, published May 19, 2016, which is hereby incorporated herein by reference, provides examples of two- and three-dimensional representations. Accordingly, both these views often present challenges to the health care provider as to where a particular region requires improved contact between a particular transducer of the catheter and a particular tissue region, and even if these views are able to indicate where the particular region is, the health care provider may be unsure how to manipulate the catheter to improve the contact between the particular transducer and the particular tissue region, or how to manipulate the catheter to improve the contact between the particular transducer and the particular tissue region without reducing a desired level of transducer-to-tissue contact in another tissue region provided by another set of the transducers. According to some embodiments of the present invention, a data processing device system is configured to provide the health care provider (e.g., a clinician) with information on how to manipulate the catheter in order to improve contact at least with a specific one or more transducers to improve procedure efficacy, reduce procedure time, expedite health care provider training, and aid health care providers.

Utilizing transducer-based device geometry and through various trials and device testing, the present inventor has identified device movements that improve transducer-to-tissue contact for particular transducer sets. For example, for a transducer-based device, such as one of those illustrated in FIGS. 2 and 3A-3I, the therapeutic structure on which the transducers are located of the catheter device system (e.g., structure 218 in at least FIG. 2 or structure 308 in at least FIGS. 3A and 3C) can be advanced, retracted, rotated, or bent (e.g., distorted in shape) according to some embodiments. The shaft to which such therapeutic structure is physically coupled (e.g., shaft 214 or shaft 314) or the sheath in which at least a portion of the shaft is located (e.g., sheath 212 or sheath 312) can also be advanced, retracted, rotated, or bent.

In this context of possible movements, and based at least on the geometry of the transducer-based device, the present inventor recognized that certain movements have a likelihood of increasing transducer-to-tissue contact for particular transducers on the therapeutic structure. For example, consider FIG. 8A, which illustrates one preferred orientation of a catheter device system (e.g., the catheter device system of FIG. 2 or 3) when, for example, attempting to isolate (form an electrophysiological conduction block) a left superior pulmonary vein ("LSPV") 802 in a heart 804 by forming an ablated tissue region encircling the LSPV for the treatment of atrial fibrillation, according to some embodiments. FIG. 8B provides an example of a graphical user interface, similar to those of FIGS. 5, discussed in more detail below, that visually presents a map of degree-of-contact signals sensed by a plurality of transducers (e.g., transducers 220 or transducers 306), the map, in the example of FIG. 8B, representing the preferred orientation of the catheter device system of FIG. 8A, according to some embodiments. In this regard, region 808 of low (or no) tissue contact (compared to regions 810 of high or good tissue contact) in FIG. 8B corresponds to the LSPV 802. Also consider FIG. 9A, which illustrates one preferred orientation of the catheter device system when, for example, attempting to isolate (form an electrophysiological conduction block) a right superior pulmonary vein ("RSPV") 902 in the heart 804 by forming an ablated tissue region encircling the RSPV for the treatment of atrial fibrillation, according to some embodiments. FIG. 9B provides an example of a graphical user interface, similar to that of FIG. 8B that visually presents a map of degree-of-contact signals sensed by a plurality of transducers (e.g., transducers 220 or transducers 306), the map, in the example of FIG. 9B, representing the preferred orientation of the catheter device system of FIG. 9A, according to some embodiments. In this regard, region 904 of low (or no) tissue contact (compared to regions 910 of high or good tissue contact) in FIG. 8B corresponds to the RSPV 902.

As illustrated by a comparison of FIG. 8 with FIGS. 9, the present inventor recognized that, for transducers in portion 806 (which may correspond to at least part of the proximal portion 308a in some embodiments) of the transducer-based device (e.g., transducer-based device 200, 300), an advancement motion (e.g., see FIG. 3E, discussed in more detail below) of at least a portion of the catheter device system is likely to increase tissue-contact for at least some of the transducers within that portion 806. In the examples of FIGS. 8 and 9, such advancement motion is likely to improve contact for at least some of the transducers within portion 806 regardless of whether the LSPV 802 or the RSPV 902 is being isolated, according to some embodiments. Accordingly, if a transducer in region 806, in some embodiments, is exhibiting insufficient tissue contact, the data processing device system 110 or 310 may be configured to facilitate execution of a corresponding transducer-to-tissue contact improvement procedure including an advancement of at least a portion of the catheter device system at least by visually presenting, via a display device system, an image or animation of catheter device controls (e.g., as described with respect to FIGS. 7, below) indicating how such controls should be manipulated by a health care provider to achieve the advancement, or at least by visually presenting, via a display device system, a dialog box describing that such advancement should be performed. It should be noted that the invention is not limited to these or any other examples provided herein, which are referred to for purposes of illustration only.

Figure 8A:
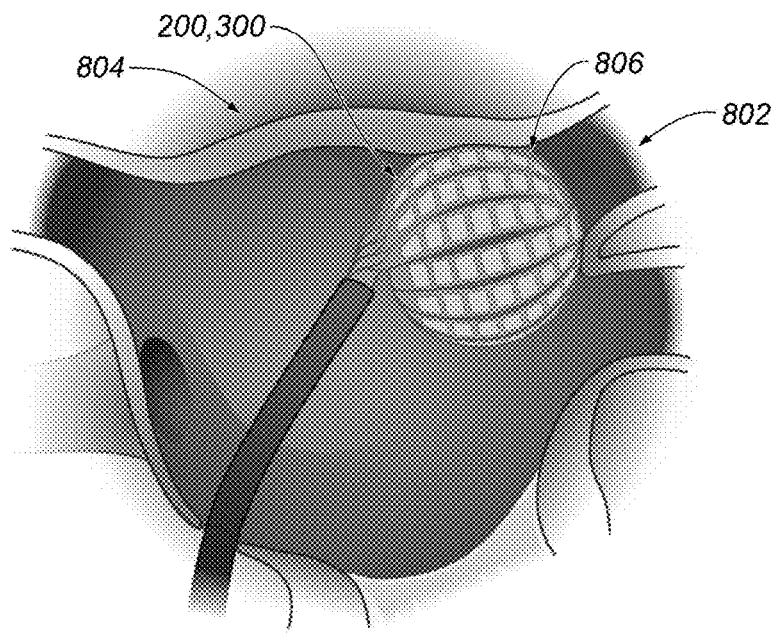
FIG. 8A illustrates one preferred orientation of a catheter device system when, for example, attempting to isolate a left superior pulmonary vein in a heart by forming an ablated tissue region encircling the left superior pulmonary vein for the treatment of atrial fibrillation, according to some embodiments.
Figure 8B:
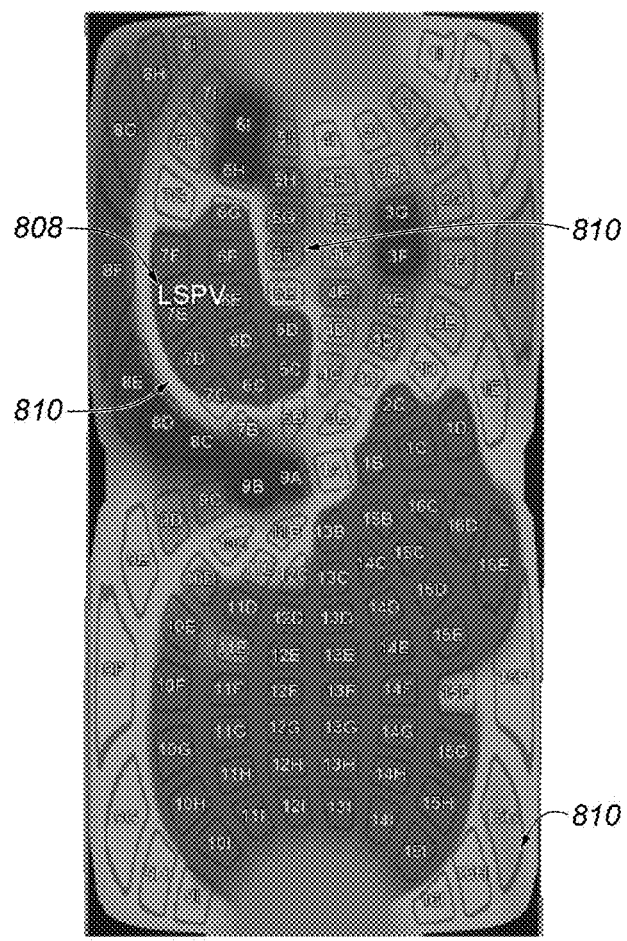
FIG. 8B illustrates a graphical user interface, similar to those of FIGS. 5, that visually presents a map of degree-of-contact signals sensed by a plurality of transducers, the map, in the example of FIG. 8B, representing the preferred orientation of the catheter device system of FIG. 8A, according to some embodiments.
Figure 9A:
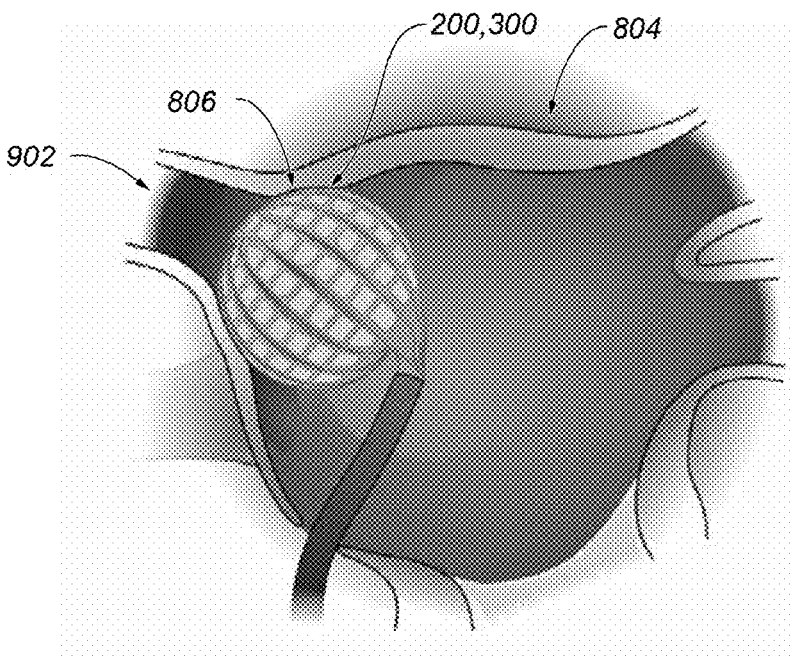
FIG. 9A illustrates one preferred orientation of a catheter device system when, for example, attempting to isolate a right superior pulmonary vein in a heart by forming an ablated tissue region encircling the right superior pulmonary vein for the treatment of atrial fibrillation, according to some embodiments.
Figure 9B:
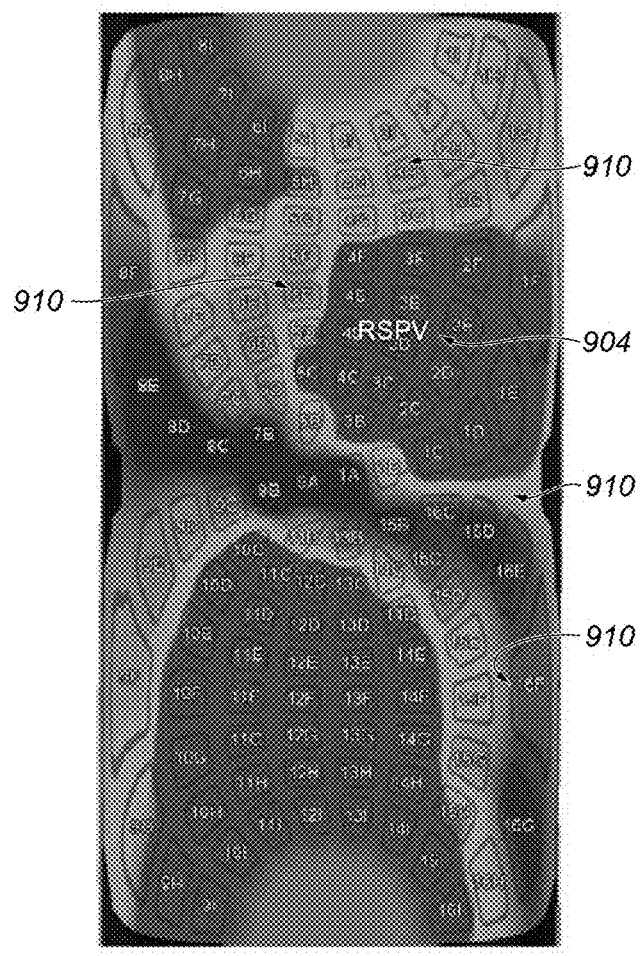
FIG. 9B illustrates a graphical user interface, similar to those of FIGS. 5, that visually presents a map of degree-of-contact signals sensed by a plurality of transducers, the map, in the example of FIG. 9B, representing the preferred orientation of the catheter device system of FIG. 9A, according to some embodiments.
Figure 10A:
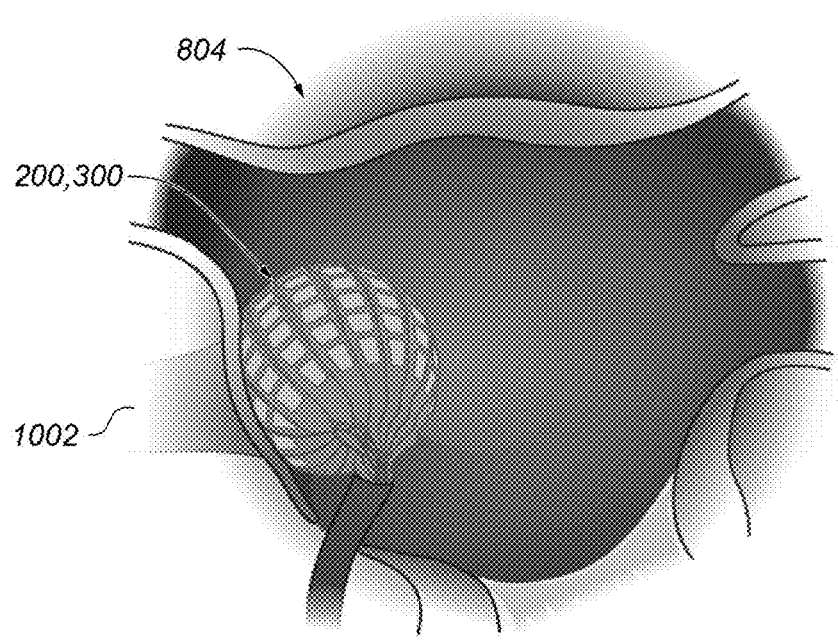
FIG. 10A illustrates one preferred orientation of a catheter device system when, for example, attempting to isolate a right inferior pulmonary vein in a heart by forming an ablated tissue region encircling the right inferior pulmonary vein for the treatment of atrial fibrillation, according to some embodiments.
Figure 10B:
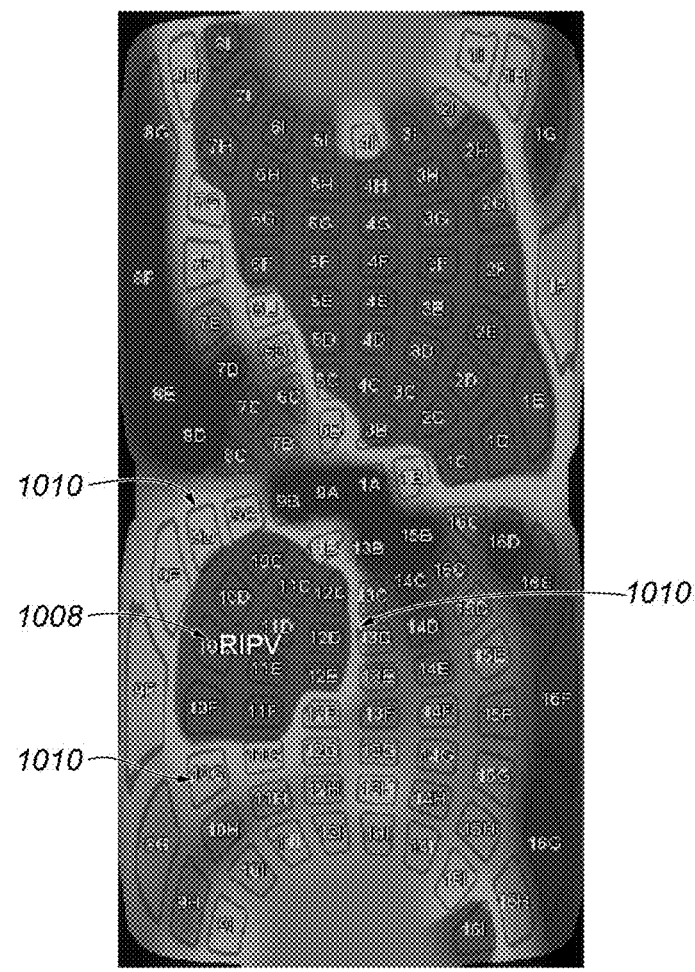
FIG. 10B illustrates a graphical user interface, similar to those of FIGS. 5, that visually presents a map of degree-of-contact signals sensed by a plurality of transducers, the map, in the example of FIG. 10B, representing the preferred orientation of the catheter device system of FIG. 10A, according to some embodiments.

For another example, also consider FIG. 10A, which illustrates another preferred orientation of a catheter device system in contrast to FIGS. 8A and 9A, when, for example, attempting to isolate the right inferior pulmonary vein ("RIPV") 1002 in the heart 804 by forming an ablated tissue region encircling the RIPV for the treatment of atrial fibrillation, according to some embodiments. FIG. 10B provides an example of a graphical user interface, similar to those of FIGS. 5, discussed in more detail below, that visually presents a map of degree-of-contact signals sensed by a plurality of transducers (e.g., transducers 220 or transducers 306), the map, in the example of FIG. 10B, representing the preferred orientation of the catheter device system of FIG. 10A, according to some embodiments. In this regard, region 1008 of low (or no) tissue contact (compared to regions 1010 of high or good tissue contact) in FIG. 10B corresponds to the RIPV 1002. It can be seen that the orientation of the transducer-based device 200, 300 in FIG. 10A is particularly suitable in this configuration for rotation for varying transducer-to-tissue contact, in some embodiments. Accordingly, for example, at least in a state in which at least an advancing movement of the transducer-based device 200, 300 does not achieve a desired transducer-to-tissue contact state, the data processing device system 110 or 310 may be configured to facilitate execution of a rotational movement as part of the tissue contact improvement procedure, according to some embodiments. In this regard, the tissue contact improvement procedure may include a sequence of movements where tissue contact is re-evaluated after each movement in the sequence. As mentioned above, the present invention is not limited to the examples provided above or otherwise herein, which are referred to for purposes of illustration only. In this regard, additional examples are provided below.

It can be seen that the present inventor recognized that, by determining that a particular transducer or region of transducers improperly exhibits insufficient tissue contact (or vice versa that a particular transducer or region of transducers improperly exhibits excessive tissue contact) as compared to a desired (e.g., preferred, predetermined, or selected) tissue-contact state, a set of one or more appropriate catheter device system manipulations may be identified, determined, or selected and utilized to convert the improper tissue-contact arrangement or configuration into the desired or predetermined tissue-contact state. In some embodiments of the present invention, the identified, determined, or selected appropriate manipulation set may be presented to the operator(s) to assist the operator(s) in understanding and performing the appropriate manipulation set to promptly and effectively achieve the desired tissue-contact configuration. Accordingly, various embodiments of the present invention provide benefits including an increase in procedure efficacy and a decrease in procedure duration.

Various examples provided below often refer to tissue contact improvement procedures that involve a single manipulation or movement of at least a portion of a catheter device system. It is noted that such examples refer to a single manipulation or movement merely for clarity of discussion and that various embodiments of the present invention may include tissue contact improvement procedures involving more than one manipulation or movement.

According to some embodiments, a system is provided that may include an input-output device system (e.g., 120, 320) that may, in some embodiments, include a catheter device system that includes a plurality of transducers (e.g., 220, 306, 406). The catheter device system may include the catheter body to which the plurality of transducers (or the structure on which the transducers reside) is physically coupled (e.g., catheter 206, and elongate shaft member 314). In some embodiments, the catheter device system may also include other components such as catheter sheath 312. According to various embodiments, different portions of the catheter device system are manipulable to in turn manipulate various ones of the plurality of transducers (e.g., 220, 306, 406) into various degrees of contact with a tissue wall within a patient's body. According to various embodiments, the plurality of transducers (e.g., 220, 306, 406) are arranged in a distribution (for example, the spaced apart distribution associated with the deployed configuration of FIGS. 3C, 3D), the distribution positionable in a bodily cavity of a patient. The bodily cavity is defined by at least a tissue wall, and, according to various embodiments, each transducer of the plurality of transducers is configured at least to sense a degree of contact between the transducer and the tissue wall. In some embodiments, each particular transducer of the plurality of transducers (e.g., 220, 306, 406) may be configured to sense a degree of contact between at least a portion of the particular transducer and the tissue wall. Various methods may be executed to determine the degree of tissue contact including, by way of non-limiting example, techniques including sensing impedance, sensing permittivity, sensing the presence or absence of flow of a fluid (e.g., a bodily fluid), or by sensing contact force or pressure. U.S. Pat. No. 8,906,011, issued Dec. 9, 2014, which is hereby incorporated herein by reference, describes example transducer sensing techniques. In some embodiments, the tissue-contacting portion of the transducer itself directly senses the degree of tissue contact. In some embodiments, a portion of the transducer other than the tissue-contacting portion of the transducer is configured to sense the degree of contact between the tissue wall and the tissue-contacting portion of the transducer. In some embodiments, the tissue-contacting portion of the transducer is provided by an electrode.

FIG. 6 includes a respective data generation and flow diagram, which may implement various embodiments of method 600 by way of associated computer-executable instructions, according to some example embodiments. In various example embodiments, a memory device system (e.g., memory device system 130 or 330) is communicatively connected to a data processing device system (e.g., data processing device systems 110 or 310, otherwise stated herein as "e.g., 110, 310") and stores a program executable by the data processing device system to cause the data processing device system to execute various embodiments of method 600 via interaction with at least, for example, a transducer-based device (e.g., transducer-based devices 200, 300, or 400). In these various embodiments, the program may include instructions configured to perform, or cause to be performed, various ones of the instructions associated with execution of various embodiments of method 600. In some embodiments, method 600 may include a subset of the associated blocks or additional blocks than those shown in FIG. 6. In some embodiments, method 600 may include a different sequence indicated between various ones of the associated blocks shown in FIG. 6.

In some embodiments, the memory device system (e.g., memory device system 130 or 330) stores one or more contact-improvement procedures. In some embodiments, the memory device system stores each contact-improvement procedure in association with a respective transducer set. In some embodiments, each contact-improvement procedure may also be stored by the memory device system in association with an improper tissue-contact arrangement or configuration. The improper tissue-contact arrangement or configuration may refer to a desired (e.g., preferred, predetermined, or selected) tissue-contact state not being exhibited by one or more transducers in the transducer set. For instance, the improper tissue-contact arrangement or configuration may be an unexpected or undesired tissue-contact state of one or more transducers in the transducer set, such as when a transducer improperly exhibits insufficient tissue contact to effectively perform tissue ablation, and the desired tissue-contact state is for that transducer or one or more other transducers in the transducer set occupying the same region as that transducer to exhibit sufficient tissue contact to effectively perform tissue ablation. On the other hand, there may be cases where a particular transducer exhibits tissue contact, but the desired tissue-contact state is for that transducer to exhibit no tissue contact, which may prompt, e.g., an instruction to retract the catheter from the tissue wall.

In some embodiments, block 602 is associated with computer-executable instructions configured to cause the data processing device system (e.g., 110, 310) to receive, via the input-output device system (e.g., 120, 320), a plurality of degree-of-contact signals respectively from the plurality of transducers (e.g., 220, 306, 406), the plurality of degree-of-contact signals respectively indicating a degree of contact between the respective transducer of the plurality of transducers (e.g., 220, 306, 406) and the tissue wall. In some embodiments, the degree of contact detected between at least one of the respective transducers of the plurality of transducers (e.g., 220, 306, 406) and the tissue wall may indicate an all-or-nothing degree of contact (i.e., "contact" or "no-contact"). For example, in some embodiments, the at least one of the respective transducers may include a force or pressure sensor whose respective degree-of-contact signal indicates either the presence of at least some contact between the at least one of the respective transducers and the tissue wall, or the presence of no contact at all between the at least one of the respective transducers and the tissue wall. In some embodiments, the degree of contact detected between at least one of the respective transducers of the plurality of transducers (e.g., 220, 306, 406) and the tissue wall may indicate at least different levels of at least some contact between the at least one of the respective transducers and the tissue wall. For example, in some embodiments, the respective degree-of-contact signal of the at least one of the respective transducers may indicate different levels of at least some contact existing between a portion of the at least one of the respective transducers and the tissue wall. For example, transducers configured to sense impedance or sense the presence or absence of flow of a fluid (e.g., a bodily fluid) adjacent the transducer may produce various signals indicating different levels of at least some contact between the transducer and the tissue wall. In some embodiments, the respective degree-of-contact signal of the at least one of the respective transducers may indicate different amounts of a tissue-contactable portion (e.g., an electrode) of the at least one of the respective transducers that is in contact with the tissue wall, each of the different amounts indicating at least some contact between the tissue-contactable portion and the tissue wall. FIGS. 5, below, provide examples of graphical user interfaces that visually present a map of such degree-of-contact signals indicating various amounts of tissue contact sensed by a plurality of transducers, according to some embodiments. In some embodiments, the respective degree-of-contact signal of the at least one of the respective transducers may indicate a temporal characteristic of the contact between the at least one transducer and the tissue wall. For example, contact between the at least one transducer and the tissue wall may be intermittent in nature and the respective degree-of-contact signal may indicate an amount of time that (a) contact exists, (b) contact does not exist, or both (a) and (b) between the at least one of the respective transducers and the tissue wall.

In some embodiments, block 604 is associated with computer-executable instructions configured to cause the data processing device system (e.g., 110, 310) to identify a particular transducer of the plurality of transducers (e.g., 220, 306, 406) as exhibiting an improper contact arrangement or configuration with the tissue wall based at least on an interaction with data associated with at least one of the received degree-of-contact signals. The improper contact arrangement or configuration may be unexpected or undesired insufficient tissue contact or unexpected or undesired tissue contact, depending on circumstances and embodiments.

The improper contact arrangement or configuration between the particular transducer and the tissue wall may be deemed improper based on various factors. For example, the contact may be deemed improper at least because it is insufficient to allow the particular transducer or another transducer to perform a particular task or to perform a particular task with a required or desired amount of efficacy. For example, in some embodiments, the improper contact arrangement or configuration between the particular transducer and the tissue wall is an insufficient contact between the particular transducer and the tissue wall for at least the particular transducer to perform tissue ablation on the tissue wall. Performing tissue ablation may require a particular degree of contact between the particular transducer and the tissue wall that is sufficient to create an ablated tissue region (e.g., also known as a lesion) with a set of a desired size characteristics such as sufficient depth into the tissue wall (e.g., to ensure the formation of a transmural electrophysiological block) or sufficient width to merge with another lesion. Additionally, the required particular degree of contact during ablation may need to be sufficient to avoid the ablative energy being directed toward blood rather than the tissue wall to avoid the formation of thermally-induced thermal coagulum in the blood. It is noted that ablation is not the only application that may dictate a particular degree of contact between the particular transducer and the tissue wall. For example, in some applications, the particular transducer may be configured to measure electropotential activity in the tissue wall. Lack of a sufficient degree-of-contact between the particular transducer and the tissue wall may lead to increased amount of far-field effects on the measured signals.

In some embodiments, at least some of the plurality of degree-of-contact signals may indicate that the particular transducer exhibits insufficient contact with the tissue wall concurrently with at least a second transducer of the plurality of transducers exhibiting sufficient contact with the tissue wall. According to some embodiments, the interaction with the data referred to in block 604 associated with at least one of the received degree-of-contact signals includes an analysis of the data performed by the data processing device system (e.g., 110, 310). In some embodiments, the data processing device system (e.g., 110, 310) is configured by the program at least to execute the identification of the particular transducers as exhibiting an improper contact arrangement or configuration with the tissue wall at least by determining, based at least on the analysis of the data, that identifies particular ones of the transducers of the plurality of transducers (e.g., 220, 306, 406) other than the particular transducer exhibiting sufficient contact with the tissue wall while the particular transducer exhibits insufficient contact with the tissue wall. For example, in various embodiments, contact between each of at least a group of the plurality of transducers (e.g., 220, 306, 406) is required or desirable by a particular procedure (e.g., activating a group of the transducers circumferentially arranged around a pulmonary vein to ablate the tissue wall so as to electrically isolate the pulmonary vein). If the respective degree-of-contact signals indicate sufficient tissue contact for some but not all of the transducers in the group of transducers, then it may be determined that tissue contact for the group of transducers as a whole is insufficient to effectively execute the particular procedure.

In some embodiments, the data processing device system (e.g., 110, 310) may be configured by the program at least to execute the identification (e.g., per block 604) of the particular transducer as exhibiting an improper contact arrangement or configuration with the tissue wall at least by determining, based at least on the analysis of the degree-of-contact data, that particular ones of the transducers of the plurality of transducers (e.g., 220, 306, 406) other than the particular transducer exhibit sufficient contact with the tissue wall with respect to a particular anatomical feature of the bodily cavity, but that the particular transducer of the plurality of transducers (e.g., 220, 306, 406) exhibits insufficient contact with the tissue wall with respect to the particular anatomical feature of the bodily cavity. In some embodiments, the anatomical feature includes an ostium of a vein. In some embodiments, the anatomical feature is a pulmonary vein provided in an intra-cardiac cavity.

According to some embodiments, the interaction with the data (e.g., per block 604) associated with at least one of the received degree-of-contact signals includes: (a) the data processing device system (e.g., 110, 310) causing the input device system (e.g., 120, 320) to output a representation of the data in association with an identifier of the particular transducer, and (b) the data processing device system (e.g., 110, 310) receiving user input via the input-output device system (e.g., 120, 320), after outputting the data (or a derivative thereof) in association with the identifier of the particular transducer, the user input identifying the particular transducer as exhibiting an improper contact arrangement or configuration with the tissue wall. An example of an output representation of data associated with the degree-of-contact signals from the transducers in association with identifiers of transducers may be, e.g., a map like that shown in FIGS. 8B and 9B, and FIGS. 5, where the degree-of-contact signals are represented by color information in conjunction with representations of the respective transducers and alpha-numeric identifiers (e.g., 1A, 1B, 1C, etc.) of the respective transducers, according to some embodiments. With the display of the map (or other representation of the data and transducer identifiers), a user or operator may select (e.g., by way of a user-input device such as a keyboard, mouse, touch screen, etc.) a particular transducer as exhibiting insufficient contact, from which the data processing device system may be configured to output the corresponding tissue contact improvement procedure, according to some embodiments. In some embodiments, the program (e.g., for execution of method 600) includes an instruction set that configures the data processing device system (e.g., 110, 310) to prompt or otherwise notify the user via the input-output device system (e.g., 120, 320) to provide user input making a selection indicating that the one or more transducers exhibit an improper contact arrangement or configuration with the tissue wall. For instance, in some embodiments, user input may facilitate identification of a particular transducer exhibiting an improper tissue-contact arrangement or configuration, e.g., via selection of the particular transducer via a user interface (e.g., like those shown in FIG. 5). In this regard, in some embodiments, the preferred tissue-contact state and the improper tissue-contact arrangement or configuration may be determined or identified by the data processing device system (e.g., 110, 310) based at least in part on user input, according to some embodiments.

In some embodiments, the input-output device system (e.g., 120, 320) may include a display device system (e.g., 332). In some embodiments, the data processing device system (e.g., 110, 310) may be communicatively connected to the display device system (e.g., 332), the data processing device system (e.g., 110, 310) configured by program instructions stored in the memory device system (e.g., 130, 330) at least to cause the display device system (e.g., 332) to display a graphical representation including a visual presentation of contact information representative of at least some of the plurality of degree-of-contact signals. Each of FIG. 5 illustrates a graphical interface including a graphical representation provided by a display device system (e.g., 332) via the data processing device system (e.g., 110, 310), according to some example embodiments. The graphical representation may include a visual presentation of contact information representative of at least some of the plurality of degree-of-contact signals received by the data processing device system from the transducers (e.g., 220, 306, 406). In some embodiments, the graphical representation includes a three-dimensional graphical representation of at least a portion of a transducer-based device (e.g., at least structure 218 in FIG. 2 and structures 308 in FIG. 3). In some embodiments, the data processing device system (110, 310) may be configured by the program to access a predefined model (e.g., a computer-aided-design ("CAD")) or other computer-readable model stored in memory device system (e.g., 130, 330) of the at least the portion of the transducer-based device and display the at least the portion of the transducer-based device according to such model. In some embodiments, the graphical representation depicts the transducer-based device as including a first portion 508*a* associated with a first portion of the transducer-based device (e.g., distal portion 308*b* when having the first domed shape 309*a*) and a second portion 508*b* associated with a second portion of the transducer-based device (e.g., proximal portion 308*a* having the second domed shape 309*b*). A separation graphical element 503 may be employed between the first and the domed portions 508*a*, 508*b* in some embodiments, but may be omitted in other embodiments. It is noted that in the three-dimensional representations on the right-hand sides of respective ones of FIG. 5 only show a foreside view of the transducer-based device with the backside view obscured from view, according to some embodiments. In some embodiments, the program may include view manipulation instructions that allow rotation or other manipulation of the displayed three-dimensional representation of the transducer-based device to show a backside view thereof. In some embodiments, the program may include display instructions configured to cause both a foreside view and a backside view of the transducer-based device to be concurrently displayed, such as via the Mercator-based projections shown on the left-hand sides of respective ones of FIG. 5. It is noted that various other transducer-based devices may be depicted according to the instructions associated with the program in other embodiments.

In some embodiments, the graphical representation includes a two-dimensional graphical representation of at least a portion of a transducer-based device. In some embodiments, the two-dimensional graphical representation displays the surface of a three-dimensional structure distorted onto a two-dimensional plane. In some embodiments, the two-dimensional graphical representation includes a polar or bullseye mapping. In some embodiments, the two-dimensional graphical representation includes a conformal mapping. For example, various ones of at least FIG. 5 include a transverse Mercator projection of a transducer-based device.

In each of the FIGS. 5, the graphical representation includes both a three-dimensional view of the transducer-based device and a two-dimensional view of the transducer-based device, according to some embodiments. In each of the FIGS. 5, the visual presentation of contact information varies in accordance with variances between the degrees-of-contact signals provided by the plurality of transducers (e.g., 220, 306, 406). In particular, various ones of the FIG. 5 correspond to situations in which the transducer-based device has been positioned into a pulmonary vein structure found in a cardiac cavity. In FIGS. 5, the contact information associated with the contact between the plurality of transducers (e.g., 220, 306, 406) and portions of the tissue wall that make up portions of the pulmonary vein and possibly other parts of the tissue wall that make other portions the cardiac chamber is visually displayed with regions of little or no contact (e.g., 512) and regions of contact (e.g., 510), according to various embodiments. It is noted, according the various embodiments, that, in various ones of FIGS. 5, degree-of-contact is represented in grayscale with, for the sake of illustration, no or lightest contact represented in shades of white (see, e.g., region 509*a* in FIG. 5A), with slightly heavier contact represented in a quickly-scaling-up narrow-band dark color region (see, e.g., region 509*b* in FIG. 5A), then a higher, moderate contact region is represented by a medium-gray color region (see, e.g., region 509*c* in FIG. 5A) that is lighter than the narrow-band dark region (e.g., region 509*b*), and then heaviest contact is represented by another dark color region (see, e.g., region 509*d* in FIG. 5A) that is isolated from the narrow-band dark region (e.g., region 509*b*). However, the grayscale shown in FIGS. 8B, 9B, and 10B is different than the approach taken in FIGS. 5, in that, no tissue contact is represented by unvarying medium-dark coloring, low to moderate tissue contact is represented by light coloring, and heavy tissue contact is represented by the darkest colors. It is noted that in other embodiments, other forms of graphical representation may be provided to show different levels of contact corresponding to the degree-of-contact signals provided by the plurality of transducers (e.g., 220, 306, 406). For example, different colors, hues or intensities, or different patterns may be employed to display the different levels of contact, according to some embodiments. Various ones of FIG. 5 show visually graduated transitions between various regions showing different levels or degrees of contact. In some embodiments, graphical regions with substantially distinct boundaries are employed to distinguish at least two regions representing different levels or degrees of contact. In some embodiments, the visual presentation of contact information representative of at least some of the plurality of degree-of-contact signals includes a respective visual presentation of an element of the contact information corresponding to a respective signal of the at least some of the plurality of degree-of-contact signals, each respective visual representation of an element of the contact information displayed at least proximate a graphical representation of the respective transducer of the plurality of transducers (e.g., 220, 306, 406) that provided the respective signal of the at least some of the plurality of degree-of-contact signals. For example, in various ones of FIG. 5, graphical elements 501 representing each of the transducers of the plurality of transducers (e.g., 220, 306, 406) are positioned in each of the two-dimensional and three-dimensional representations. According to various embodiments, each of a plurality of graphical regions representing a degree of contact between respective ones of the plurality of transducers (e.g., 220, 306, 406) and the tissue wall are shown in an overlapping arrangement with particular ones of the graphical elements 501 that correspond with the respective transducers. Other spatial arrangements between the degree-of-contact graphical regions and the graphical elements 501 may be employed in other embodiments.

In some embodiments, the graphical representation including the visual presentation of contact information representative of at least some of the plurality of degree-of-contact signal is displayed with a particular spatial distribution among visually presented elements of the contact information that is consistent with a spatial distribution of the respective transducers of the plurality of transducers (e.g., 220, 306, 406) providing the respective degree-of-contact signals of the at least some of the plurality of degree-of-contact signals during a sensing of contact between the respective transducers of the plurality of transducers (e.g., 220, 306, 406) and the tissue wall. For example, in various ones of FIGS. 5, the graphical elements 501 representing the plurality of transducers (e.g., 220, 306, 406) are displayed in spatial distributions in the two-dimensional and three-dimensional representations that are consistent with the spatial distributions of the plurality of transducers (e.g., 220, 306, 406) (e.g., a spatial distribution of the plurality of transducers (e.g., 220, 306, 406) when the structure 308 is in a deployed configuration), and, accordingly, the plurality of degree-of-contact graphical regions that are positioned in an overlapping relationship with respective ones of the graphical elements 501 also include a spatial distribution therebetween that is consistent with the spatial distribution of the plurality of transducers (e.g., 220, 306, 406). It is noted that, in some embodiments, the graphical elements 501 representing the plurality of transducers (e.g., 220, 306, 406) are not shown while the plurality of degree-of-contact graphical regions are shown (e.g., with a spatial distribution therebetween that is consistent with a spatial distribution of the plurality of transducers (e.g., 220, 306, 406)). It is noted that each of the graphical elements 501 is identified uniquely, e.g., by an alpha-numeric designator, such as 1A, 1B, 1C, 1D, etc., in FIGS. 5, that links it to a respective one of the plurality of transducers (e.g., 220, 306, 406) according to various embodiments. Such identifiers may not be present in actual devices. In various embodiments, a user or the data-processing device system (e.g., 110, 310) itself may be configured to map different degrees of contact to specific ones of the plurality of transducers (e.g., 220, 306, 406). According to some embodiments, various ones of FIG. 5 include particular graphical regions that are each interpolated from data acquired form a group of the plurality of-degree-of contact signals and are shown distributed among the graphical regions corresponding to the plurality of-degree-of contact signals. The present invention is not limited to any particular interpolation technique.

In some embodiments, other forms graphical representations may be employed to display contact information related to the plurality of-degree-of contact signals. For example, the contact information may be mapped onto a two-dimensional or three-dimensional map of a bodily cavity (e.g., an intra-cardiac cavity) that the tissue wall may define. Such maps may be defined in various manners. For example, in some embodiments, the maps are created using an electro-anatomical mapping system that employs a locator sensor set incorporated into a mapping catheter to allow the acquisition of three-dimensional location coordinates of at least a portion of the mapping catheter that is brought into contact with the tissue wall. In some embodiments, the locator sensor set detects a magnetic field around the patient's torso. The sensing of the magnetic field by the location sensor set enables determination of the location and orientation (e.g., in six degrees of freedom) of the location sensor set. In some embodiments, the locator sensor set detects a plurality of generally orthogonal electric fields generated from external electrodes positioned around the patient's torso. Electrical properties (e.g., voltage, impedance) generated by the electric fields are recorded at the locator sensor set to allow for the distance from each external electrode to be triangulated (typically with the help of a reference electrode) thereby determining the position of at least portion of the mapping catheter to be determined. According to various embodiments, electro-anatomical mapping systems such as those described above allow for the simultaneous acquisition of other information in addition to location information. For example, cardiac electropotential information may be simultaneously acquired. In some embodiments, the degree-of-contact signals are simultaneously acquired. In some embodiments, information related to the degree-of-contact signals may be superimposed on other maps or models of the bodily cavity including those generated by CT or MRI imaging techniques.

Referring back to block 604 associated with method 600, the data processing device system (e.g., 110, 310) is configured, according to some embodiments, to cause the display device system 332 to identify various particular transducers (e.g., as indicated by contact information at least proximate respective one of the graphical elements 501) in various ones of FIG. 5. For example, FIG. 5A corresponds to a situation in which the transducer-based device has been brought into substantial contact with tissue surrounding a pulmonary vein (the pulmonary vein itself is represented by a region 512a of low contact in both the two-dimensional and three-dimensional representations). It is noted that the grayscale shading shown in FIG. 5A in the region near graphical element 501a has been exaggerated to make its lack of tissue contact more clear. In some applications, it is desired that a high degree of contact exist between each transducer of a group of the plurality of transducers (e.g., 220, 306, 406) and a region of the tissue wall that surrounds the pulmonary vein. For example, it may be desired that the group of transducers be in sufficient tissue contact that, when activated in an ablation mode, the group of transducers can encircle the pulmonary vein with a continuous circumferential lesion (for example, as is employed in some treatments of atrial fibrillation).

Figure 5A:
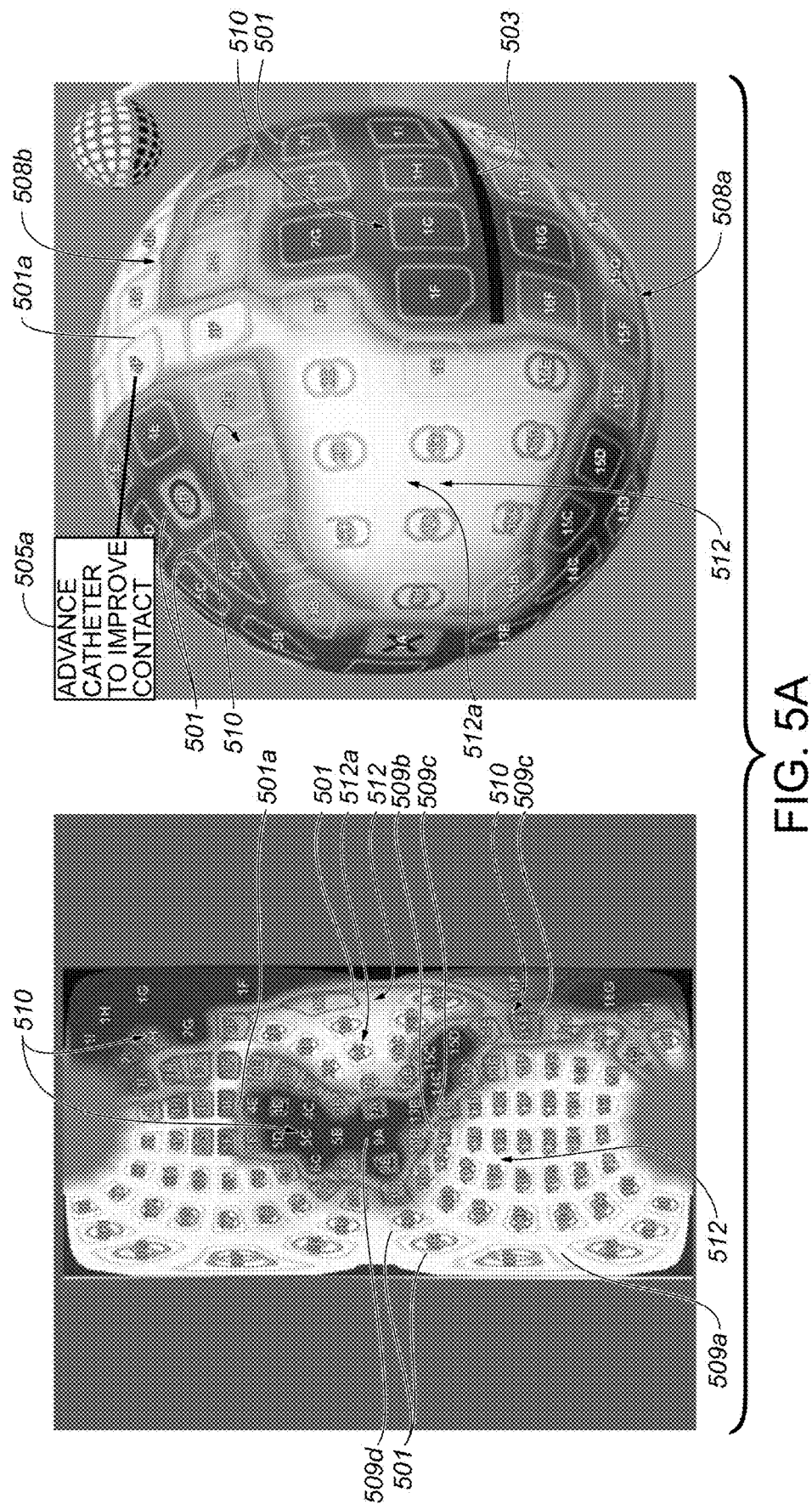
FIG. 5A includes a graphical interface providing a graphical representation according to various example embodiments, a depiction of at least a portion of a transducer-based device of a catheter device system, the depiction including a plurality of transducer graphical elements depicted among the graphical representation, and the graphical representation indicating a state in which at least a particular transducer exhibits an improper (e.g., insufficient) tissue contact arrangement or configuration to form a proper continuous circumferential lesion around a first pulmonary vein, according to some embodiments.

In FIG. 5A, the graphical element 501a, which graphically identifies a transducer 4F, is visually presented indicating that the particular corresponding transducer of the plurality of transducers (e.g., 220, 306, 406) is in an improper contact arrangement or configuration (in this case, an improper insufficient contact arrangement or configuration) with the tissue wall. It is noted that the grayscale shading shown in FIG. 5A in the region near graphical element 501a has been exaggerated to make its lack of tissue contact more clear. In some cases, the insufficient contact may render the particular transducer ineffective for a desired task (e.g., the employment of the particular transducer to form a transmural lesion). Identification of the particular transducer as exhibiting an improper contact arrangement or configuration with the tissue wall may be performed in various ways including as described above. In some embodiments, a) machine-based identification, b) user-based identification, or both a) and b) may be employed to identify 1) particular ones of plurality of transducers (e.g., 220, 306,

406) that exhibit a proper contact arrangement or configuration with the tissue wall, 2) particular ones of the plurality of transducers (e.g., 220, 306, 406) that exhibit an improper contact arrangement or configuration with the tissue wall, or both 1) and 2).

Often it is desired that the improper contact arrangement or configuration indicated by the graphical element 501*a* associated with the particular transducer identified as 4F be corrected. In some embodiments, it may be desired that this correction preferably be done while not significantly diminishing contact between others of the plurality of transducers (e.g., 220, 306, 406) that are indicated as having sufficient contact with the tissue wall that is to be maintained if at all possible.

Correcting an improper tissue contact arrangement or configuration between a particular transducer (e.g., the transducer identified as 4F by graphical element 501*a* in FIG. 5A) and the tissue wall is not an easy task especially when a plurality of different structure (e.g., structure 218 or structure 308) and shaft or sheath (e.g., shaft 214, 314 or sheath 212, 312) manipulations are possible and visibility is limited in a percutaneous operation. In many cases, it may not be intuitive from the graphical representation shown in FIG. 5A as to which set of one or more structure, shaft, or sheath manipulations may be best to improve contact between the particular transducer and the tissue wall. If the contact information is displayed on an anatomical map of the bodily cavity, it is often not intuitive, especially to early practitioners or infrequent practitioners, which of a plurality of different possible manipulations will lead to improved contact between the particular transducer and the tissue wall.

However, in accordance with some embodiments of the present invention, by identifying which specific transducer(s) of the plurality of transducers (e.g., 220, 306, 406) exhibit an improper contact arrangement or configuration with the tissue wall, the data processing device system (e.g., 110, 310) is configured by the program (e.g., for executing method 600) to instruct or suggest to the user how to best manipulate the catheter in order to improve contact with respect to the specific electrode or electrodes in a same region as the specific electrode. In multi-transducer catheter systems, some transducers will undergo movement that can lead to increased tissue contact under the influence of a particular catheter manipulation (e.g., structure, shaft, or sheath thereof in some embodiments) while other transducers will undergo movement that can lead to decreased tissue contact under the influence of the particular catheter manipulation as described below in this disclosure. By ascertaining which particular transducer of interest exhibits insufficient tissue contact, for example, the data processing device system (e.g., 110, 310) may be configured to select an appropriate set of one or more catheter manipulations that have a likelihood of improving the tissue contact associated with the particular transducer or with transducers in the same region as the particular transducer.

According to various embodiments, the memory device system (e.g., 130, 330) may store a first contact-improvement procedure in association with a first transducer set (e.g., transducers in region 806 in FIGS. 8A and 9A may be associated with an advancing movement followed by a rotational movement, according to some embodiments). According to various embodiments, the first contact-improvement procedure is specific to the first transducer set. Other contact-improvement procedures may also be stored, according to various embodiments, in the memory device system (e.g., 130, 330). In some embodiments, the other contact-improvements procedures may be associated with other transducer sets. In some embodiments, different contact-improvement procedures may be associated with a same transducer set. For example, one contact-improvement procedure including an advancing movement may be stored in the memory device system in association with a state in which a transducer in a first transducer set improperly exhibits insufficient tissue contact, and a second contact-improvement procedure including a retracting movement may be stored in the memory device system in association with a state in which the transducer in the first transducer set improperly exhibits tissue contact (e.g., when the transducer should not exhibit tissue contact), according to some embodiments.

Referring back to FIG. 6, block 604 may also be associated with computer-executable instructions configured to cause the data processing device system (e.g., 110, 310) to identify a transducer set to which the particular transducer, which exhibits the improper tissue contact arrangement or configuration, belongs, according to some embodiments. With respect to the examples of FIGS. 8A and 9A, the data processing device system (e.g., 110, 310) may be configured to determine that the particular transducer belongs to the set of transducers in region 806, which allows the data processing device system to retrieve the corresponding tissue contact improvement procedure from the memory device system (e.g., 130, 330), according to some embodiments.

Block 606 is associated with computer-executable instructions configured to cause the data processing device system (e.g., 110, 310) to cause the input-output device system (e.g., 120, 320), in response to the identifying the particular transducer as belonging to a particular transducer set and as exhibiting an improper contact arrangement or configuration with the tissue wall, to provide an indication of the first contact-improvement procedure to facilitate improved contact between the particular transducer and the tissue wall. In various embodiments associated with FIG. 5A, it is determined by the data processing device system (e.g., 110, 310) that the transducer identified as 4F by graphical element 501*a* is a transducer of a first transducer set, where each transducer in the first transducer set is associated with a first contact-improvement procedure that has been predetermined to have a likelihood of improving contact between each of at least one transducer in the first transducer set and a tissue wall based at least on a forward advancement of at least a portion of the transducer-based device system, according to some embodiments. This scenario is best understood upon review of FIG. 3E, which includes the structure 308 (e.g., in the deployed configuration), the plurality of transducers (e.g., 220, 306, 406), and the elongate shaft member (e.g., 314). It is noted that the structure 308 represented in FIGS. 3E-3I includes fewer elongate members and transducers than the structure 308 represented in FIGS. 3A-3D, which further illustrates that various embodiments of the present invention include different numbers of elongate members (e.g., elongate members 304) and transducers (e.g., 220, 306, 406). It also is noted in FIG. 3E that transducer 4F (determined per FIG. 5A to exhibit insufficient tissue contact) and any other transducers of the first transducer set are on a portion (e.g., first portion 308-1) of the structure 308 that can be advanced into improved tissue contact by a forward advancement of elongate shaft member 314, according to some embodiments. It is noted, according to some embodiments associated with FIG. 5A, that the transducers associated with the first transducer set are the particular ones of the plurality of transducers (e.g., 220, 306, 406) that generally see improved tissue contact by forward advancement of elongate shaft member 314 while other transducers of the plurality of transducers (e.g., 220, 306, 406) see little or no improvement in tissue contact from the first contact-improvement procedure. It is noted, according to some embodiments, that various contact improvement procedures (e.g., the first contact-improvement procedure) described in this disclosure may involve a manipulation of a portion of transducer-based device system that causes manipulation/movement of a particular set of the plurality of transducers (e.g., 220, 306, 406) while others of the plurality of transducers are not manipulated/moved. In some embodiments, various contact improvement procedures described in this disclosure may involve a manipulation of a portion of catheter device system that causes manipulation/movement of a transducer-based device system that causes manipulation/movement of all of the plurality of transducers (e.g., 220, 306, 406). For example, a movement of the elongate shaft member 314 will typically cause movement of all of the plurality of transducers in embodiments in which the structure 308 is fixedly coupled to the elongate shaft member 314.

In some embodiments, (for example, as described in further detail below), the memory device system (e.g., 130, 330) stores a first contact-improvement procedure in association with a first transducer set of the plurality of transducers (e.g., 220, 306, 406) and a second contact-improvement procedure in association with a second transducer set of the plurality of transducers, the first transducer set mutually exclusive with the second transducer set, and the second contact-improvement procedure being different than the first contact-improvement procedure. For example, depending on the transducers' respective locations on the transducer-based device (e.g., 200, 300), different mutually exclusive sets of transducers may be associated with different tissue-contact improvement procedures. However, the transducer sets need not be mutually exclusive in some embodiments, e.g., where a particular region of transducers on the transducer-based device may benefit from improved tissue contact by performing either of at least two tissue contact improvement procedures, where one is attempted first and another is attempted thereafter.

In some embodiments, similar to the first contact-improvement procedure for the first transducer set, the second contact-improvement procedure indicates a procedure to move one or more transducers of the plurality of transducers to improve contact between one or more transducers in the second transducer set of the plurality of transducers and the tissue wall, the moving of one or more transducers of the plurality of transducers in accordance with the second contact-improvement procedure being different than the moving of one or more transducers of the plurality of transducers in accordance with the procedure of the first contact-improvement procedure. In some embodiments, different contact improvement procedures may be required for different ones of a plurality of transducer sets of a multi-transducer catheter device system. For example, the first-contact improvement procedure may be beneficial for a first transducer set that generally experiences improved tissue contact by an advancing movement, and the second contact-improvement procedure may be beneficial for a second transducer set that generally experiences improved tissue contact by a retracting movement.

Figure 5B:
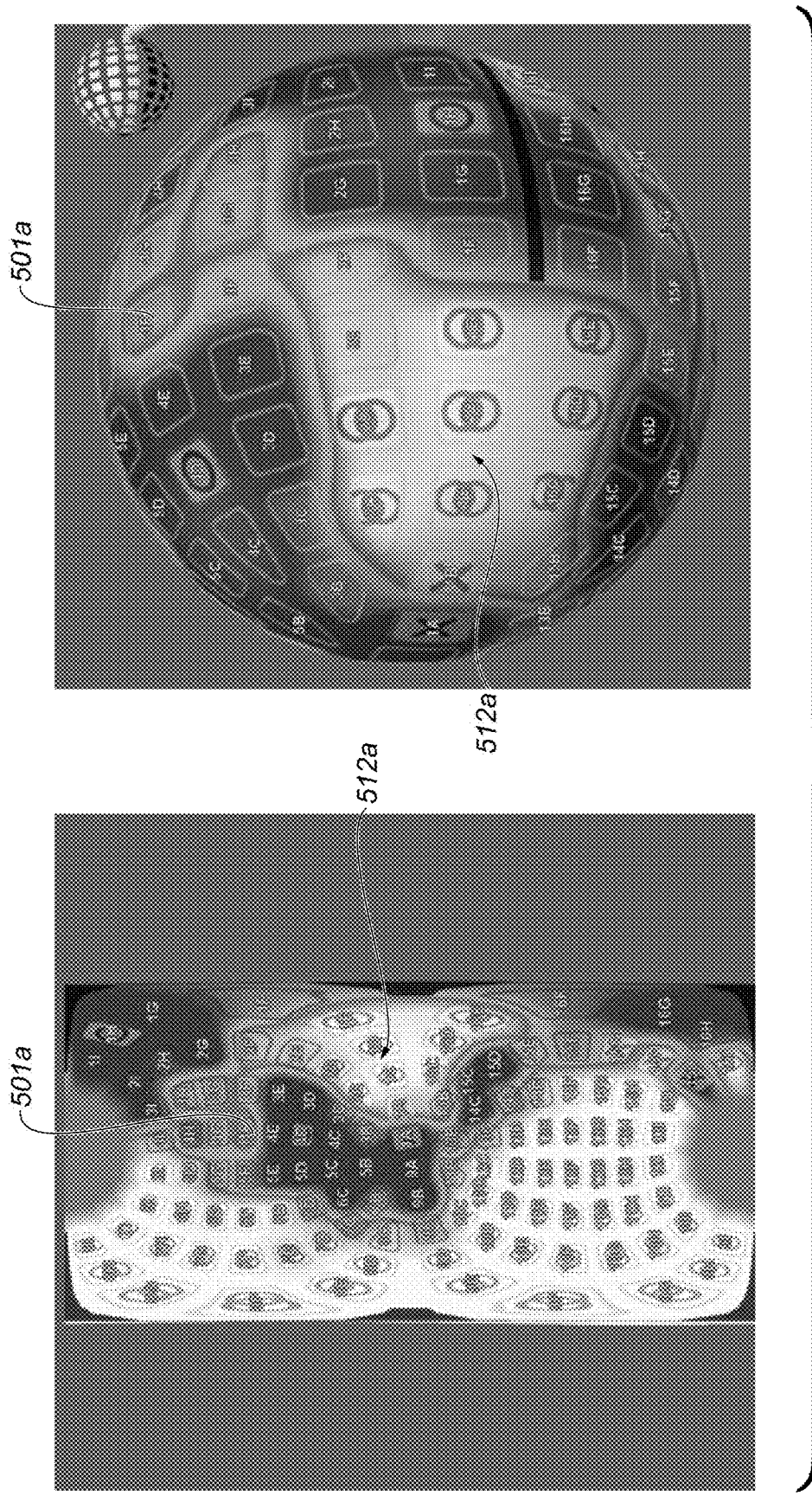
FIG. 5B includes a graphical interface providing a graphical representation similar to that of FIG. 5A, but illustrates improved tissue contact for at least the particular transducer from FIG. 5A, as compared to the tissue contact state of FIG. 5A, upon execution of a tissue contact improvement procedure including advancement of an elongate shaft member of a catheter device system, the tissue contact improvement procedure particularly associated with the tissue contact state of FIG. 5A, according to some embodiments.

FIG. 5B shows changes in the two-dimensional and three-dimensional representations of the mappings of contact regions shown in FIG. 5A after the first contact-improvement procedure has been implemented by a user or operator. In particular, the graphical element 501a corresponding to transducer 4F is shown in FIG. 5B with relatively a high degree of transducer-to-tissue wall contact as compared to the state of FIG. 5A. Accordingly, in some example embodiments, the data processing device system (e.g., 110, 310) is configured by the program to receive a second plurality of degree-of-contact signals respectively from the plurality of transducers (e.g., 220, 306, 406), the second plurality of degree-of-contact signals respectively indicating a degree of contact between the respective transducer of the plurality of transducers (e.g., 220, 306, 406) and the tissue wall in a state after execution of the instructed movement of the at least the particular transducer, and cause the display device system (e.g., 332) to update the graphical representation to include a visual presentation of updated contact information (e.g., as shown in FIG. 5B) representative of at least some of the second plurality of contact signals, the visual presentation of the updated contact information indicating improved contact between the particular transducer and the tissue wall as compared to visual presentation of the (e.g., 'first') contact information utilized to generate, e.g., the contact information map shown in FIG. 5A. In other words, the map of FIG. 5A may be generated based on a first set of degree-of-contact signals from the transducers, and the updated map of FIG. 5B may be generated based on a second set of degree-of-contact signals from the transducers, according to some embodiments. It is noted that, in some embodiments, the updated contact information representative of at least some of the second plurality of degree-of-contact signals need not have an identical format as the previous visual presentation of the contact information.

The indication of the first-contact-improvement procedure may be provided by the input-output device system (e.g., 120, 320) in various ways in accordance with block 606. In some embodiments, the input-output device system (e.g., 120, 320) includes an audio-producing device system (e.g., 334) communicatively connected to the data processing device system (e.g., 110, 310), and the provided indication of the selected first contact-improvement procedure may include audible instructions indicating at least part of the first contact-improvement procedure provided by the audio-producing device system. In some embodiments, the provided indication of the selected first contact-improvement procedure includes a visual presentation, provided by the display device system (e.g., 332) of the indication of the selected first-contact improvement procedure. According to various embodiments, the visual presentation of the selected first contact-improvement procedure may include visually presenting, via the display device system (e.g., 332), (a) one or more text-based instructions indicating at least part of the first contact-improvement procedure, (b) one or more graphic symbol-based instructions indicating at least part of the first contact-improvement procedure, (c) one or more graphical animations indicating at least part of the first-contact improvement procedure, (a) and (b), (a) and (c), (b) and (c), or (a), (b), and (c). Any one of (a), (b), and (c) may be visually displayed by the display device system (e.g., 332) in various ways. In some embodiments, the visual presentation of the indication of the selected first contact-improvement procedure is displayed at least proximate a graphical representation of the particular transducer of the plurality of transducers (e.g., 220, 306, 406). For example, in FIG. 5A, dialog or text box or user-interface window 505a (containing by way of non-limiting example, text-based instructions) including a leader line is shown extending to a location at least proximate the graphical element 501a indicating the particular transducer 4F, the dialog box 505a indicating the first contact-improvement procedure. Such a dialog box leader line is not shown in the later examples of FIGS. 5C, 5E, 5G, 5I, 5K, and 5M, but may be included in various embodiments. In the example of FIG. 5A, the contact-improvement procedure is to advance the catheter, so the dialog box 505*a* states, for instance, "Advance Catheter to Improve Contact". In some embodiments, the dialog box 505*a* may appear in the graphical representation in response to a selection (e.g., a user selection) of the particular transducer 4F represented by graphical element 501*a*. It is noted that visual presentation of the indication of the selected first contact-improvement procedure may be displayed at other locations, and even on a different display than the particular display that the graphical representation is displayed on.

According to some embodiments, the first contact-improvement procedure may indicate a specific portion of the catheter device system that instructs a user to manipulate it in a particular way to achieve the improved contact between the particular transducer and the tissue wall. For example, in accordance with some embodiments associated with FIG. 5A, the visual presentation of the indication of the selected first contact-improvement procedure may include a display via the display device system 332 of a graphical symbol set 700 as exemplified in FIG. 7A. According to some embodiments, graphical symbol set 700 includes a graphical symbol representing a portion of the catheter device system that is directly manipulable by a user to achieve the desired improved contact. In some embodiments, the graphical element set 700 includes a graphical icon or image 701 of a handle portion (e.g., coupled to the elongate shaft member 314) of the catheter device system and graphical symbol 702 indicating a direction which the handle portion should be operated to achieve the desired contact-improvement procedure or element thereof. Manipulation of a directly manipulable portion of the catheter device system may be visually indicated in other ways in other embodiments.

Note that the indication of the contact-improvement procedure to facilitate an improved contact arrangement or configuration between at least the particular transducer exhibiting the improper tissue contact arrangement or configuration and the tissue wall, such as that shown by graphical element set 700, may indicate actions performed on a directly manipulable portion of the catheter device system, which cause resulting movements of, e.g., the structure 218 or 308 of the transducer-based device 200 or 300, according to some embodiments. In this regard, it is understood that the corresponding tissue-contact procedure may be defined in terms of the resulting movements of, e.g., the structure 218 or 308, or may be defined in terms of movements applied to a directly manipulable portion of the catheter device system, such as a handle, the sheath 212 or 312, or other control mechanism, that causes the desired resulting movements of e.g., the structure 218 or 308. Similarly, the indication(s) of the contact-improvement procedure that are provided to the operator to facilitate an improved contact arrangement or configuration may also be defined in terms of the resulting movements of, e.g., the structure 218 or 308, or may be defined in terms of movements applied to a directly manipulable portion of the catheter device system, such as a handle, the sheath 212 or 312, or other control mechanism, that causes the desired resulting movements of e.g., the structure 218 or 308. However, in the context of the provided indication(s) to the operator to facilitate the improved contact arrangement or configuration, it may be easier for the operator to be provided with indication(s) of movements applied to a directly manipulable portion of the catheter device system, such as a handle, the sheath 212 or 312, or other control mechanism, that causes the desired resulting movements of e.g., the structure 218 or 308, since such indication(s) may be more easily understood by the operator. In any event, the present invention is not limited to any particular one of the above-discussed approaches.

In some embodiments, the catheter device system may include an elongate shaft member (e.g., 314) including a proximal end portion (e.g., 314*a*) and a distal end portion (e.g., 314*b*). The catheter device system may also include a structure (e.g., 308) physically coupled to the distal end portion (e.g., 314*b*) of the elongate shaft member (e.g., 314), with a plurality of transducers (e.g., 220, 306, 406) arranged on the structure. As described above, the structure (e.g., 308) may be configurable to be in a deployed configuration (e.g., FIGS. 3C, 3D, 3E, 3F, 3G and 3H), which arranges the plurality of transducers (e.g., 220, 306, 406) in a distribution. The structure (e.g., 308) may include a first portion and a second portion. In some embodiments, the second portion of the structure opposes the first portion of the structure when the structure is in the deployed configuration (e.g., when the first portion and the second portion are on different hemispherical regions of the structure). According to various embodiments, the first transducer set may be located on the first portion of the structure (e.g., 308), and the second transducer set is located on the second portion of the structure (e.g., 308) at least in a state in which the structure is in the deployed configuration. According to various embodiments, a first contact-improvement procedure includes a first movement of a first movement type (e.g., a translational movement) that is in a first direction different than a second direction of a second movement of the first movement type included in a second contact-improvement procedure, the first movement being a movement of at least part of the catheter device system, and the second movement being a movement of the at least part of the catheter device system. For instance, the first contact-improvement procedure may include an advancement (which, in some embodiments, may be considered a translational movement in a forward direction) of the structure 308, and the second contact-improvement procedure may include a retraction (which, in some embodiments, may be considered a translational movement in a reverse direction) of the structure 308, according to some embodiments.

Figure 5C:
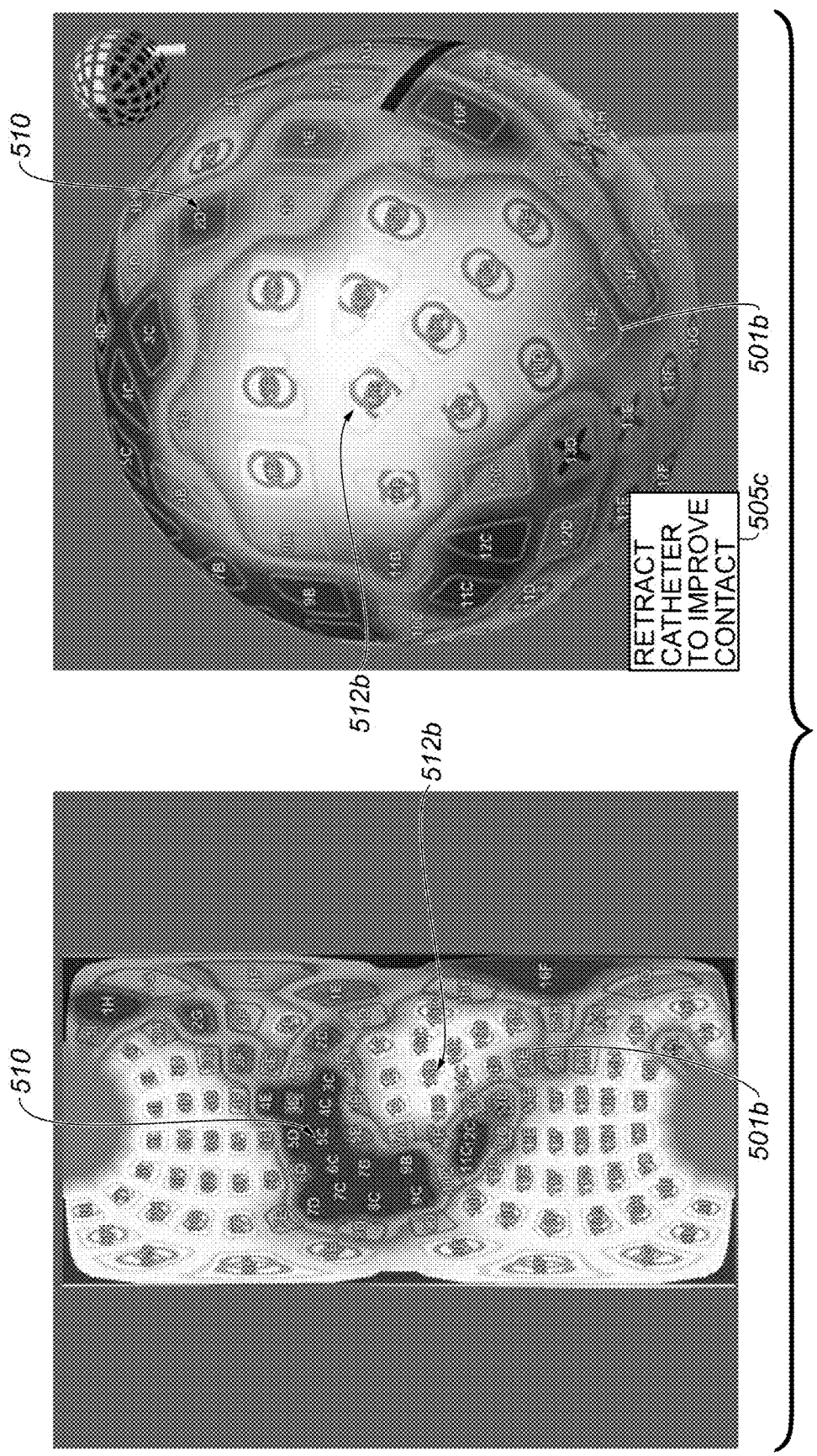
FIG. 5C includes a graphical interface providing a graphical representation similar to that of FIG. 5A, but indicates a state in which at least a particular transducer exhibits insufficient tissue contact to form a proper continuous circumferential lesion around a second pulmonary vein, according to some embodiments.

The first movement type may take different forms, according to various embodiments. For example, in some embodiments, the part of the catheter device system is the structure (e.g., 308) and the first movement type is a translational movement. For example, the discussion related to FIG. 5A was related to a first contact-improvement procedure that indicated advancement (e.g., a translational movement, according to some embodiments) of the structure (e.g., 308) to improve contact between the tissue wall and a particular transducer 4F (represented by graphical element 501*a*) deemed to be part of the first transducer set. In some embodiments, the translational movement involves at least translation of a portion of the elongate shaft member (e.g., 314) (a portion of the elongate shaft member located within the sheath) relative to the sheath. In some embodiments, the translational movement involves concurrent translation of both a portion of the elongate shaft member (e.g., 314) and the sheath (e.g., 312). FIG. 5C corresponds to a situation in which the catheter device system has been brought into substantial contact with a second pulmonary vein (i.e., represented by a region 512*b* of low contact in both the two-dimensional and three-dimensional representations). According to various embodiments, the second pulmonary vein represented by region 512*b* in FIG. 5C is a different pulmonary vein than the one represented by region 512*a* in FIGS. 5A and 5B. According to various embodiments, it is also desired to position the structure (e.g., 308) such that a group of the plurality of transducers (e.g., 220, 306, 406) can be brought into relatively good contact with a region of the tissue wall that circumferentially surrounds the second pulmonary vein. However, according to various embodiments, the particular positioning of the second pulmonary vein in the bodily (intra-cardiac) cavity may require a different portion of the structure (and, consequently, a different group of the plurality of transducers) to be brought into contact with the tissue wall surrounding the second pulmonary vein.

Figure 3F:
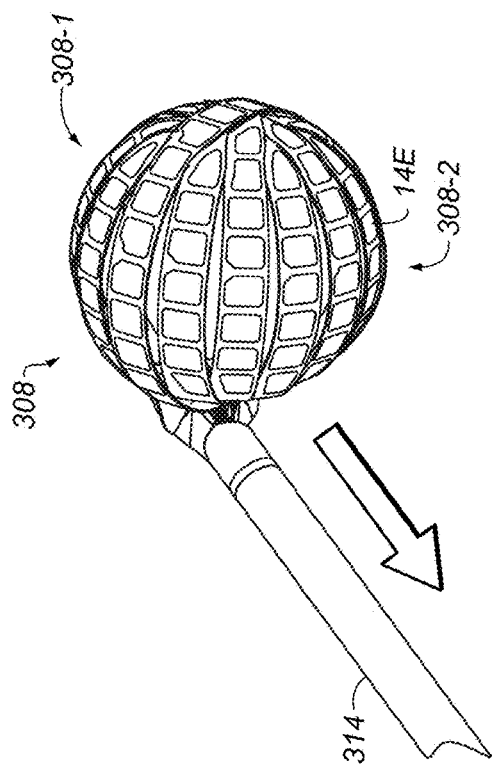
FIG. 3F illustrates an action to facilitate improved tissue contact of at least one transducer of a catheter device system by retraction of an elongate shaft member of the catheter device system, according to some embodiments.
Figure 3E:
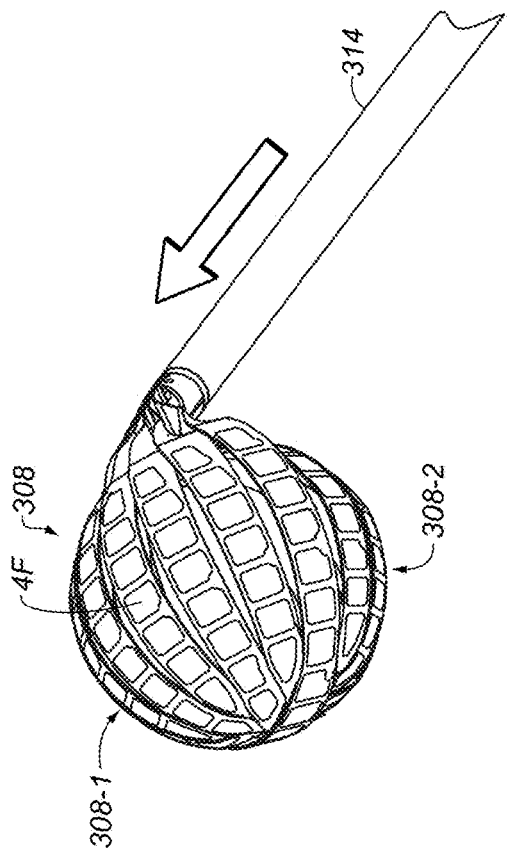
FIG. 3E illustrates an action to facilitate improved tissue contact of at least one transducer of a catheter device system by advancement of an elongate shaft member of the catheter device system, according to some embodiments.
Figure 31:
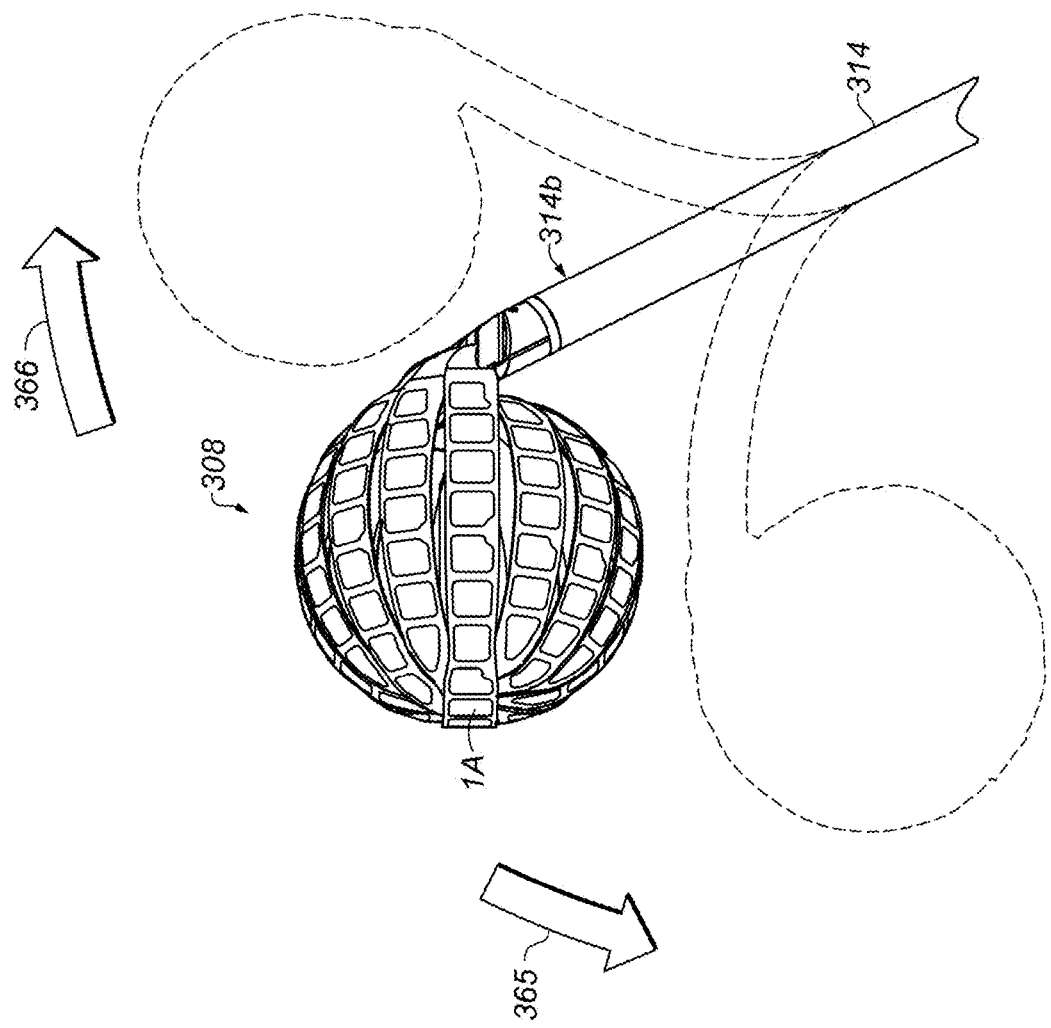

In FIG. 5C, the graphical element 501*b*, which graphically identifies a transducer 14E, visually indicates that the particular corresponding transducer of the plurality of transducers (e.g., 220, 306, 406) is in insufficient contact with the tissue wall. In this regard, this condition may cause a circumferential band of region 510 of relatively high contact around the region 512*b* representing the second pulmonary vein to be not continuous. According to various embodiments, program instructions associated with method 600 may include computer-executable instructions configured to cause the data processing device system (e.g., 110, 310) to cause the input-output device system (e.g., 120, 320), in response to identifying the particular transducer as belonging to the second transducer set and as exhibiting an improper contact arrangement or configuration (e.g., insufficient contact in this example) with the tissue wall, to provide an indication of the second contact-improvement procedure to facilitate an improved contact arrangement or configuration between the particular transducer and the tissue wall. In various embodiments associated with FIG. 5C, it is determined by the data processing device system (e.g., 110, 310) that the transducer identified as 14E (represented by graphical element 501*b*) is a transducer of the second transducer set, each transducer in the second transducer set associated with the second contact-improvement procedure that has been predetermined to have a likelihood of improving contact between one or more transducers in the second transducer set and a tissue wall based at least on a retraction (e.g., a reverse or backward translation) of at least a portion of the catheter device system. According to various embodiments associated with FIG. 5C, the second-contact improvement procedure includes (e.g., as indicated by dialog box 505*c*) a procedure including retraction of the catheter to improve the insufficient contact between a transducer in the second transducer set and the tissue wall. Unlike the forward translation associated with the advancement of at least part of the catheter device system indicated by the first contact-improvement procedure associated with FIG. 5A, the reverse translation associated with the retraction of the at least part of the catheter device system occurs in an opposite direction. The difference between respective translation directions of the first and second contact-improvement procedures is best understood comparing FIGS. 3E and 3F. It is noted in FIG. 3E, that transducer 4F and any other transducers of the first transducer set are on a portion (e.g., first portion 308-1) of the structure 308 that can be advanced into improved tissue contact by a forward translation of elongate shaft member 314. In FIG. 3F, transducer 14E and any other transducers of the second transducer set are on a portion (e.g., second portion 308-2) of the structure 308 that opposes the first portion 308-1 across structure 308. Because of this particular positioning, a forward translation of the at least part of the catheter device system as per the first contact-improvement procedure likely would not increase the degree of contact between the particular transducer 14E (and the other transducers in the second portion 308-2), but likely would rather decrease tissue contact for the particular transducer 14E (and at least some of the other transducers in the second portion 308-2). On the other hand, the reverse translation of the at least part of the catheter device system as per the second contact-improvement procedure likely would increase tissue contact for the particular transducer 14E (and at least some of the other transducers in the second portion 308-2).

According to some embodiments, the first contact-improvement procedure (e.g., in the context of FIGS. 5A, 3E, 5B, and 7A) includes a first translational-movement procedure to translate at least part of the elongate shaft member 314 to improve a contact arrangement or configuration (e.g., increase contact in some embodiments) between one or more transducers in the first transducer set of the plurality of transducers (e.g., 220, 306, 406) and the tissue wall, and the second contact-improvement procedure (e.g., in the context of FIGS. 5C, 3F, 5D (discussed below), and 7B (discussed below)) includes a second translational-movement procedure to translate at least part of the elongate shaft member (e.g., 314) to improve a contact arrangement or configuration (e.g., increase contact in some embodiments) between one or more transducers in the second transducer set of the plurality of transducers (e.g., 220, 306, 406) and the tissue wall. According to various embodiments, the first translational-movement procedure is different than the second translational-movement procedure. For example, the first and the second translational-movement procedures may involve respective translations that are along different directions. In some embodiments, the first and the second translational-movement procedures may involve respective translations having different magnitudes.

Figure 7A:
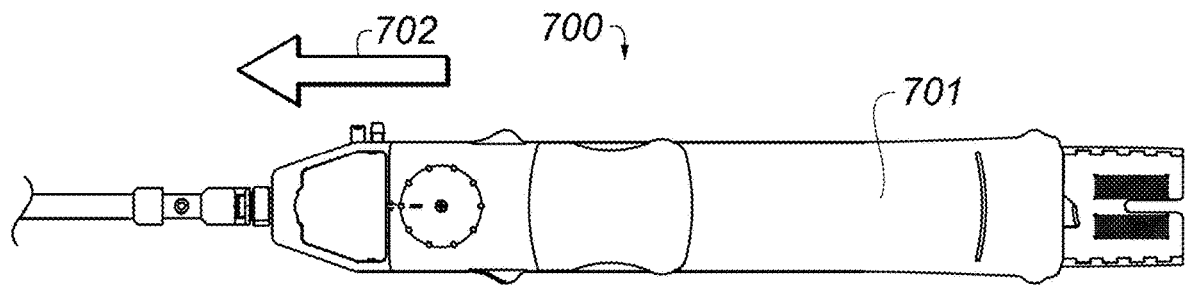
FIG. 7A illustrates graphics visually presented by a display device system under control of a data processing device system to facilitate execution of a tissue contact improvement procedure particularly associated with the tissue contact state of FIG. 5A, according to some embodiments.
Figure 7B:
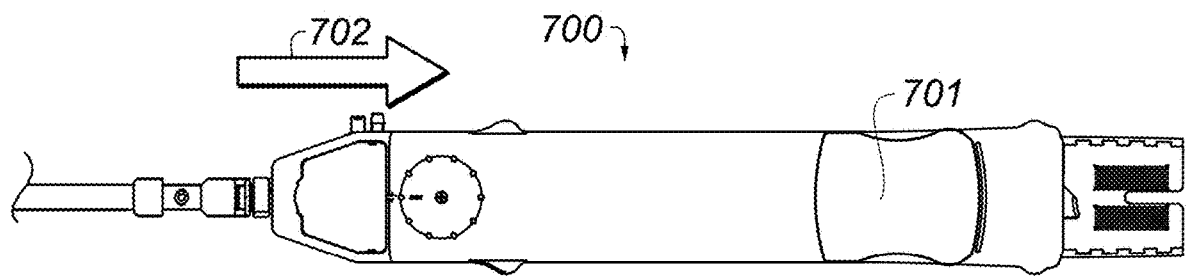
FIG. 7B illustrates graphics visually presented by a display device system under control of a data processing device system to facilitate execution of a tissue contact improvement procedure particularly associated with the tissue contact state of FIG. 5C, according to some embodiments.

FIG. 5D shows, according to some embodiments, the improved contact arrangement or configuration (e.g., increased contact in this example) between particular transducer 14E (represented by graphical element 501*b*) and the tissue wall after the second contact-improvement procedure has been executed. It is noted that the second contact-improvement procedure may be indicated in other manners other than by the dialog box 505*c* shown in FIG. 5C. For example, a graphical element set 700 as shown in FIG. 7B may be displayed by the display device system (e.g., 332), the graphical element set 700 including a graphical symbol 702 indicating a direction in which the handle portion should be retracted in accordance with the second contact-improvement procedure.

Figure 5E:
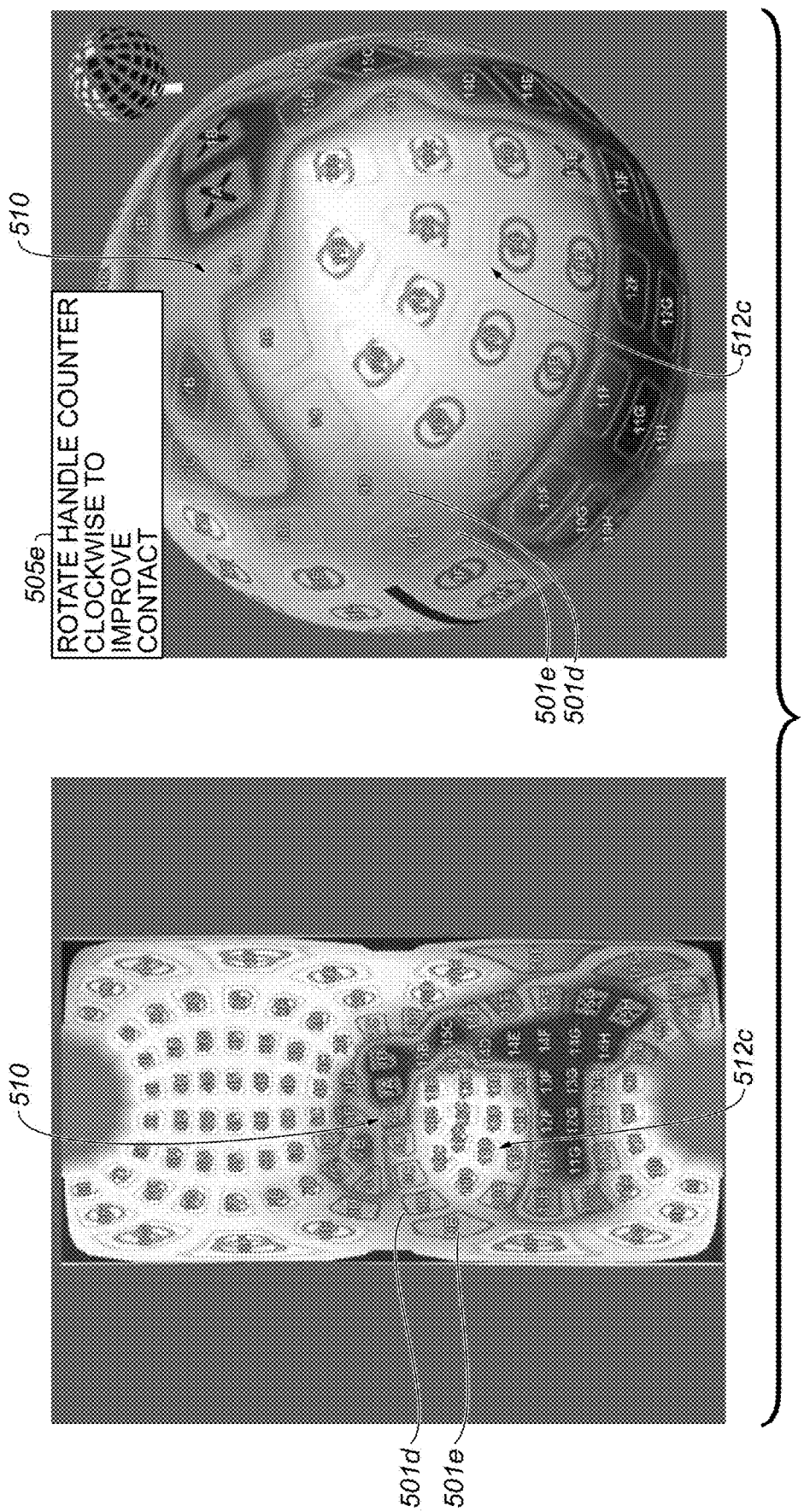
FIG. 5E includes a graphical interface providing a graphical representation similar to that of FIG. 5A, but indicates another state in which at least a particular transducer exhibits insufficient tissue contact to form a proper continuous circumferential lesion around a first pulmonary vein, according to some embodiments.

The movement type (e.g., the above-referenced 'first' movement type) involved in the contact-improvement procedure need not be a translational movement type in some embodiments. For example, in some embodiments, the part of the catheter device system that is moved or manipulated is the structure (e.g., 308), and the movement type for at least that part of the catheter device system is a rotational movement. For example, FIG. 5E corresponds to a situation in which the catheter device system has been brought into substantial contact with a first pulmonary vein (i.e., represented by a region 512*c* of low contact in both the two-dimensional and three-dimensional representations). According to various embodiments, it is also desired to position the structure (e.g., 308) such that a group of the plurality of transducers (e.g., 220, 306, 406) can be brought into relatively good contact with a region of the tissue wall that circumferentially surrounds the first pulmonary vein. In FIG. 5E, the graphical elements 501*d* and 501*e*, which respectively graphically identify transducers 9D and 9E, visually indicate that two particular corresponding transducers of the plurality of transducers (e.g., 220, 306, 406) are in insufficient contact with the tissue wall. In this regard, this condition may cause a circumferential band of region 510 of relatively high contact around the region 512c representing the first pulmonary vein to be not continuous. According to various embodiments, program instructions associated with method 600 may include computer-executable instructions configured to cause the data processing device system (e.g., 110, 310) to cause the input-output device system (e.g., 120, 320), in response to identifying that one or both of the transducers 9D and 9E (represented by graphical elements 501d and 501e, respectively) belong to a first transducer set and that one or both of the transducers 9D and 9E exhibit an improper contact arrangement or configuration with the tissue wall (i.e., have insufficient tissue contact in this example) per block 604 in FIG. 6, to provide an indication of a first contact-improvement procedure to facilitate an improved contact arrangement or configuration between the one or both of the transducers 9D and 9E, or one or more transducers in the same portion of the transducer-based device (e.g., 200, 300), and the tissue wall. In various embodiments associated with FIG. 5E, it is determined by the data processing device system (e.g., 110, 310) that the transducers identified as 9D and 9E are transducers of a first transducer set, each transducer in the first transducer set associated with the first contact-improvement procedure that has been predetermined to have a likelihood of improving contact between one or more transducers in the first transducer set and a tissue wall based at least on a rotational movement of at least a portion of the catheter device system. According to various embodiments associated with FIG. 5E, the first contact-improvement procedure includes (e.g., as indicated by dialog box 505e) a procedure including rotation in a counterclockwise direction of at least part of the catheter device system to produce an improved contact arrangement or configuration (e.g., to improve insufficient contact in this example) between one or more transducers in the first transducer set and the tissue wall.

In a similar manner, FIG. 5G corresponds to a situation in which the catheter device system has been brought into substantial contact with a second pulmonary vein (i.e., represented by a region 512d of low contact in both the two-dimensional and three-dimensional representations). According to various embodiments, it is noted that the second pulmonary vein associated with FIG. 5G is different than the pulmonary vein associated with FIG. 5E. According to various embodiments, it is also desired to position the structure (e.g., 308) such that a group of the plurality of transducers (e.g., 220, 306, 406) can be brought into relatively good contact with a region of the tissue wall that circumferentially surrounds the second pulmonary vein. In FIG. 5G, the graphical elements 501f, 501g, 501h, and 501i, which respectively graphically identify transducers 1D, 16D, 16E, and 15E, visually indicate that four particular corresponding transducers of the plurality of transducers (e.g., 220, 306, 406) are in insufficient contact with the tissue wall. In this regard, this condition may cause a circumferential band of region 510 of relatively high contact around the region 512d representing the second pulmonary vein to be not continuous. According to various embodiments, program instructions associated with method 600 may include computer-executable instructions configured to cause the data processing device system (e.g., 110, 310) to cause the input-output device system (e.g., 120, 320), in response to identifying that one or more of the transducers 1D, 16D, 16E, and 15E (represented by graphical elements 501f, 501g, 501h, and 501i, respectively) belong to a second transducer set (e.g., compared to the 'first' transducer set of FIG. 5E) and that one or more of the transducers 1D, 16D, 16E, and 15E exhibit an improper contact arrangement or configuration with the tissue wall (i.e., have insufficient tissue contact in this example) per block 604 in FIG. 6, to provide an indication of a second contact-improvement procedure to facilitate an improved contact arrangement or configuration between the one or more of the transducers 1D, 16D, 16E, and 15E, or one or more transducers in the same portion of the transducer-based device (e.g., 200, 300) and the tissue wall. In various embodiments associated with FIG. 5G, it is determined by the data processing device system (e.g., 110, 310) that the transducers identified as 1D, 16D, 16E and 15E are transducers of a second transducer set, each transducer in the set transducer set associated with a second contact-improvement procedure that has been predetermined to have a likelihood of improving contact between one or more transducers in the second transducer set and a tissue wall based at least on a rotational movement of at least a portion of the catheter device system. According to various embodiments associated with FIG. 5G, the second contact-improvement procedure includes (e.g., as indicated by dialog box 505g) a procedure including rotation in a clockwise direction of at least part of the catheter device system to produce an improved contact arrangement or configuration (e.g., to improve insufficient contact in this example) between one or more transducers in the second transducer set and the tissue wall. Although embodiments associated with FIGS. 5E and 5G include first and second contact-improvement procedures that each involve first movement types that include rotational movement of at least a part of the catheter device system, the rotations occur in opposite directions. The use of opposite rotational directions in the first and second contact-improvement procedures is best understood comparing FIGS. 3G and 3H. It is noted in FIG. 3G, that transducers 9D and 9E and any other transducers of the first transducer set are on a portion (e.g., first portion 308-1) of the structure 308 that can be moved into improved tissue contact by counterclockwise rotation of elongate shaft member 314. In FIG. 3H, transducer 1D, 16D, 16E, and 15E and any other transducers of the second transducer set are on a portion (e.g., second portion 308-2) of the structure 308 that opposes the first portion 308-1 across structure 308. Because of this particular positioning, a counterclockwise rotation of the at least part of the catheter device system as per the first contact-improvement procedure would not increase the degree of contact between the tissue wall and the particular transducers 1D, 16D, 16E, and 15E, but would rather decrease tissue contact. On the other hand, clockwise rotation of the at least part of the catheter device system as per the second contact-improvement procedure would increase the degree of contact between the tissue wall and the particular transducers 1D, 16D, 16E, and 15E. According to some embodiments, the first contact-improvement procedure includes a first rotational-movement procedure to rotate at least part of the elongate shaft member 314 to improve a tissue contact arrangement or configuration between one or more transducers in the first transducer set of the plurality of transducers (e.g., 220, 306, 406) and the tissue wall, and the second contact-improvement procedure includes a second rotational-movement procedure to rotate at least part of the elongate shaft member (e.g., 314) to improve a tissue contact arrangement or configuration between one or more transducers in the second transducer set of the plurality of transducers (e.g., 220, 306, 406) and the tissue wall. According to various embodiments, the first rotational-movement procedure is different than the second rotational-movement procedure. For example, the first and the second rotational-movement procedures may involve respective rotations that are along different directions. In some embodiments, the first and the second rotational-movement procedures may involve respective rotations having different angular magnitudes.

In some embodiments, the transducers of the plurality of transducers (e.g., 220, 306, 406) are circumferentially arranged about an axis, and the first contact-improvement procedure includes a first rotational-movement procedure to rotate at least the first transducer set about the axis to improve or increase contact between one or more transducers in the first transducer set of the plurality of transducers (e.g., 220, 306, 406) and the tissue wall, and the second contact-improvement procedure includes a second rotational-movement procedure to rotate at least the second transducer set of the plurality of transducers (e.g., 220, 306, 406) about the axis to improve contact between one or more transducers in the second transducer set of the plurality of transducers (e.g., 220, 306, 406) and the tissue wall, the first rotational-movement procedure being different than the second rotational-movement procedure. U.S. Pat. No. 9,452,016, issued Sep. 27, 2016, which is hereby incorporated herein by reference, provides examples of such rotational movements.

Figure 5F:
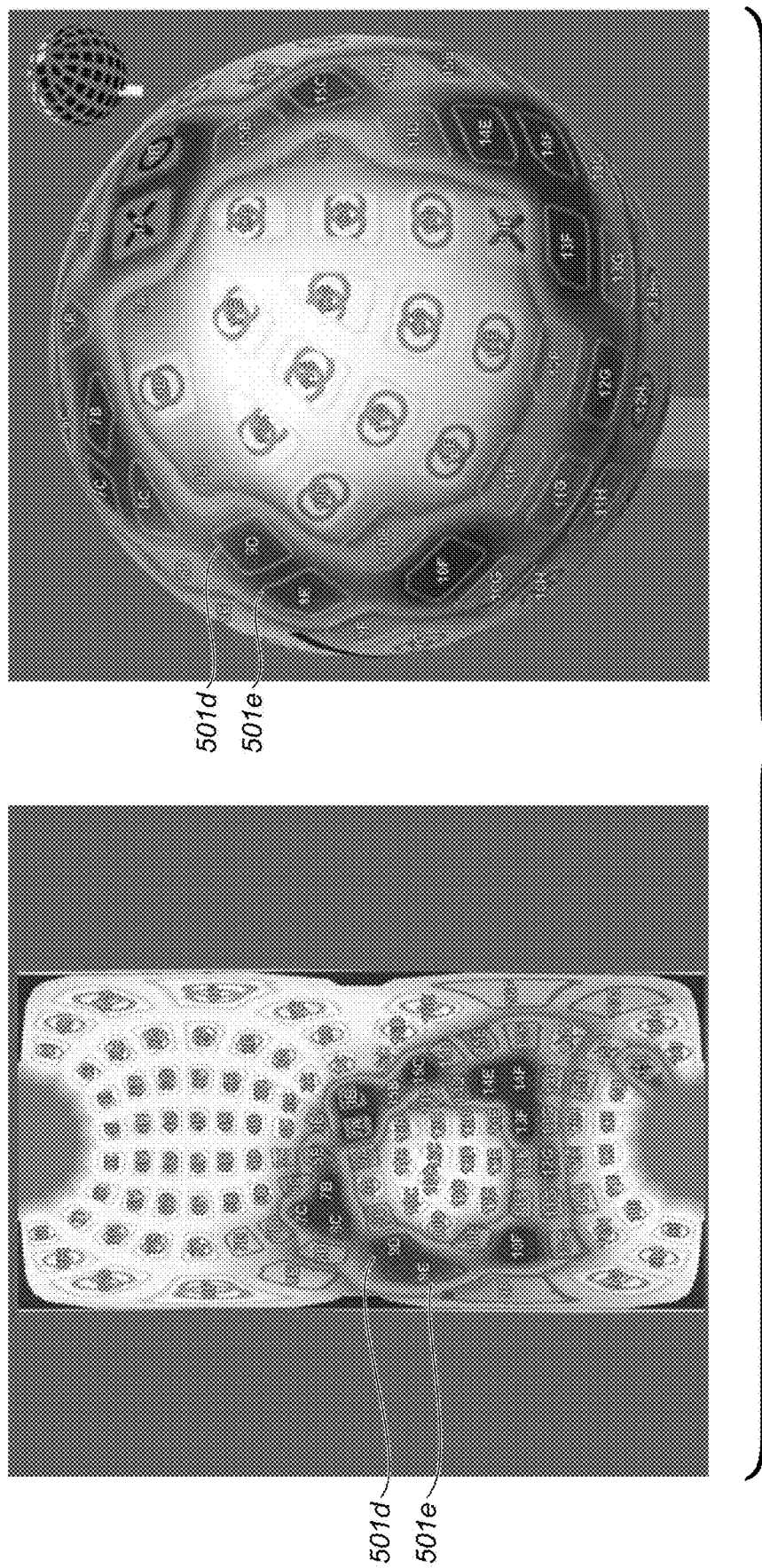
FIG. 5F includes a graphical interface providing a graphical representation similar to that of FIG. 5E, but illustrates improved tissue contact for at least the particular transducer from FIG. 5E, as compared to the tissue contact state of FIG. 5E, upon execution of a tissue contact improvement procedure including a counterclockwise rotational movement of an elongate shaft member of a catheter device system, the tissue contact improvement procedure particularly associated with the tissue contact state of FIG. 5E, according to some embodiments.
Figure 5H:
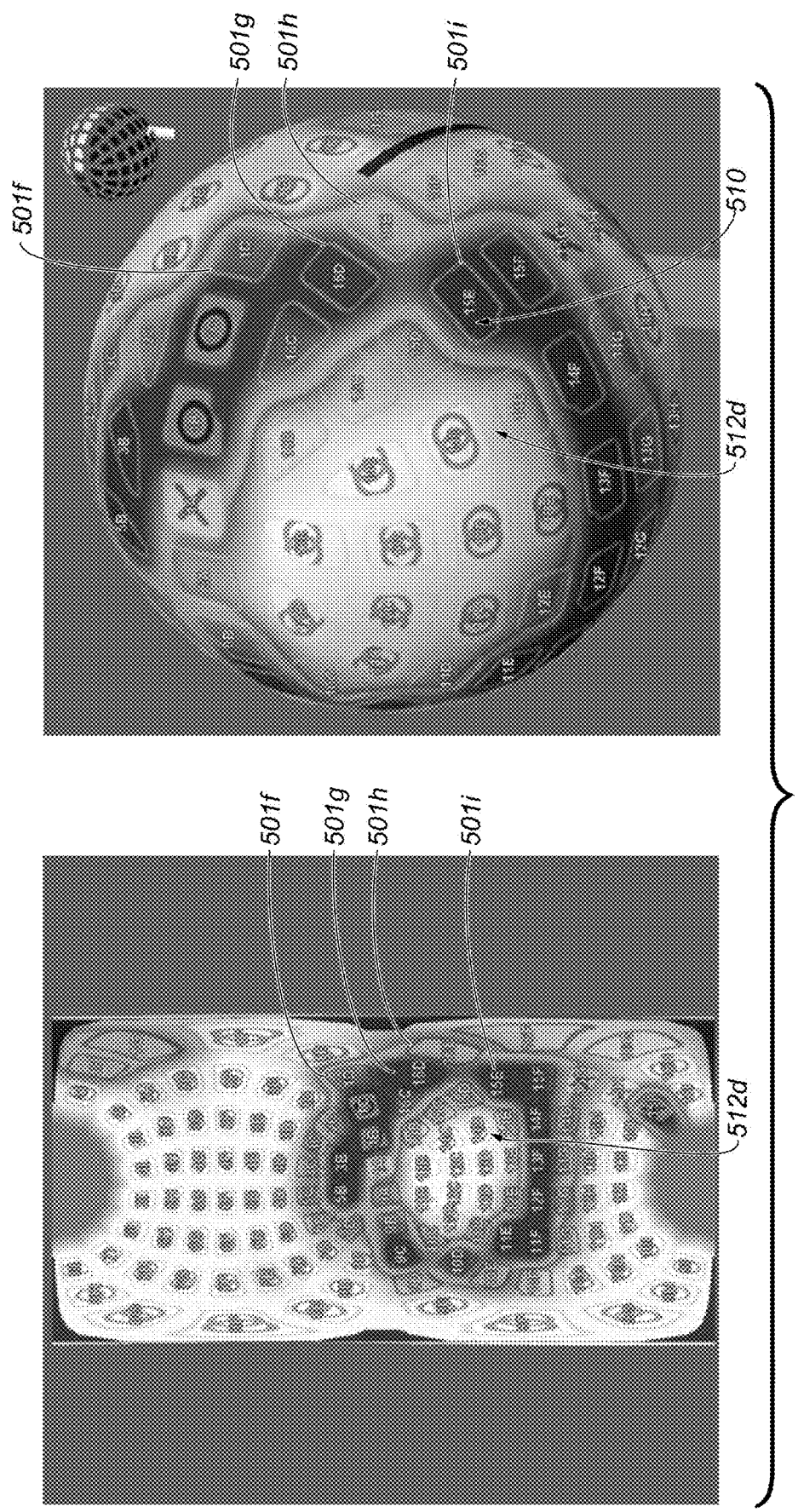
FIG. 5H includes a graphical interface providing a graphical representation similar to that of FIG. 5G, but illustrates improved tissue contact for at least the particular transducer from FIG. 5G, as compared to the tissue contact state of FIG. 5G, upon execution of a tissue contact improvement procedure including a clockwise rotational movement of an elongate shaft member of a catheter device system, the tissue contact improvement procedure particularly associated with the tissue contact state of FIG. 5G, according to some embodiments.
Figure 7C:
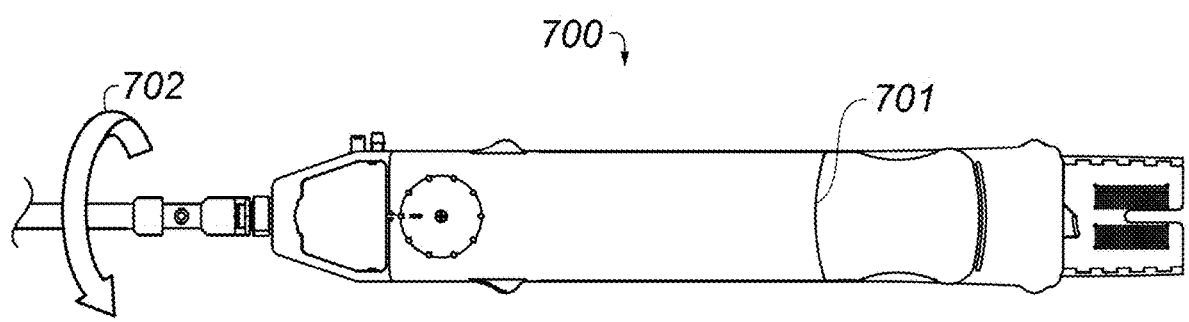
FIG. 7C illustrates graphics visually presented by a display device system under control of a data processing device system to facilitate execution of a tissue contact improvement procedure particularly associated with the tissue contact state of FIG. 5E, according to some embodiments.
Figure 7D:
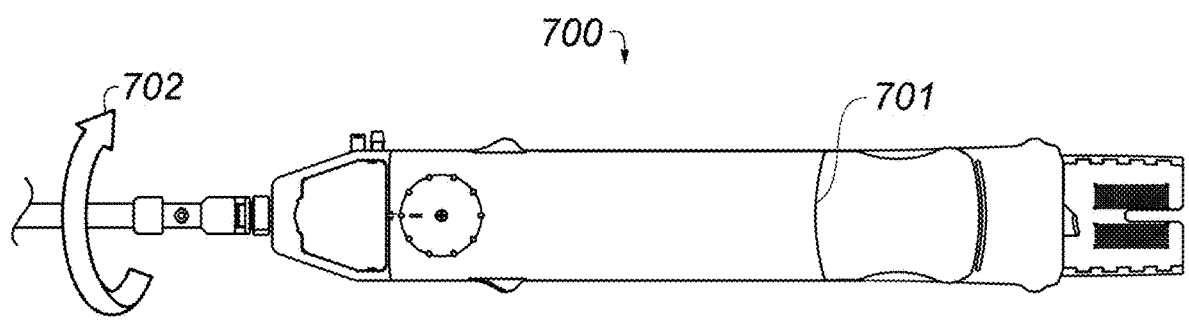
FIG. 7D illustrates graphics visually presented by a display device system under control of a data processing device system to facilitate execution of a tissue contact improvement procedure particularly associated with the tissue contact state of FIG. 5G, according to some embodiments.

FIG. 5F shows, according to some embodiments, the resulting improved contact arrangement or configuration after the first contact-improvement procedure associated with FIG. 5E has been executed. FIG. 5H shows, according to some embodiments, the improved contact after the second contact-improvement procedure associated with FIG. 5G has been executed. It is noted that the first contact-improvement procedure may be indicated in other manners other than by the dialog box 505e shown in FIG. 5E. For example, a graphical element set 700 as shown in FIG. 7C may be displayed by the display device system (e.g., 332), the graphical element set 700 including a graphical symbol 702 indicating a direction which the handle portion should be rotated in accordance with the first contact-improvement procedure. It is noted that the second contact-improvement procedure may be indicated in other manners other than by the dialog box 505g shown in FIG. 5G. For example, a graphical element set 700 as shown in FIG. 7D may be displayed by the display device system (e.g., 332), the graphical element set 700 including a graphical symbol 702 indicating a direction which the handle portion should be rotated in accordance with the second contact-improvement procedure.

Figure 5I:
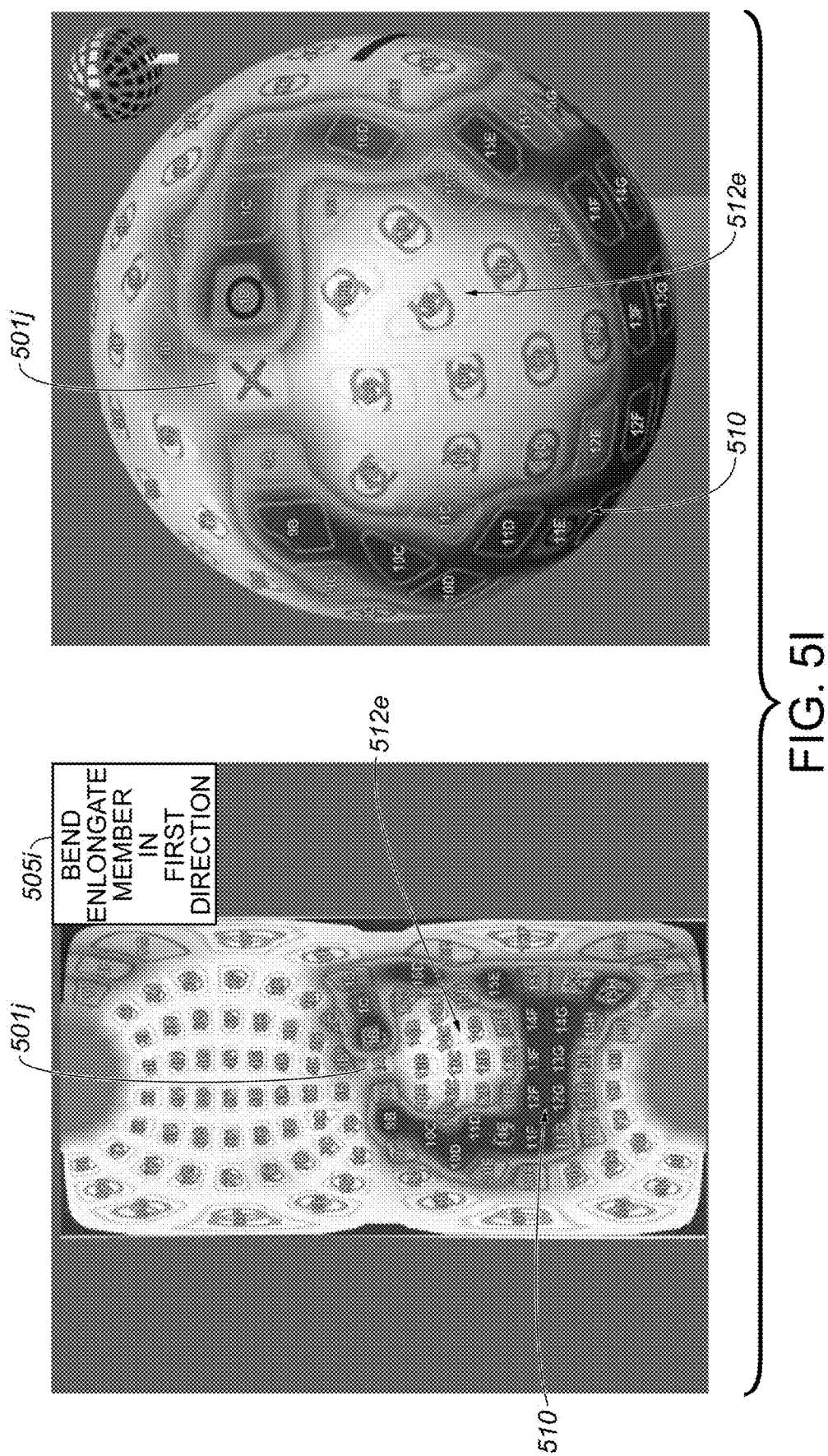
FIG. 5I includes a graphical interface providing a graphical representation similar to that of FIG. 5A, but indicates another state in which at least a particular transducer exhibits insufficient tissue contact to form a proper continuous circumferential lesion around a first pulmonary vein, according to some embodiments.

In some embodiments, the movement type (e.g., the above-referenced 'first' movement type) involved in the contact-improvement procedure may include a bending movement. For example, in some embodiments, the bending movement may involve bending of at least part of the structure 308, such as bending or flattening of one or more of the elongate members (e.g., 304), such as that described in U.S. Pat. No. 9,452,016, issued Sep. 27, 2016, which is hereby incorporated herein by reference. In some embodiments, the first movement type may be a bending movement of a distal end portion (e.g., 314b) of the elongate shaft member (e.g., 314). For example, FIG. 5I corresponds to a situation in which the catheter device system has been brought into substantial contact with a first pulmonary vein (i.e., represented by a region 512e of low contact in both the two-dimensional and three-dimensional representations). According to various embodiments, it is also desired to position the structure (e.g., 308) such that a group of the plurality of transducers (e.g., 220, 306, 406) can be brought into relatively good contact with a region of the tissue wall that circumferentially surrounds the first pulmonary vein. In FIG. 5I, the graphical element 501j, which graphically identifies a transducer 1A, visually indicates that such particular transducer of the plurality of transducers (e.g., 220, 306, 406) is in insufficient contact with the tissue wall. In this regard, this condition may cause a circumferential band of region 510 of relatively high contact to be not continuous around the region 512e representing the first pulmonary vein. According to various embodiments, program instructions associated with method 600 may include computer-executable instructions configured to cause the data processing device system (e.g., 110, 310) to cause the input-output device system (e.g., 120, 320), in response to identifying that the transducer 1A (by graphical element 501j) belongs to a first transducer set and that the transducer 1A exhibits an improper contact arrangement or configuration with the tissue wall (i.e., has insufficient tissue contact in this example) per block 604 in FIG. 6, to provide an indication of a first contact-improvement procedure to facilitate an improved contact arrangement or configuration between the particular transducer 1A or one or more transducers in the same portion of the transducer-based device (e.g., 200, 300) and the tissue wall. In various embodiments associated with FIG. 5I, it is determined by the data processing device system (e.g., 110, 310) that the transducer identified as 1A is a transducer of a first transducer set, each transducer in the first transducer set associated with the first contact-improvement procedure that has been predetermined to have a likelihood of improving contact between one or more transducers in the first transducer set and a tissue wall based at least on a bending movement of at least part of the elongate shaft member (e.g., 314). According to various embodiments associated with FIG. 5I, the first contact-improvement procedure includes (e.g., as indicated by dialog box 505i) a procedure including bending of the part of the elongate shaft member (e.g., 314) in a first direction to produce an improved contact arrangement or configuration (e.g., to improve insufficient contact in this example) between one or more transducers in the first transducer set and the tissue wall.

Figure 5J:
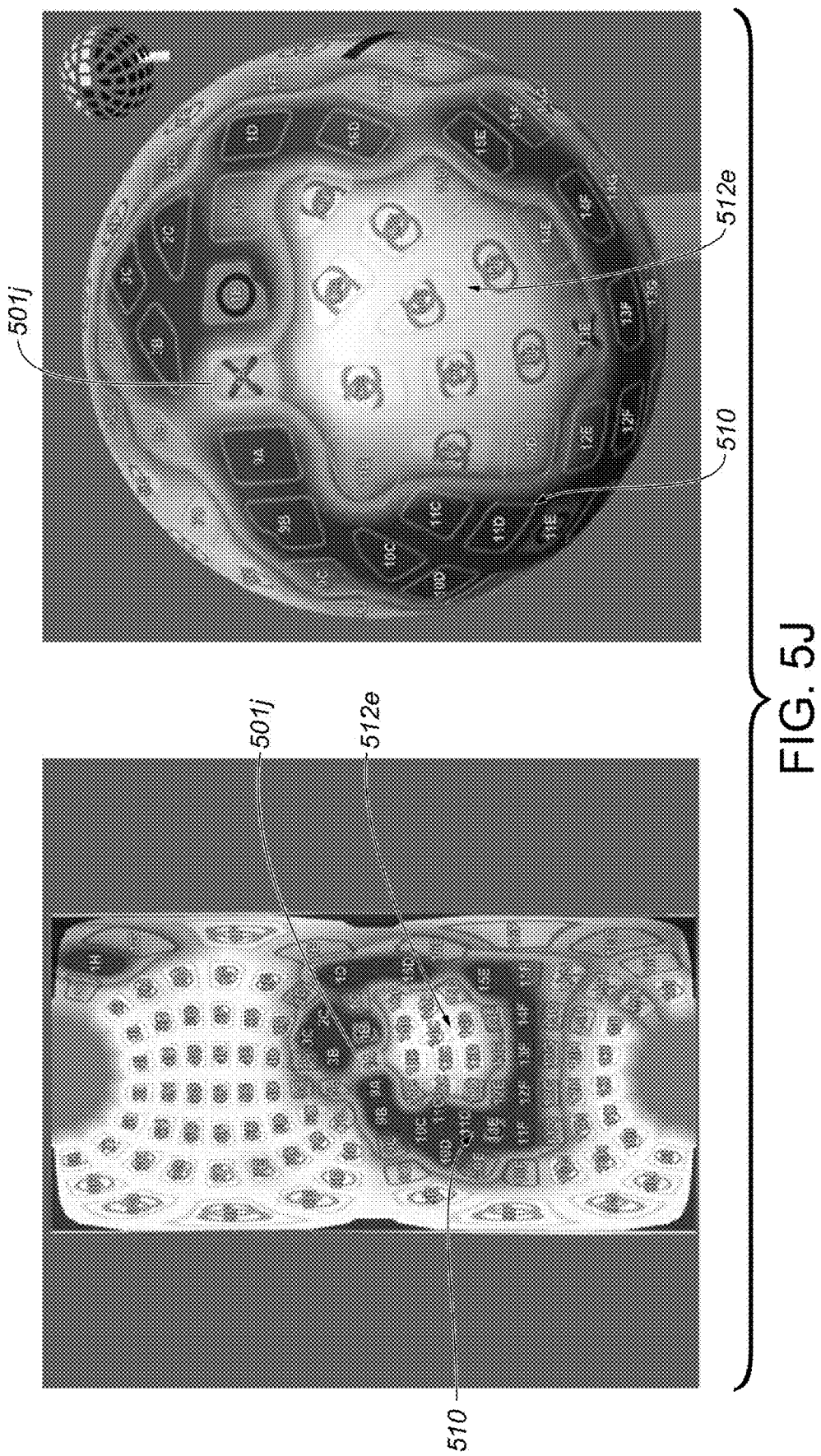
FIG. 5J includes a graphical interface providing a graphical representation similar to that of FIG. 5I, but illustrates improved tissue contact for at least the particular transducer from FIG. 5I, as compared to the tissue contact state of FIG. 5I, upon execution of a tissue contact improvement procedure including a bending movement, in a first direction, of an elongate shaft member of a catheter device system, the tissue contact improvement procedure particularly associated with the tissue contact state of FIG. 5I, according to some embodiments.
Figure 5K:
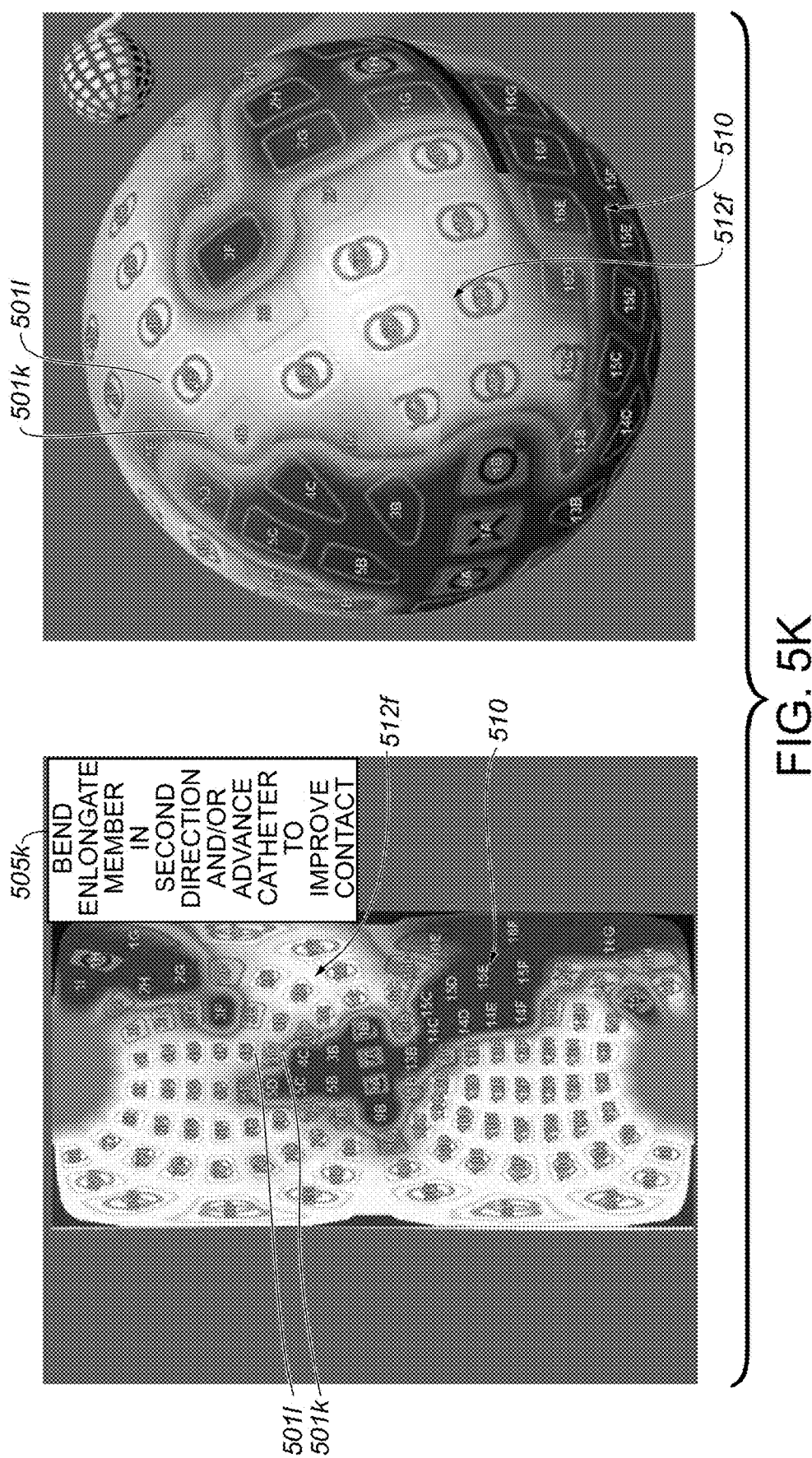
FIG. 5K includes a graphical interface providing a graphical representation similar to that of FIG. 5A, but indicates another state in which at least a particular transducer exhibits insufficient tissue contact to form a proper continuous circumferential lesion around a second pulmonary vein, according to some embodiments.

In a similar manner, FIG. 5K corresponds to a situation in which the catheter device system has been brought into substantial contact with a second pulmonary vein (i.e., represented by a region 512f of low contact in both the two-dimensional and three-dimensional representations). According to various embodiments, it is noted that the second pulmonary vein associated with FIG. 5K is different than the pulmonary vein associated with FIG. 5I. According to various embodiments, it is also desired to position the structure (e.g., 308) such that a group of the plurality of transducers (e.g., 220, 306, 406) can be brought into relatively good contact with a region of the tissue wall that circumferentially surrounds the second pulmonary vein. In FIG. 5K, the graphical elements 501k and 501l, which respectively graphically identify transducers 4D and 4E, visually indicate that the corresponding transducers of the plurality of transducers (e.g., 220, 306, 406) are in insufficient contact with the tissue wall. In this regard, this condition may cause a circumferential band of region 510 of relatively high contact around the region 512f representing the second pulmonary vein to be not continuous. According to various embodiments, program instructions associated with method 600 may include computer-executable instructions configured to cause the data processing device system (e.g., 110, 310) to cause the input-output device system (e.g., 120, 320), in response to identifying that one or more of the transducers 4D and 4E (represented by graphical elements 501*k* and 501*l*, respectively) belong to a second transducer set (e.g., as compared to the 'first' transducer set of FIG. 5I) and that one or both of the transducers 4D and 4E exhibit an improper contact arrangement or configuration with the tissue wall (i.e., have insufficient tissue contact in this example) per block 604 in FIG. 6, to provide an indication of a second contact-improvement procedure to facilitate an improved contact arrangement or configuration between one or both of the transducers 4D and 4E or one or more transducers in the same portion of the transducer-based device (e.g., 200, 300) and the tissue wall. In various embodiments associated with FIG. 5K, it is determined by the data processing device system (e.g., 110, 310) that the transducers identified as 4D and 4E are transducers of a second transducer set, each transducer in the second transducer set associated with a second contact-improvement procedure that has been predetermined to have a likelihood of improving contact between one or more transducers in the second transducer set and a tissue wall based at least on a bending movement of at least a part of the elongate shaft member (e.g., 314). According to various embodiments associated with FIG. 5K, the second contact-improvement procedure includes (e.g., as indicated by dialog box 505*k*) a procedure including bending of a part of the elongate shaft member (e.g., 314) in a second direction to produce an improved contact arrangement or configuration (e.g., to improve insufficient contact in this example) between one or more of the transducers in the second transducer set and the tissue wall.

According to various embodiments, the bending in the second direction associated with FIG. 5K occurs in an opposite direction to the bending in the first direction associated with FIG. 5I. For example, in FIG. 3I, at least the distal portion (e.g., 314*a*) of elongate shaft member (e.g., 314) can be controlled to selectively bend between a first direction 365 and an opposing second direction 366. In some embodiments, at least part of the elongate shaft member 314 (e.g., distal end portion 314*b*) is configured to bend within a single plane. In some embodiments, at least part of the elongate shaft member 314 (e.g., distal end portion 314*b*) is configured to bend in each of multiple planes. According to various embodiments, the catheter device system (e.g., FIG. 2 or various ones of FIG. 3) may include an actuator system (e.g., within or as part of housing 319 as previously described) that may be configured to selectively bend the at least part of the elongate shaft member (e.g., 314). The actuator system may be coupled to the at least part of the elongate shaft member (e.g., 314) via a control element set (e.g., a control line set) located within one or more lumens provided in the elongate shaft member (e.g., 314) as previously described. Similarly, in some embodiments, the catheter sheath 312 itself may include an actuator system that may be configured to selectively bend the at least part of the elongate shaft member (e.g., 314). For example, the actuator system may be coupled to the at least part of catheter sheath 312 to bend at least part of the catheter sheath (e.g., 312) and as a consequence thereof, also bend a portion of the elongate shaft member (e.g., 314) located within a lumen of the catheter sheath (e.g., 312).

The use of a first movement type including a bending movement may provide enhanced contact between a particular transducer and the tissue wall in a manner that other movement types may not. For example, with reference to FIG. 3I, bending of the distal end portion 314*b* of the elongate shaft member 314 in the first direction 365 laterally shifts the transducer identified as 1A (as well as some adjacent transducers) in manner that other movement types may not. In some embodiments, the first contact-improvement procedure includes a first-bending movement procedure to bend at least a part of the elongate shaft member (e.g., 314) to improve contact between one or more transducers in the first transducer set of the plurality of transducers (e.g., 220, 306, 406) and the tissue wall. In some embodiments, the second contact-improvement procedure includes a second bending-movement procedure to bend at least a part of the elongate shaft member (e.g., 314) to improve contact between one or more transducers in the second transducer set of the plurality of transducers (e.g., 220, 306, 406) and the tissue wall, the first bending-movement procedure being different than the second bending-movement procedure. For example, the first and the second bending-movement procedures may involve respective bending movements that are along different directions. In some embodiments, the first and the second bending-movement procedures may involve respective bending movements having different magnitudes.

Figure 5L:
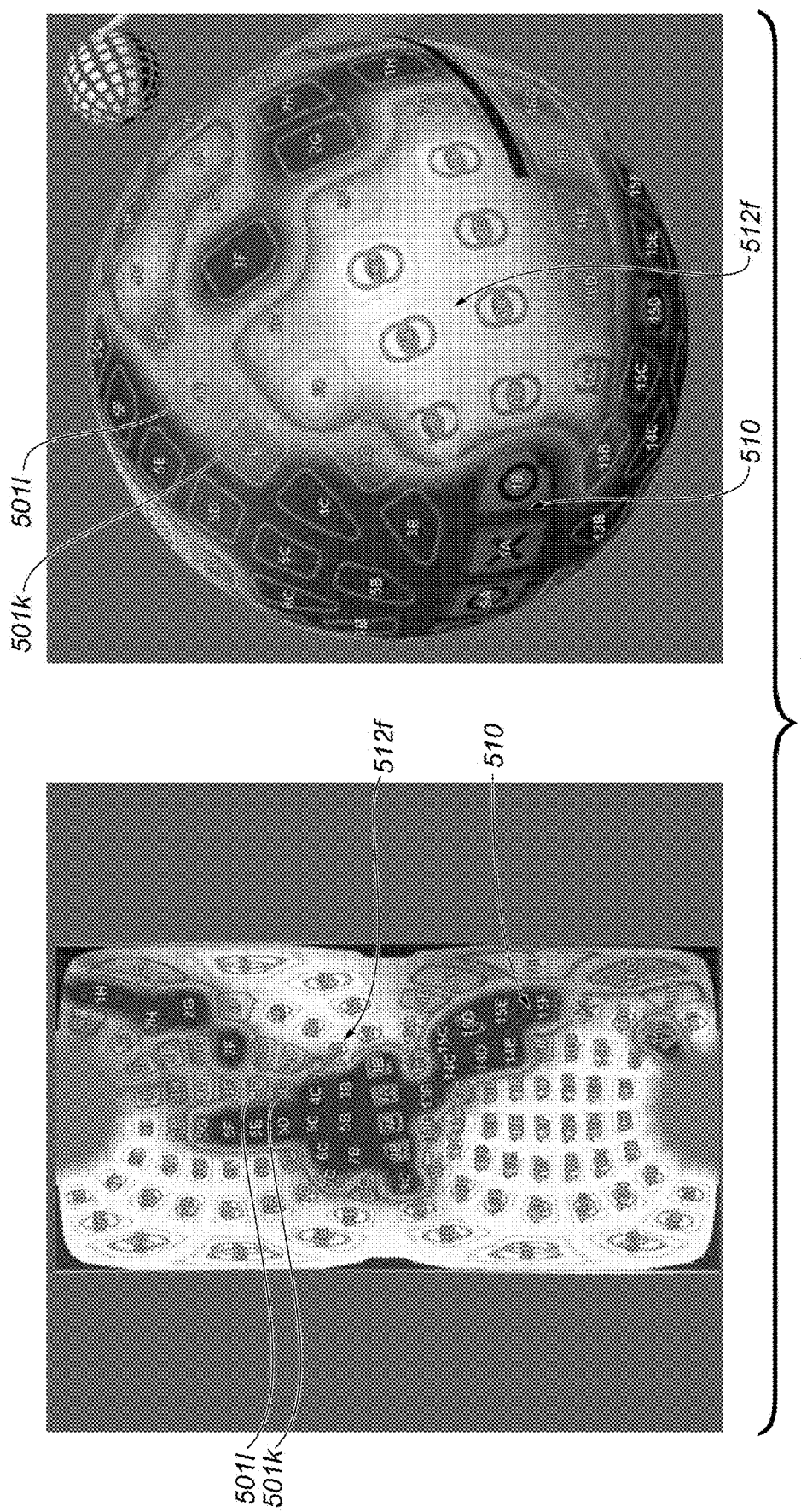
FIG. 5L includes a graphical interface providing a graphical representation similar to that of FIG. 5K, but illustrates improved tissue contact for at least the particular transducer from FIG. 5K, as compared to the tissue contact state of FIG. 5K, upon execution of a tissue contact improvement procedure including a bending movement, in a second direction, of an elongate shaft member of a catheter device system, the tissue contact improvement procedure particularly associated with the tissue contact state of FIG. 5K, according to some embodiments.

FIG. 5J shows, according to some embodiments, the resulting improved contact after the first contact-improvement procedure associated with FIG. 5I has been executed. FIG. 5L shows, according to some embodiments, the improved contact after the second contact-improvement procedure associated with FIG. 5K has been executed. It is noted that the first contact-improvement procedure may be indicated in other manners other than by the dialog box 505*i* shown in FIG. 5I. It is noted that the second contact-improvement procedure may be indicated in other manners other than by the dialog box 505*k* shown in FIG. 5K.

In some embodiments, the first contact-improvement procedure includes a first set of one or more movement types of a plurality of movement types, and the second contact-improvement procedure includes a second set of one or more movement types of the plurality of movement types. According to various embodiments, the second contract-improvement procedure does not include at least one movement type included in the first contact-improvement procedure. For example, the first contact-improvement procedure indicated by the dialog box 505*i* in FIG. 5I involves bending the elongate shaft member (e.g., 314) in the first direction while the dialog box 505*k* in FIG. 5K involves bending the elongate shaft member (e.g., 314) in the second direction AND/OR advancing the catheter (advancing being an example of a movement type different than bending). Both of these two movement types of the second contact-improvement procedure may be determined or predetermined to improve contact between one or more transducers of the second transducer set and the tissue wall. Accordingly, the second contact-improvement procedure includes a movement type (e.g., advancing, which may be an example of a translational movement) that is not included in the first contact-improvement procedure, according to some embodiments. According to some embodiments, (a) the first set of one or more movement types, (b) the second set of one or movement types, or both (a) and (b) include(s) (1) rotational movement, (2) translational movement, (3) bending movement of at least the distal portion (e.g., 314*b*) of the elongate shaft member (314), or a combination or subcombination of (1), (2), and (3).

Figure 5N:
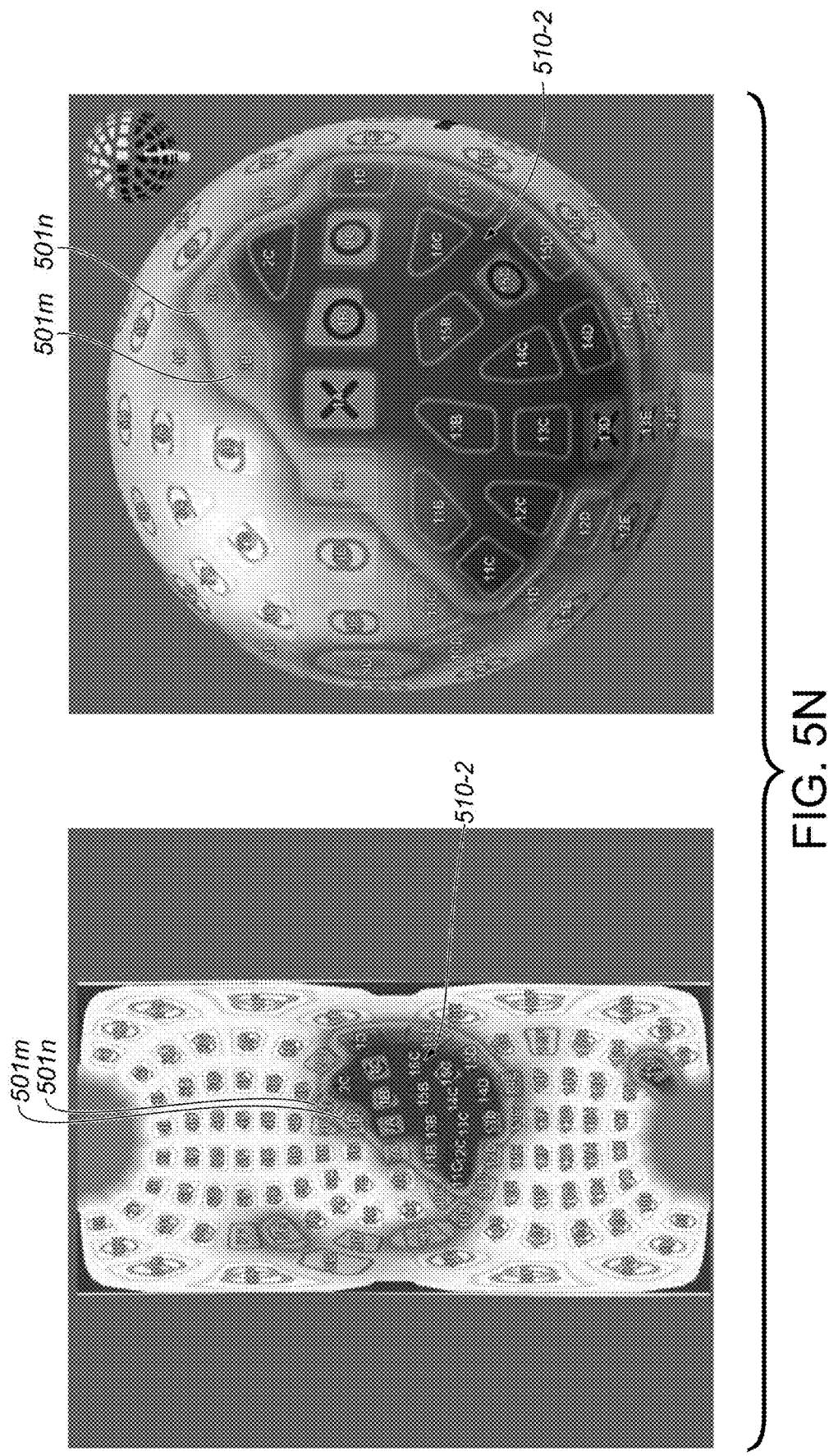
FIG. 5N includes a graphical interface providing a graphical representation similar to that of FIG. 5K, but illustrates improved tissue contact for at least the particular transducer from FIG. 5M, as compared to the tissue contact state of FIG. 5M, upon execution of a tissue contact improvement procedure including a bending movement, in a second direction, of an elongate shaft member of a catheter device system, the tissue contact improvement procedure particularly associated with the tissue contact state of FIG. 5M, according to some embodiments.

It is noted that various embodiments are not limited to improving contact in ring-like regions of contact (for example, as discussed above with contact regions encircling various pulmonary veins). For example, FIG. 5M corresponds to a situation in which the catheter device system has been brought into substantial contact with the tissue wall to create a block-like or contiguous region 510-1 of relatively high contact (in contrast to, e.g., region 512g of low tissue contact) in both the two-dimensional and three-dimensional representations. According to various embodiments, it is desired to increase the contact between particular transducers identified as 3B and 3C (respectively graphically identified by graphical elements 501m and 501n) and the tissue wall so to increase the region of contact corresponding to the region 510-1 of relatively high contact in both the two-dimensional and three-dimensional representations. According to various embodiments, program instructions associated with method 600 may include computer-executable instructions configured to cause the data processing device system (e.g., 110, 310) to cause the input-output device system (e.g., 120, 320), in response to identifying that one or both of the transducers 3B and 3C belong to a particular transducer set and that one or both of the transducers 3B and 3C exhibit an improper contact arrangement or configuration with the tissue wall (i.e., have insufficient tissue contact in this example) per block 604 in FIG. 6, to provide an indication of a particular contact-improvement procedure to facilitate an improved contact arrangement or configuration between one or both of the transducers 3B and 3C or one or more transducers in the same portion of the transducer-based device (e.g., 200, 300) and a tissue wall based at least on a bending movement of at least a part of the elongate shaft member (e.g., 314). According to various embodiments associated with FIG. 5M, the particular contact improvement procedure includes (e.g., as indicated by dialog box 505m) a procedure including bending of a part of the elongate shaft member (e.g., 314) in a direction to improve the insufficient contact between one or both of the transducers 3B and 3C or one or more transducers in the same portion of the transducer-based device (e.g., 200, 300) and the tissue wall. FIG. 5N shows, according to some embodiments, the resulting improved contact after the particular contact-improvement procedure associated with FIG. 5M has been executed. In FIG. 5N, region 510-1 has now transformed into region 510-2 which indicates graphical elements 501m and 501n respectively corresponding to transducers 3B and 3C showing improved contact.

While some of the embodiments disclosed above are described with examples of cardiac mapping, the same or similar embodiments may be used for mapping other bodily organs, for example gastric mapping, bladder mapping, arterial mapping and mapping of any lumen or cavity into which the devices of the present invention may be introduced.

While some of the embodiments disclosed above are described with examples of cardiac ablation, the same or similar embodiments may be used for ablating other bodily organs or any lumen or cavity into which the devices of the present invention may be introduced.

Subsets or combinations of various embodiments described above can provide further embodiments.

These and other changes can be made to the invention in light of the above-detailed description. In general, in the following claims, the terms used should not be construed to limit the invention to the specific embodiments disclosed in the specification and the claims, but should be construed to include other catheter or transducer-based device systems including all medical treatment device systems and all medical diagnostic device systems in accordance with the claims. Accordingly, the invention is not limited by the disclosure, but instead its scope is to be determined entirely by the following claims.

What is claimed is:

1. A system comprising:
    an input-output device system including a catheter device system, the catheter device system including a plurality of transducers, a distribution of the plurality of transducers positionable in a bodily cavity, the bodily cavity defined by at least a tissue wall, and each transducer of the plurality of transducers configured at least to sense a degree of contact between the transducer and the tissue wall;
    a data processing device system communicatively connected to the input-output device system and to the plurality of transducers of the catheter device system of the input-output device system; and
    a memory device system communicatively connected to the data processing device system and storing a first contact-improvement procedure in association with a first transducer set of the plurality of transducers, the memory device system further storing a program executable by the data processing device system,
    wherein the data processing device system is configured by the program at least to:
    receive, via the input-output device system, a plurality of degree-of-contact signals respectively from the plurality of transducers, the plurality of degree-of-contact signals respectively indicating a degree of contact between the respective transducer of the plurality of transducers and the tissue wall;
    identify a particular transducer of the plurality of transducers as belonging to the first transducer set and as exhibiting an improper contact arrangement with the tissue wall as compared to a predetermined tissue-contact state, based at least on an interaction with data associated with at least one of the received degree-of-contact signals; and
    cause the input-output device system, in response to the identifying of the particular transducer as belonging to the first transducer set and as exhibiting the improper contact arrangement with the tissue wall as compared to the predetermined tissue-contact state, to provide an indication of the first contact-improvement procedure to facilitate an improved contact arrangement between one or more transducers in the first transducer set and the tissue wall.

2. The system of claim 1, wherein the interaction with the data associated with at least one of the received degree-of-contact signals includes an analysis of the data performed by the data processing device system.

3. The system of claim 2, wherein the data processing device system is configured by the program at least to execute the identification of the particular transducer as exhibiting the improper contact arrangement with the tissue wall as compared to the predetermined tissue-contact state at least by determining, based at least on the analysis of the data, that particular ones of the transducers of the plurality of transducers other than the particular transducer exhibit sufficient contact with the tissue wall while the particular transducer exhibits insufficient contact with the tissue wall.

4. The system of claim 2, wherein the data processing device system is configured by the program at least to execute the identification of the particular transducer as exhibiting the improper contact arrangement with the tissue wall as compared to the predetermined tissue-contact state at least by determining, based at least on the analysis of the data, that particular ones of the transducers of the plurality of transducers other than the particular transducer exhibit sufficient contact with the tissue wall with respect to a particular anatomical feature of the bodily cavity, but that the particular transducer of the plurality of transducers exhibits insufficient contact with the tissue wall with respect to the particular anatomical feature of the bodily cavity.

5. The system of claim 1, wherein the interaction with the data associated with at least one of the received degree-of-contact signals includes: (a) the data processing device system causing the input-output device system to output a representation of the data in association with an identifier of the particular transducer, and (b) the data processing device system receiving user input via the input-output device system, after outputting the data in association with the identifier of the particular transducer, the user input identifying the particular transducer as exhibiting the improper contact arrangement with the tissue wall.

6. The system of claim 1, wherein the memory device system further stores a second contact-improvement procedure in association with a second transducer set of the plurality of transducers, the first transducer set mutually exclusive with the second transducer set, the second contact-improvement procedure different than the first contact-improvement procedure.

7. The system of claim 6, wherein the first contact-improvement procedure indicates a procedure to move the plurality of transducers to improve contact between one or more transducers in the first transducer set and the tissue wall.

8. The system of claim 7, wherein the second contact-improvement procedure indicates a procedure to move the plurality of transducers to improve contact between one or more transducers in the second transducer set and the tissue wall, the moving of the plurality of transducers in accordance with the procedure of the second contact-improvement procedure being different than the moving of the plurality of transducers in accordance with the procedure of the first contact-improvement procedure.

9. The system of claim 6,
wherein the catheter device system includes an elongate shaft member comprising a proximal end portion and a distal end portion, the catheter device system including a structure physically coupled to the distal end portion of the elongate shaft member, the plurality of transducers arranged on the structure, the structure configurable in a deployed configuration configured to arrange the plurality of transducers in the distribution, the structure including a first portion and a second portion,
wherein the first transducer set is located on the first portion of the structure and the second transducer set is located on the second portion of the structure in a state in which the structure is in the deployed configuration, and
wherein the first contact-improvement procedure includes a first movement of a first movement type that is in a different direction than a second movement of the first movement type included in the second contact-improvement procedure, the first movement being a movement of at least part of the catheter device system, and the second movement being a movement of the at least part of the catheter device system.

10. The system of claim 9, wherein the part of the catheter device system is the structure, and wherein the first movement type is a rotational movement.

11. The system of claim 9, wherein the part of the catheter device system is the structure, and wherein the first movement type is a translational movement.

12. The system of claim 9, wherein the part of the catheter device system is the distal end portion of the elongate shaft member of the catheter device system, and wherein the first movement type is a bending movement.

13. The system of claim 9, wherein the structure is selectively moveable between a delivery configuration and the deployed configuration, the structure configured to be deliverable first portion ahead of the second portion to the bodily cavity in a state in which the structure is in the delivery configuration.

14. The system of claim 9, wherein the second portion of the structure opposes the first portion of the structure in the state in which the structure is in the deployed configuration.

15. The system of claim 14, wherein the transducers of the plurality of transducers are circumferentially arranged about an axis of the structure in the state in which the structure is in the deployed configuration, the axis intersecting both the first portion of the structure and the second portion of the structure in the state in which the structure is in the deployed configuration.

16. The system of claim 14, wherein the transducers of the plurality of transducers are circumferentially arranged about an axis of the structure in the state in which the structure is in the deployed configuration, the first portion of the structure and the second portion of the structure located on opposite sides of a plane in the state in which the structure is in the deployed configuration, the axis residing in the plane.

17. The system of claim 14, wherein the first portion of the structure includes a first domed shape in the state in which the structure is in the deployed configuration, and the second portion of the structure includes a second domed shape in the state in which the structure is in the deployed configuration, the second domed shape opposing the first domed shape in the state in which the structure is in the deployed configuration.

18. The system of claim 6,
wherein the catheter device system includes an elongate shaft member comprising a proximal end portion and a distal end portion, the catheter device system including a structure physically coupled to the distal end portion of the elongate shaft member, the plurality of transducers arranged on the structure, the structure configurable in a deployed configuration configured to arrange the plurality of transducers in the distribution, the structure including a first portion and a second portion,
wherein the first transducer set is located on the first portion of the structure, and the second transducer set is located on the second portion of the structure in a state in which the structure is in the deployed configuration, and
wherein the first contact-improvement procedure includes a first set of one or more movement types of a plurality of movement types, and the second contact-improvement procedure includes a second set of one or more movement types of the plurality of movement types, the second contact-improvement procedure not including at least one movement type included in the first contact-improvement procedure.

19. The system of claim 18, wherein the second portion of the structure opposes the first portion of the structure in the state in which the structure is in the deployed configuration.

20. The system of claim 18, wherein (a) the first set of one or more movement types, (b) the second set of one or more movement types, or both (a) and (b) include(s) a rotational movement of at least the structure.

21. The system of claim 18, wherein (a) the first set of one or more movement types, (b) the second set of one or more movement types, or both (a) and (b) include(s) a translational movement of at least the structure.

22. The system of claim 18, wherein (a) the first set of one or more movement types, (b) the second set of one or more movement types, or both (a) and (b) include(s) a bending movement of at least the distal end portion of the elongate shaft member of the catheter device system.

23. The system of claim 6, wherein the catheter device system comprises an elongate shaft member comprising a proximal end portion and a distal end portion, the plurality of transducers physically coupled to the distal end portion, wherein the first contact-improvement procedure includes a first translational-movement procedure to translate at least part of the elongate shaft member to improve contact between one or more transducers in the first transducer set and the tissue wall, and wherein the second contact-improvement procedure includes a second translational-movement procedure to translate at least part of the elongate shaft member to improve contact between one or more transducers in the second transducer set and the tissue wall, the first translational-movement procedure different than the second translational-movement procedure.

24. The system of claim 6, wherein the catheter device system comprises an elongate shaft member comprising a proximal end portion, a distal end portion to which the transducers of the plurality of transducers are physically coupled, and a longitudinal axis extending between the proximal end portion and the distal end portion, wherein the first contact-improvement procedure includes a first rotational-movement procedure to rotate at least the first transducer set about the longitudinal axis to improve contact between one or more transducers in the first transducer set and the tissue wall, and wherein the second contact-improvement procedure includes a second rotational-movement procedure to rotate at least the second transducer set about the longitudinal axis to improve contact between one or more transducers in the second transducer set and the tissue wall, the first rotational-movement procedure different than the second rotational-movement procedure.

25. The system of claim 6, wherein the transducers of the plurality of transducers are circumferentially arranged about an axis, and wherein the first contact-improvement procedure includes a first rotational-movement procedure to rotate at least the first transducer set about the axis to improve contact between one or more transducers in the first transducer set and the tissue wall, and wherein the second contact-improvement procedure includes a second rotational-movement procedure to rotate at least the second transducer set about the axis to improve contact between one or more transducers in the second transducer set and the tissue wall, the first rotational-movement procedure different than the second rotational-movement procedure.

26. The system of claim 6, wherein the catheter device system comprises an elongate shaft member comprising a proximal end portion and a distal end portion to which the plurality of transducers are physically coupled, wherein the first contact-improvement procedure includes a first bending-movement procedure to bend at least a part of the elongate shaft member to improve contact between one or more transducers in the first transducer set and the tissue wall, and wherein the second contact-improvement procedure includes a second bending-movement procedure to bend at least a part of the elongate shaft member to improve contact between one or more transducers in the second transducer set and the tissue wall, the first bending-movement procedure different than the second bending-movement procedure.

27. The system of claim 1, wherein at least some of the plurality of degree-of-contact signals indicate that the particular transducer exhibits insufficient contact with the tissue wall concurrently with at least a second transducer of the plurality of transducers exhibiting sufficient contact with the tissue wall.

28. The system of claim 1, wherein the input-output device system includes an audio-producing device system communicatively connected to the data processing device system, and wherein the provided indication of the first contact-improvement procedure includes audible instructions indicating at least part of the first contact-improvement procedure.

29. The system of claim 1, wherein the improper contact arrangement between the particular transducer and the tissue wall is an insufficient contact between the particular transducer and the tissue wall for at least the particular transducer to perform tissue ablation on the tissue wall.

30. The system of claim 1, wherein the one or more transducers in the first transducer set include(s) the particular transducer.

31. The system of claim 1,
wherein the input-output device system includes a display device system and the data processing device system is communicatively connected to the display device system, and
wherein the data processing device system is configured by the program at least to cause the display device system to display a graphical representation including a visual presentation of contact information representative of at least some of the plurality of degree-of-contact signals.

32. The system of claim 31, wherein the data processing device system is configured by the program at least to:
receive a second plurality of degree-of-contact signals respectively from the plurality of transducers, the second plurality of degree-of-contact signals respectively indicating a degree of contact between the respective transducer of the plurality of transducers and the tissue wall in a state after execution of the first contact-improvement procedure; and
cause the display device system to update the graphical representation to include a visual presentation of updated contact information representative of at least some of the second plurality of degree-of-contact signals, the visual presentation of the updated contact information indicating improved contact between the particular transducer and the tissue wall as compared to the visual presentation of the contact information.

33. The system of claim 31, wherein the provided indication of the first contact-improvement procedure includes a visual presentation, provided by the display device system, of the indication of the first contact-improvement procedure.

34. The system of claim 33, wherein the visual presentation of the first contact-improvement procedure includes visually presenting, via the display device system, (a) one or more text-based instructions indicating at least part of the first contact-improvement procedure, (b) one or more graphic symbol-based instructions indicating at least part of the first contact-improvement procedure, (c) one or more graphical animations indicating at least part of the first contact-improvement procedure, (a) and (b), (a) and (c), (b) and (c), or (a), (b), and (c).

35. The system of claim 33, wherein the visual presentation of the indication of the first contact-improvement procedure is displayed at least proximate a graphical representation of the particular transducer of the plurality of transducers.

36. The system of claim 31, wherein the graphical representation including the visual presentation of contact information representative of at least some of the plurality of degree-of-contact signals is displayed with a particular spatial distribution among visually presented elements of the contact information that is consistent with a spatial distribution of the respective transducers of the plurality of transducers providing the respective degree-of-contact signals of the at least some of the plurality of degree-of-contact signals during a sensing of contact between the respective transducers of the plurality of transducers and the tissue wall.

37. The system of claim 31, wherein the visual presentation of contact information representative of at least some of the plurality of degree-of-contact signals includes a respective visual presentation of an element of the contact information corresponding to a respective signal of the at least some of the plurality of degree-of-contact signals, each respective visual presentation of an element of the contact information displayed at least proximate a graphical representation of the respective transducer of the plurality of transducers that provided the respective signal of the at least some of the plurality of degree-of-contact signals.

38. A method executed by a data processing device system according to a program stored by a memory device system communicatively connected to the data processing device system, the data processing device system further communicatively connected to an input-output device system including being communicatively connected to a plurality of transducers of a catheter device system of the input-output device system, a distribution of the plurality of transducers positionable in a bodily cavity, the bodily cavity defined by at least a tissue wall, and each transducer of the plurality of transducers configured at least to sense a degree of contact between the transducer and the tissue wall, and the method comprising:

receiving, via the input-output device system, a plurality of degree-of-contact signals respectively from the plurality of transducers, the plurality of degree-of-contact signals respectively indicating a degree of contact between the respective transducer of the plurality of transducers and the tissue wall;

identifying a particular transducer of the plurality of transducers as belonging to a first transducer set of the plurality of transducers and as exhibiting an improper contact arrangement with the tissue wall as compared to a predetermined tissue-contact state based at least on an interaction with data associated with at least one of the received degree-of-contact signals; and causing the input-output device system, in response to the identifying the particular transducer as belonging to the first transducer set and as exhibiting the improper contact arrangement with the tissue wall as compared to the predetermined tissue-contact state, to provide an indication of a first contact-improvement procedure to facilitate an improved contact arrangement between one or more transducers in the first transducer set and the tissue wall, the first contact-improvement procedure stored by the memory device system in association with the first transducer set.

39. A non-transitory computer-readable storage medium system comprising one or more non-transitory computer-readable storage mediums storing a program executable by one or more data processing devices of a data processing device system communicatively connected to an input-output device system including being communicatively connected to a plurality of transducers of a catheter device system of the input-output device system, a distribution of the plurality of transducers positionable in a bodily cavity, the bodily cavity defined by at least a tissue wall, and each transducer of the plurality of transducers configured at least to sense a degree of contact between the transducer and the tissue wall, the program comprising:

a signal reception module configured to cause the data processing device system to receive, via the input-output device system, a plurality of degree-of-contact signals respectively from the plurality of transducers, the plurality of degree-of-contact signals respectively indicating a degree of contact between the respective transducer of the plurality of transducers and the tissue wall;

an identification module configured to cause the data processing device system to identify a particular transducer of the plurality of transducers as belonging to a first transducer set of the plurality of transducers and as exhibiting an improper contact arrangement with the tissue wall as compared to a predetermined tissue-contact state based at least on an interaction with data associated with at least one of the received degree of contact signals; and a contact-improvement module configured to cause the data processing device system to cause the input-output device system, in response to the identification of the particular transducer as belonging to the first transducer set and as exhibiting the improper contact arrangement with the tissue wall as compared to the predetermined tissue-contact state, to provide an indication of a first contact-improvement procedure to facilitate an improved contact arrangement between one or more transducers in the first transducer set and the tissue wall, the first contact-improvement procedure stored by the non-transitory computer-readable storage medium system in association with the first transducer set.

\* \* \* \* \*